(12) United States Patent
Takatsuka et al.

(10) Patent No.: US 11,495,008 B2
(45) Date of Patent: Nov. 8, 2022

(54) SENSOR DEVICE AND SIGNAL PROCESSING METHOD

(71) Applicant: Sony Group Corporation, Tokyo (JP)

(72) Inventors: Susumu Takatsuka, Tokyo (JP); Chikashi Yajima, Kanagawa (JP); Hiroki Tetsukawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/273,557

(22) PCT Filed: Oct. 4, 2019

(86) PCT No.: PCT/JP2019/039284
§ 371 (c)(1),
(2) Date: Mar. 4, 2021

(87) PCT Pub. No.: WO2020/080140
PCT Pub. Date: Apr. 23, 2020

(65) Prior Publication Data
US 2021/0256286 A1    Aug. 19, 2021

(30) Foreign Application Priority Data

Oct. 19, 2018  (JP) .............................. JP2018-197496
Jun. 14, 2019  (JP) .............................. JP2019-111092

(51) Int. Cl.
*G06V 10/25*      (2022.01)
*G06K 9/62*       (2022.01)
(Continued)

(52) U.S. Cl.
CPC ........... *G06V 10/25* (2022.01); *G06K 9/6267* (2013.01); *G06V 10/147* (2022.01); *G06V 10/70* (2022.01)

(58) Field of Classification Search
CPC ...... G06V 10/25; G06V 10/147; G06V 10/70; G06V 10/56; G06V 20/625; G06V 20/62;
(Continued)

(56) References Cited

U.S. PATENT DOCUMENTS 5,834,754 A * 11/1998 Feng .................. G06K 7/10881
235/472.01
9,349,076 B1 * 5/2016 Liu ........................ G06V 10/25
(Continued)

FOREIGN PATENT DOCUMENTS

JP    2009-206920 A    9/2009
JP    2010-062943 A    3/2010
(Continued)

OTHER PUBLICATIONS

International Search Report (PCT/ISA/210), International Application No. PCT/JP2019/039284, dated Dec. 17, 2019.

*Primary Examiner* — John B Strege
(74) *Attorney, Agent, or Firm* — Michael Best & Friedrich LLP

(57) ABSTRACT

A sensor device includes an array sensor having a plurality of detection elements arrayed in one or two dimensional manner, a signal processing unit configured to acquire a detection signal by the array sensor and perform signal processing, and a calculation unit. The calculation unit detects an object from the detection signal by the array sensor, and gives an instruction, to the signal processing unit, on region information generated on the basis of the detection of the object as region information regarding the acquisition of the detection signal from the array sensor or the signal processing for the detection signal.

26 Claims, 37 Drawing Sheets

(51) Int. Cl.
*G06V 10/147* (2022.01)
*G06V 10/70* (2022.01)

(58) Field of Classification Search
CPC ...... G06V 20/40; G06V 40/10; G06V 40/162;
G06K 9/6267; G06K 9/6271; H04N
5/23219; H04N 5/23227; H04N 5/23229;
H04N 5/23241; H04N 5/23245; H04N
5/3454; H04N 5/23225; H04N 5/351;
H04N 5/3765; H04N 7/181; H04N 7/18
See application file for complete search history.

(56) References Cited

U.S. PATENT DOCUMENTS

| | | | | |
|---|---|---|---|---|
| 9,760,806 | B1* | 9/2017 | Ning | G06T 7/277 |
| 2006/0184297 | A1* | 8/2006 | Higgins-Luthman | G06V 20/58 |
| | | | | 701/41 |
| 2008/0129541 | A1* | 6/2008 | Lu | G06V 10/143 |
| | | | | 340/905 |
| 2008/0130948 | A1* | 6/2008 | Ozer | G06V 40/161 |
| | | | | 382/103 |
| 2009/0262981 | A1* | 10/2009 | Ike | G06V 10/25 |
| | | | | 382/209 |
| 2012/0026332 | A1* | 2/2012 | Hammarstrom | G06T 7/593 |
| | | | | 348/148 |
| 2012/0057748 | A1* | 3/2012 | Katano | G06T 7/248 |
| | | | | 382/103 |
| 2012/0155769 | A1* | 6/2012 | Yokomitsu | H04N 19/124 |
| | | | | 382/173 |
| 2016/0092736 | A1 | 3/2016 | Mai et al. | |
| 2017/0323149 | A1* | 11/2017 | Harary | G06T 7/579 |
| 2017/0337435 | A1* | 11/2017 | Uliyar | G06V 10/10 |
| 2018/0017659 | A1 | 1/2018 | Irie | |
| 2018/0268571 | A1* | 9/2018 | Park | G06N 3/0454 |
| 2019/0188527 | A1* | 6/2019 | Deng | G06T 3/40 |
| 2019/0303686 | A1* | 10/2019 | Guo | G06K 9/6201 |
| 2021/0256286 | A1* | 8/2021 | Takatsuka | G06K 9/6267 |

FOREIGN PATENT DOCUMENTS

| | | |
|---|---|---|
| JP | 2010-087599 A | 4/2010 |
| JP | 2008-098954 A | 1/2013 |
| JP | 2013-012930 A | 1/2013 |
| JP | 2009-010472 A | 12/2014 |
| JP | 2014-225868 A | 12/2014 |
| JP | 2009-077143 A | 5/2016 |
| JP | 2016-072964 A | 5/2016 |
| WO | 2016/151925 A1 | 9/2016 |

* cited by examiner

FIG. 4
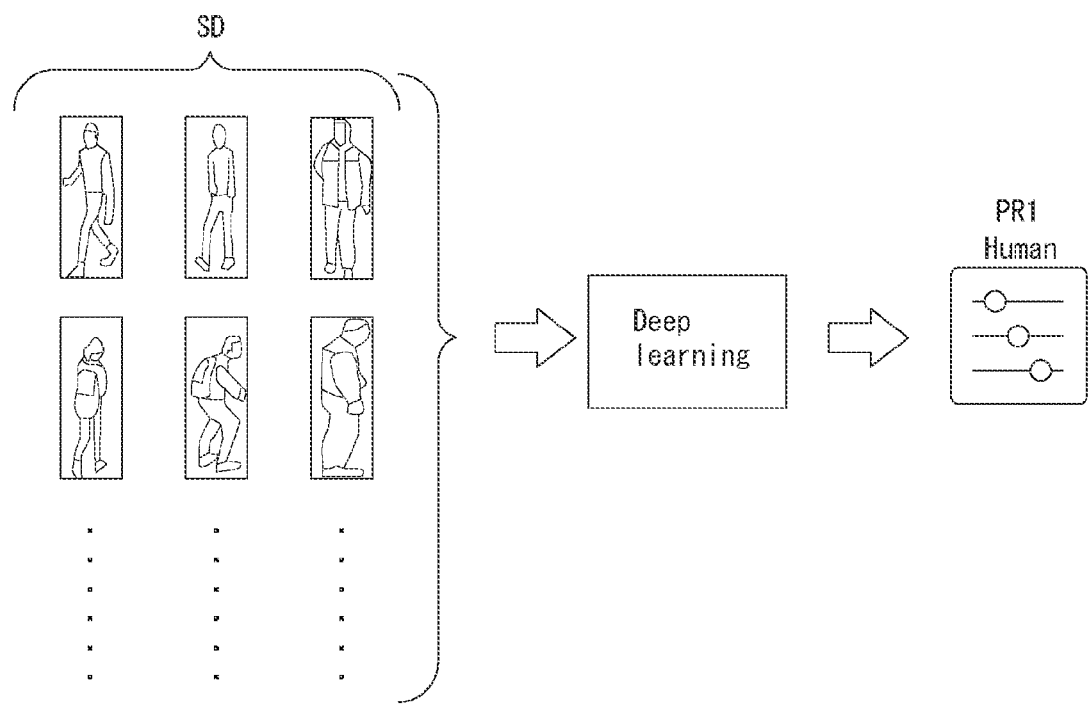
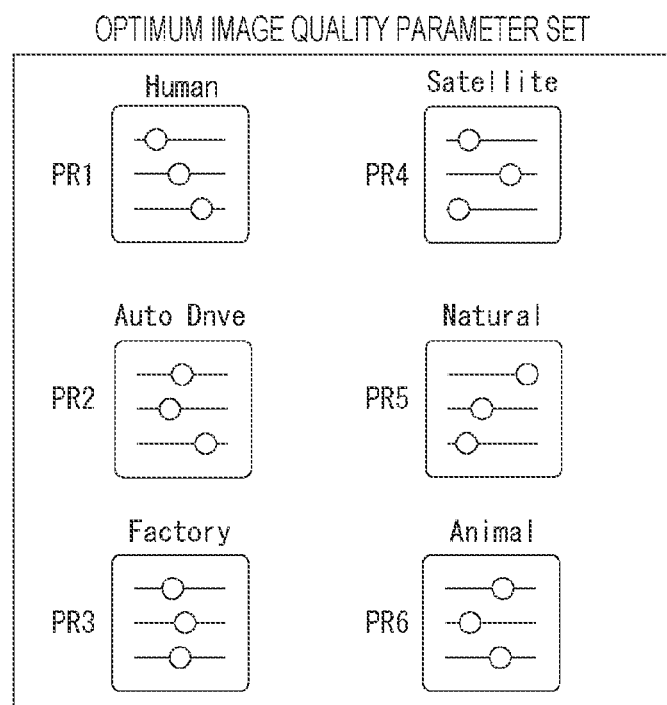

FIG. 7
A
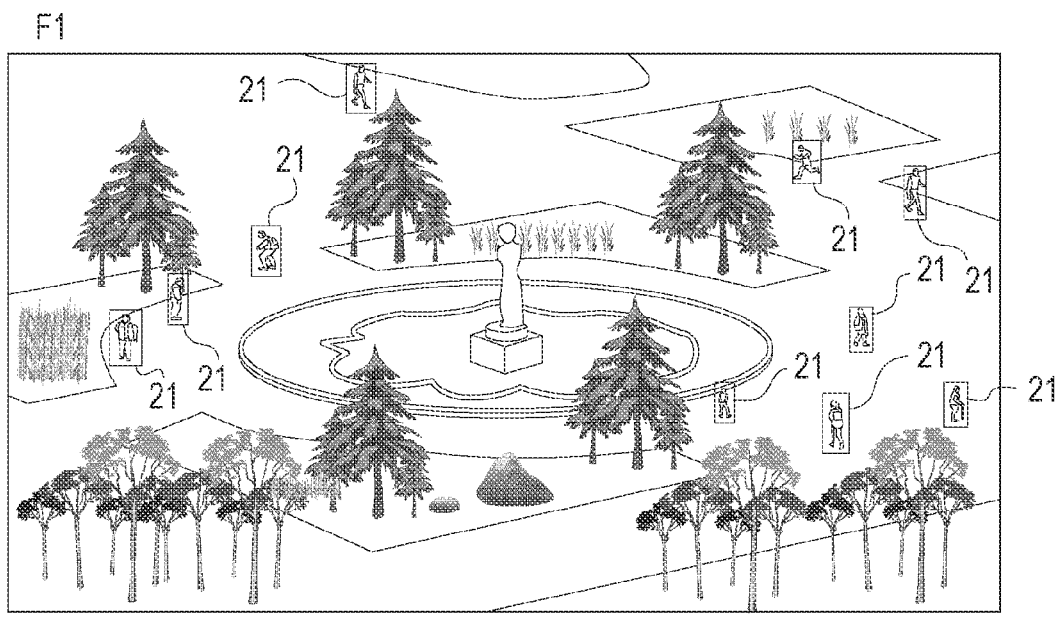
B
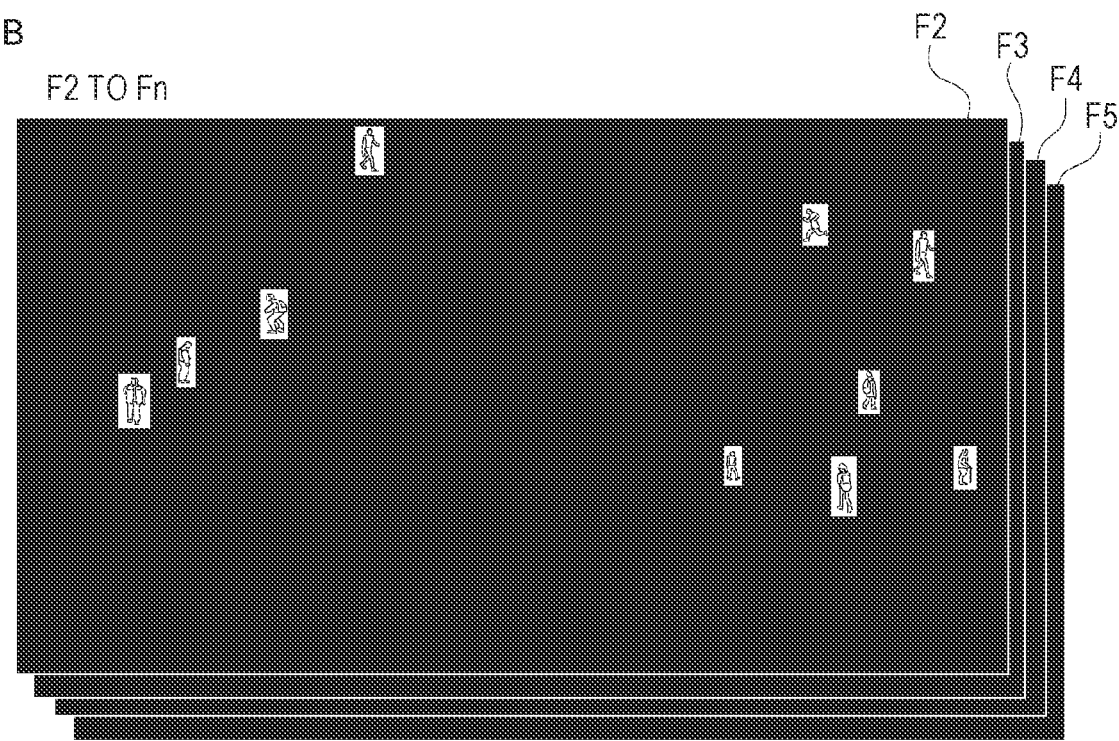

☐ PIXELS CORRESPONDING TO "PERSON" CLASS TEMPLATE
☐ PIXELS NOT CORRESPONDING TO TEMPLATE

FIG. 15
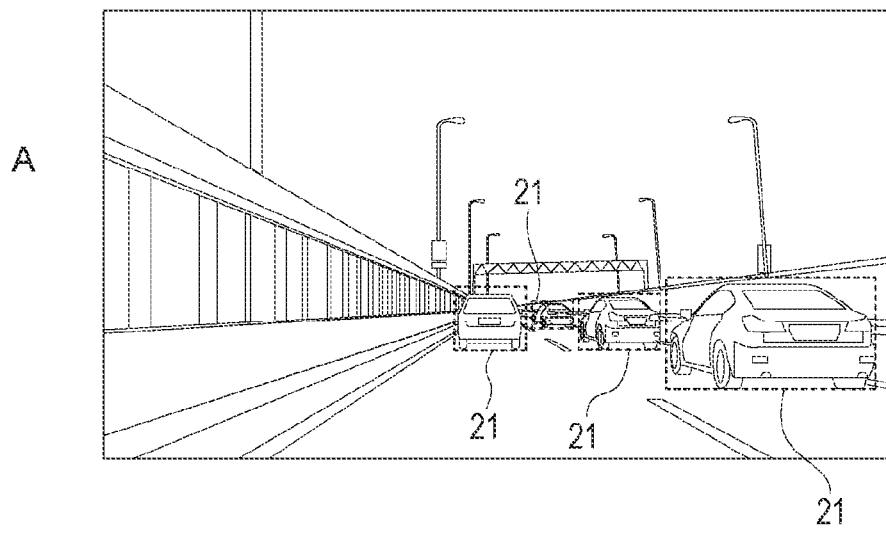
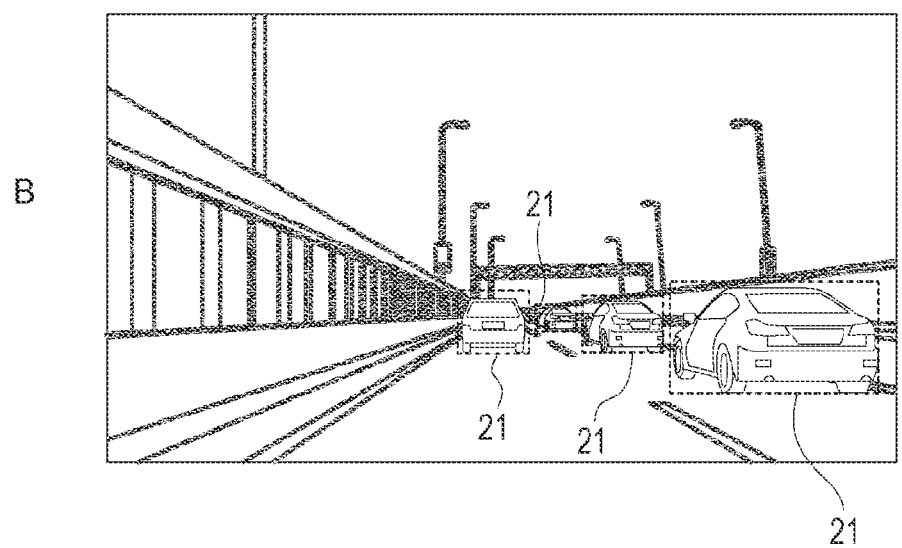

FIG. 23
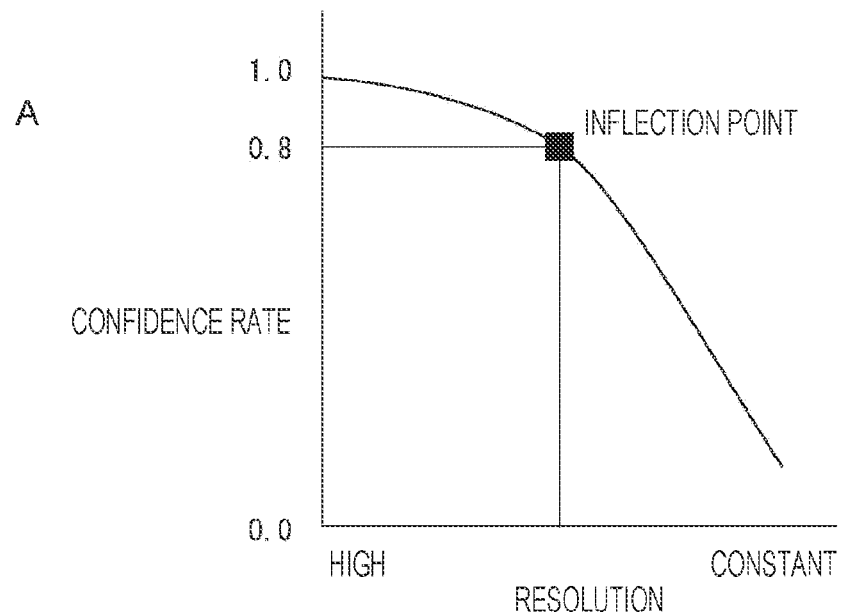
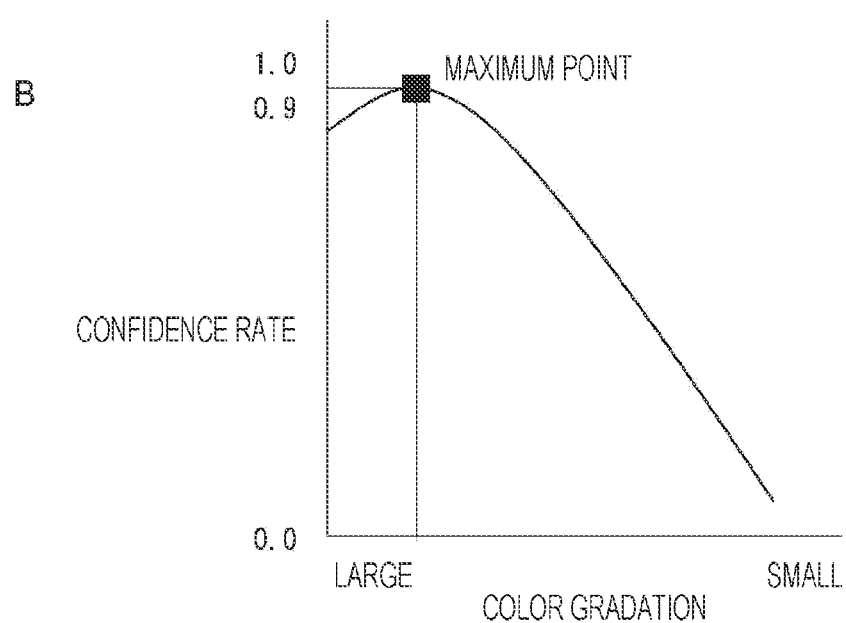

SENSOR DEVICE AND SIGNAL PROCESSING METHOD

TECHNICAL FIELD

The present technology relates to a sensor device and a signal processing method, and particularly relates to a technical field of a sensor device having a function to process a detection signal obtained by an array sensor.

BACKGROUND ART

For example, as object detection using an array sensor in which imaging elements are arrayed, the array sensor capturing an image and sending the captured image signal to a processor outside the array sensor, and the processor side performing calculation processing for object detection is known.

Patent Document 1 below discloses a technology including setting a region of interest within a region captured by an image sensor.

CITATION LIST

Patent Document

Patent Document 1: Japanese Patent Application Laid-Open No. 2014-225868

SUMMARY OF THE INVENTION

Problems to be Solved by the Invention

In the object detection using an image sensor, captured image information has been sent to an external processor that detects an object, and the processor has performed calculation processing for all of object detections regardless of a class (category or genre) of a target to be captured. This process relies on processing power on the general-purpose processor side, and an efficient and optimal data compression method limited to an object detection target has not been adopted. As a result, there has been a problem that the processing is delayed due to heavy load calculation on the external processor side.

As described in Patent Document 1, there has been a method of specifying a region of interest (ROI) with a rectangle and reading data, but changing an optimized shape and density of a read pixel by class has not been performed.

Therefore, the present disclosure proposes changing shape and density (denseness) of a ROI according to a class of object detection.

Solutions to Problems

A sensor device according to the present technology includes an array sensor having a plurality of detection elements arrayed in one or two dimensional manner,
a signal processing unit configured to acquire a detection signal by the array sensor and perform signal processing, and a calculation unit configured to detect an object from the detection signal by the array sensor, and give an instruction, to the signal processing unit, on region information generated on the basis of the detection of the object as region information regarding the acquisition of the detection signal from the array sensor or the signal processing for the detection signal.

That is, the detection signal obtained by the array sensor is processed by the signal processing unit and output from an output unit. The region information regarding the acquisition of the detection signal from the array sensor or the signal processing for the detection signal in the signal processing unit is set on the basis of the detection of the object.

Note that the object detected from the detection signal means an object to be detected, and any object may be the object to be detected referred to here. For example, any object such as person, animal, moving object (automobile, bicycle, aircraft, or the like), natural object (vegetable, plant, or the like), industrial product/part, building, facility, mountain, sea, river, star, sun, cloud, or the like can be targeted.

Furthermore, the detection element of the array sensor is assumed to be a visible light or non-visible light imaging element, a sound wave detection element for detecting sound waves, a tactile sensor element for detecting tactile sensation, or the like.

In the above sensor device according to the present technology, it is conceivable to further include an output unit configured to output the detection signal processed by the signal processing unit to an external device.

That is, the detection signal processed using the region information is transmitted and output to the external device. The external device is assumed to be, for example, an external processor that detects an object, a processor in the cloud, or the like.

In the above sensor device according to the present technology, it is conceivable that the signal processing unit includes an acquisition unit that selectively acquires the detection signal for the detection element of the array sensor, and the acquisition unit acquires the detection signal of the detection element selected on the basis of the region information from the calculation unit, as one frame of the detection signal.

That is, the signal processing unit acquires only the output of some detection element of the array sensor, using the region information.

In the above sensor device according to the present technology, it is conceivable that the calculation unit detects an object for the detection signal acquired from the array sensor in a state where the acquisition unit does not select the detection element based on the region information, and gives an instruction, to the signal processing unit, on the region information generated on the basis of the detection of the object as region information to be used for acquisition of the detection signal of a subsequent frame from the array sensor by the acquisition unit.

That is, the calculation unit provides the signal processing unit with the region information according to the object detection after detecting the object from information of normal one frame.

In the above sensor device according to the present technology, it is conceivable that the calculation unit detects an object for the detection signal acquired from the array sensor in a state where the acquisition unit has selected the detection element based on the region information, and regenerates the region information on the basis of the detection of the object, and gives an instruction, to the signal processing unit, on the region information as region information to be used for acquisition of the detection signal of a subsequent frame from the array sensor by the acquisition unit.

That is, for a frame of which only information of some detection element has been acquired from the array sensor, the calculation unit generates the region information according to the object detection after detecting the object from information of the one frame and provides the signal processing unit with the region information.

In the above sensor device according to the present technology, it is conceivable that the calculation unit detects an object for the detection signal acquired from the array sensor in the state where the acquisition unit has selected the detection element based on the region information, and gives an instruction on acquisition of the detection signal from the array sensor in the state where the acquisition unit does not select the detection element based on the region information in a subsequent frame in a case where a target object has not been detected.

That is, the calculation unit returns the acquisition of the detection signal in the acquisition unit to a normal state when the target object is no longer detected in the frame of which only the information of some detection element has been acquired from the array sensor.

In the above sensor device according to the present technology, it is conceivable that the calculation unit obtains a bounding box surrounding a region of the object detected from the detection signal by the array sensor, and generates the region information on the basis of the bounding box.

For example, by generating the region information on the basis of the bounding box surrounding the region of the detected object, the region information according to the position of the object in the image is generated, for example.

Furthermore, in the sensor device according the above present technology, it is conceivable that the calculation unit enlarges the bounding box and generates the region information.

That is, the region information that specifies a region in which the bounding box surrounding the region of the detected object is expanded is generated.

In the above sensor device according to the present technology, it is conceivable that the calculation unit determines a region on a detection element to detection element basis for the detected object and generates the region information.

The region of the object is not limited to a rectangle, and the region of the object is determined on a pixel to pixel basis, for example, thereby the region information is generated.

In the above sensor device according to the present technology, it is conceivable that the calculation unit detects an object for a frame as a keyframe of the detection signal obtained from the array sensor, and generates the region information on the basis of the detection of the object.

That is, the calculation unit selects the frame as a keyframe according to a predetermined selection algorithm, and performs region information generation processing.

Furthermore, it is conceivable that the keyframe is a frame at predetermined time intervals.

That is, the keyframe is a frame at intervals of a predetermined number of frames.

Alternatively, it is conceivable that the keyframe is a frame at timing based on a command from an external device.

For example, the keyframe is set according to an instruction from an external processor or the like at an image output destination.

In the above sensor device according to the present technology, it is conceivable that the calculation unit identifies a class for the object detected from the detection signal obtained from the array sensor, determines whether or not the identified class is a target class, and generates the region information corresponding to the object of the target class.

The class is a category of the object recognized using image recognition. The object to be detected is classified into, for example, "person", "automobile", "airplane", "ship", "truck", "bird", "cat", "dog", "deer", "frog", or "horse".

The target class is a class specified as a recognition target among classes.

In the above sensor device according to the present technology, it is conceivable that the calculation unit identifies a class for the object detected from the detection signal obtained from the array sensor, and generates the region information corresponding to the object, using a template corresponding to the identified class.

For example, a template of the region information corresponding to a class is prepared, and the template is selected and used according to the class identification.

Furthermore, in the sensor device according to the present technology, it is conceivable that the template indicates an acquisition region of the detection signal for each class.

For example, the template indicates a detection element from which detection information is to be acquired among the detection elements of the array sensor according to each class such as "person" or "automobile".

In the above sensor device according to the present technology, it is conceivable to further include an output unit configured to output any or all of the detection signal processed by the signal processing unit, information of the identified class, the number of detected objects, and information of presence or absence of a target class in response to a request of an external device.

That is, the output unit sets the information to be output according to the request of the external device.

In the above sensor device according to the present technology, it is conceivable that the signal processing unit includes a compression processing unit that performs compression processing for the detection signal from the array sensor, in which the compression processing unit performs the compression processing according to a compression rate different for each region on the basis of the region information from the calculation unit.

That is, the signal processing unit sets the compression rate for each region using the region information.

Furthermore, In the above sensor device according to the present technology, it is conceivable that the compression processing unit performs the compression processing at a low compression rate in a region specified by the region information, and performs the compression processing at a high compression rate in the other region.

That is, the region specified by the region information is regarded as an important region and the data amount is not reduced so much.

Furthermore, in the above sensor device according to the present technology, it is conceivable that the detection element of the array sensor is an imaging element.

That is, the detection signal by the array sensor is an image signal by imaging (photoelectric conversion).

In the above sensor device according to the present technology, it is conceivable that the calculation unit sets an active area for the detection signal to be acquired from the array sensor on the basis of information regarding past region information, and detects an object from the detection signal of the active area, and gives an instruction, to the signal processing unit, on the region information generated on the basis of the detection of the object as region information regarding the acquisition of the detection signal from the array sensor or the signal processing for the detection signal.

That is, the object detection for generating the region information is performed not from the entire region of the array sensor but from information of a region specified as the active area.

Note that the information regarding region information is information of a detection region of the object that is the source of the region information, the region information itself, or the like.

Further, in the above sensor device according to the present technology, it is conceivable that the calculation unit sets, for a plurality of pieces of the region information generated in a past predetermined period, the active area so as to include a detection region in the object detection based on each piece of the region information.

That is, the object is detected in order to generate the region information, and a region where the object to be detected appears is set as the active area.

Furthermore, in the above sensor device according to the present technology, it is conceivable that the signal processing unit includes an acquisition unit that selectively acquires the detection signal for the detection element of the array sensor, the acquisition unit acquires the detection signal of the detection element selected on the basis of the region information from the calculation unit, as one frame of the detection signal, and the calculation unit instructs the acquisition unit to acquire the detection signal of the active area from the array sensor in a subsequent frame in a case where the calculation unit detects an object for the detection signal acquired from the array sensor and a target object is not detected in a state where the acquisition unit has selected the detection element according to the region information.

That is, the calculation unit returns the acquisition of the detection signal in the acquisition unit to a state targeting the active area when the target object is no longer detected in the frame of which only the information of some detection element has been acquired from the array sensor.

Furthermore, in the above sensor device according to the present technology, it is conceivable that the calculation unit detects an object from the detection signal of the active area for a frame as a keyframe of the detection signal obtained from the array sensor, and generates the region information on the basis of the detection of the object.

That is, the calculation unit selects the frame as a keyframe according to a predetermined selection algorithm, and performs active area setting processing.

Furthermore, in the above sensor device according to the present technology, it is conceivable that the calculation unit identifies a class for the object detected from the detection signal obtained from the array sensor, and generates the region information corresponding to the object, using a template indicating an acquisition region of the detection signal corresponding to the identified class, and the sensor device further includes a threshold setting unit configured to set a threshold for all or some of parameters to be used for the image processing of the image processing unit or imaging processing regarding imaging by the array sensor, and set a parameter of processing regarding the acquisition region indicated by the template on the basis of the threshold.

A threshold is set so that the parameter of processing regarding the acquisition region indicated by the template can be changed on the basis of the threshold.

A signal processing method according to the present technology includes, as a signal processing method in a sensor device including an array sensor having a plurality of detection elements arrayed in one or two dimensional manner, and a signal processing unit that acquires a detection signal by the array sensor and performs signal processing, detecting an object from the detection signal by the array sensor, and giving an instruction, to the signal processing unit, on region information generated on the basis of the detection of the object as region information regarding the acquisition of the detection signal from the array sensor or the signal processing for the detection signal.

Thereby, a region to be read or a region to be processed is specified.

Furthermore, in the signal processing method according to the above present technology, it is conceivable to further include setting an active area for the detection signal acquired from the array sensor on the basis of past region information, and detecting an object from the detection signal of the active area as the detection signal by the array sensor.

The processing can be made efficient by using the idea of the active area.

BRIEF DESCRIPTION OF DRAWINGS

FIG. 4 is explanatory diagrams of an image quality parameter set according to the first embodiment.

FIG. 7 is an explanatory diagram of an area-clipped frame according to a second embodiment.

FIG. 15 is an explanatory diagram of intelligent compression according to a fourth embodiment.

FIG. 23 is explanatory graphs of the threshold setting according to the sixth embodiment.

MODE FOR CARRYING OUT THE INVENTION

Hereinafter, embodiments will be described in the following order.
<1. Configuration of Sensor Device>
<2. First Embodiment: Classified Image Adaptation>
<3. Second Embodiment: Area-clipping>
<4. Third Embodiment: Area-clipping Using AROI>
<5. Fourth Embodiment: Intelligent Compression>
<6. Fifth Embodiment: Active Sampling>
<7. Sixth Embodiment: Image Adaptation by Threshold Setting>
<8. Seventh Embodiment: Active Area-clipping>
<9. Eighth Embodiment: Threshold Setting and Area-clipping Using AROI>
<10. Ninth Embodiment: Active Sampling by Threshold Setting>
<11. Application to Moving Body>
<12. Conclusion and Modification>

Note that, as embodiments to be described below, a sensor device 1 as an image sensor having an imaging element array and outputting an image signal as a detection signal will be given as an example. In particular, the sensor device 1 according to the embodiments is a device having an object detection function by image analysis and which can be called intelligent array sensor.

<1. Configuration of Sensor Device>

Figure 1:
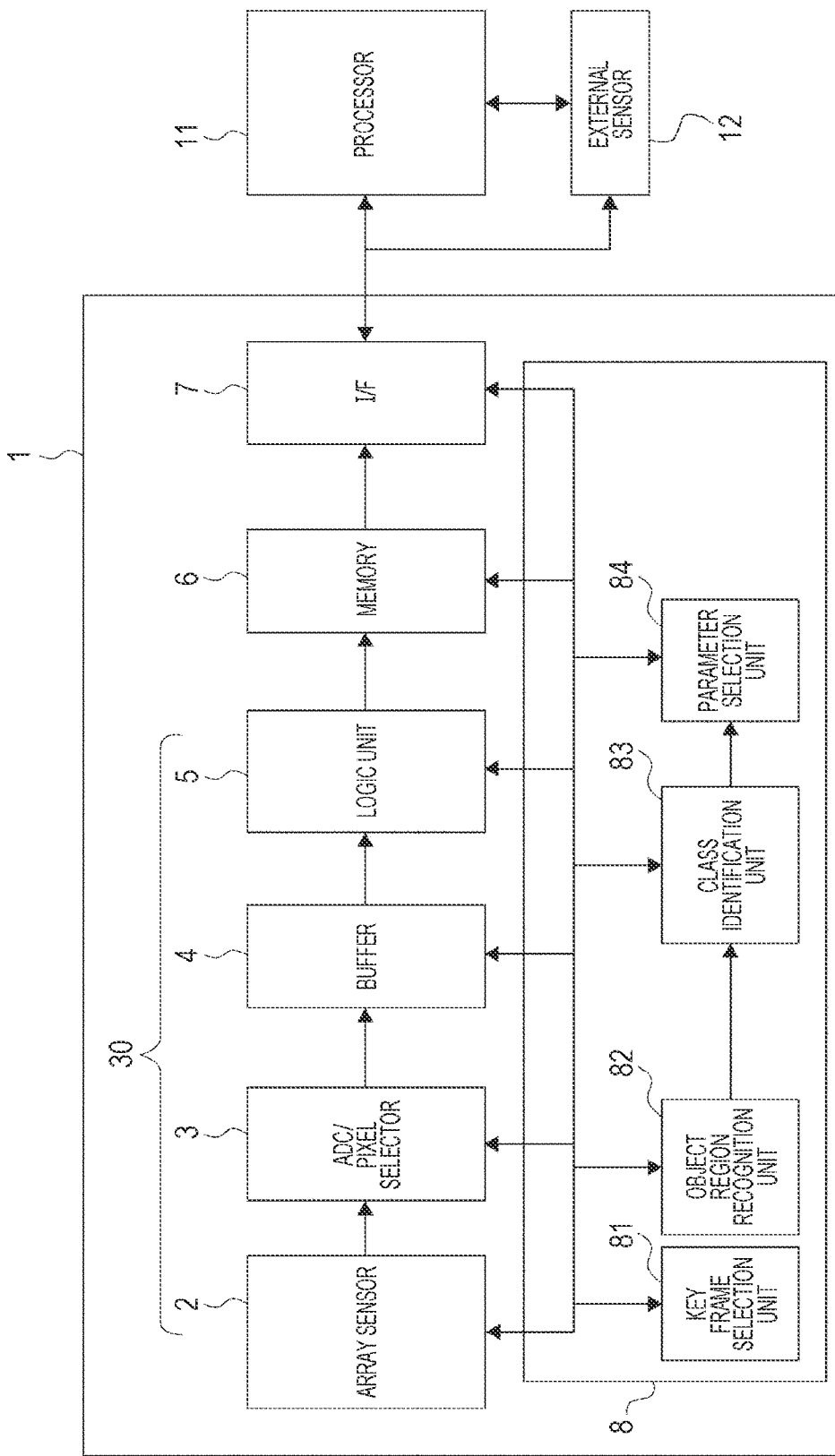
FIG. 1 is a block diagram of a sensor device applicable to first to fifth and seventh embodiments of the present technology.

A configuration example of the sensor device 1 is illustrated in FIG. 1. Note that FIG. 1 also illustrates a processor 11 and an external sensor 12 as external devices that perform data communication with the sensor device 1. The processor 11 is assumed to be any processor that is communicatively connected to the sensor device 1.

As hardware, the sensor device 1 includes an image sensor device, a storage region such as a dynamic random access memory (DRAM), and a component as an artificial intelligence (AI) function processor. Then, these three parts are configured as an integrated device by a three-layer stacked structure, one-layer so-called flat configuration, or a two-layer (for example, the DRAM and the AI function processor are in the same layer) stacked structure, for example.

As illustrated in FIG. 1, the sensor device 1 includes an array sensor 2, an analog to digital converter (ADC)/pixel selector 3, a buffer 4, a logic unit 5, a memory 6, an interface unit 7, and a calculation unit 8.

The ADC/pixel selector 3, the buffer 4, and the logic unit 5 are an example of a signal processing unit 30 that processes a detection signal obtained by the array sensor 2 to output the detection signal to the outside.

The array sensor 2 includes a detection element that is a visible light or non-visible imaging element, and has a plurality of the imaging elements arrayed in a one dimensional or two dimensional manner. For example, a large number of imaging elements is two-dimensionally arrayed in a row direction and in a column direction, and a two-dimensional image signal is output by photoelectric conversion in each imaging element.

Note that, in the following description, the array sensor 2 is assumed to output a two-dimensional image signal as an image sensor, but the array sensor 2 in the sensor device 1 may be configured as a sensor array module in which sound wave detection elements are arrayed, a sensor array module in which tactile information detection elements are arrayed, or the like.

The ADC/pixel selector 3 digitizes an electrical signal photoelectrically converted by the array sensor 2 and outputs the image signal as digital data.

Furthermore, by having a pixel selection function for pixels (imaging elements) of the array sensor 2, the ADC/pixel selector 3 can read the photoelectrically converted signals only from pixels selected in the array sensor 2, digitize the signals, and output the digital data.

That is, the ADC/pixel selector 3 normally digitizes and outputs the photoelectrically converted signal as digital data for all of effective pixels constituting an image of one frame, but also can digitize and output the photoelectrically converted signals of only the selected pixels as digital data.

The ADC/pixel selector 3 reads out the image signal in frame units, and the image signal of each frame is temporarily stored in the buffer 4, read out at appropriate timing, and used for processing by the logic unit 5.

The logic unit 5 performs various types of necessary signal processing (image processing) for each input frame image signal.

For example, the logic unit 5 is assumed to perform image quality adjustment by processing such as color correction, gamma correction, color gradation processing, gain processing, contour enhancement processing, contrast adjustment processing, sharpness adjustment processing, and gray level adjustment processing.

Furthermore, the logic unit 5 is assumed to perform processing of changing a data size, such as data compression processing, resolution conversion, frame rate conversion, aspect ratio conversion, and sampling rate change.

Parameters used for each processing are set for each processing performed by the logic unit 5. For example, there are set values such as color and brightness correction coefficients, a gain value, a compression rate, a frame rate, a resolution, a region to be processed, and a sampling rate. The logic unit 5 performs necessary processing using the parameters set for each processing. In the present embodiment, the calculation unit 8 may set these parameters as described below.

The image signal processed by the logic unit 5 is stored in the memory 6.

The image signal stored in the memory 6 is transmitted by the interface unit 7 to the processor 11 and the like at necessary timing.

Note that the memory 6 is assumed to be a DRAM, a static random access memory (SRAM), a magnetoresistive random access memory (MRAM), or the like.

Note that MRAM is a memory that magnetically stores data, and a memory that uses a tunneling magnetoresistive (TMR) element instead of a magnetic core is known. The TMR element has an extremely thin insulation layer of several atoms sandwiched between magnetic materials, and its electrical resistance changes depending on a direction of magnetization of the magnetic material layer. The direction of magnetization of the TMR element does not change even when power is turned off, resulting in serving as a non-volatile memory. A write current needs to increase as the size becomes finer. Therefore, to make a memory cell finer, an STT-MRAM using a spin torque transfer (STT) method of flowing and writing electrons with the same spin without using a magnetic field is known.

Of course, a storage element other than the aforementioned examples may be used as a specific example of the memory 6.

The processor 11 outside the sensor device 1 performs image analysis and image recognition processing for the image signal transmitted from the sensor device 1 and executes necessary object detection and the like.

The processor 11 can also refer to detection information of the external sensor 12.

Note that it is conceivable that the processor 11 is connected to the sensor device 1 by wired or wireless means.

It is conceivable that the processor 11 is provided in a housing common to the sensor device 1. For example, the processor 11 is assumed to be a processor in an imaging device or a terminal device equipped with the sensor device 1.

Alternatively, the processor 11 may be provided in a device separate from the sensor device 1. For example, the processor 11 may be built in an information processing device, a terminal device, an image editing device, a monitor device, a communication device, or the like connected to the imaging device or the terminal device equipped with the sensor device 1 by a cable, wireless communication, or the like.

Moreover, the processor 11 may be, for example, a processor in a cloud computing system, and may perform network communication with the sensor device 1 or a device incorporating the sensor device 1.

The calculation unit 8 is configured as, for example, one AI processor. Then, as an executable calculation function, the calculation unit 8 includes a keyframe selection unit 81, an object region recognition unit 82, a class identification unit 83, and a parameter selection unit 84, as illustrated in FIG. 1. Note that these calculation functions may be configured by a plurality of processors.

The keyframe selection unit 81 performs processing of selecting a keyframe within a frame of the image signal as a moving image according to a predetermined algorithm or instruction.

Furthermore, the keyframe selection unit 81 may perform processing of switching a mode related to the frame rate (idling mode and normal mode in the fifth embodiment).

The object region recognition unit 82 detects a region of an object that is a candidate to be detected and performs processing of recognizing a region (bounding box) surrounding an object to be detected in an image (frame) of the object to be detected, for a frame of the image signal photoelectrically converted by the array sensor 2 and read by the ADC/pixel selector 3.

The object detected from the image signal is an object that can be a detection target for the purpose of recognition from an image. What kind of object is the object to be detected depends on the purpose of detection of the sensor device 1 and the processor 11, processing capacity, a type of application, or the like, but there is a possibility that any object can be the object to be detected referred to here. For example, any object such as a person, animal, moving object (automobile, bicycle, aircraft, or the like), natural object (vegetable, plant, or the like), industrial product/part, building, facility, mountain, sea, river, star, sun, cloud, or the like can correspond to the object to be detected although the above are merely examples.

Furthermore, as will be described in the second embodiment, the object region recognition unit 82 may perform processing of calculating a region of interest (ROI) as region information indicating a region (region of interest) to be processed, control the ADC/pixel selector 3 based on the ROI, and the like, on the basis of the bounding box.

The class identification unit 83 classifies the object detected by the object region recognition unit 82 into a class.

The class is a category of the object recognized using image recognition. The object to be detected is classified into, for example, "person", "automobile", "airplane", "ship", "truck", "bird", "cat", "dog", "deer", "frog", or "horse".

As will be described in the first embodiment, the parameter selection unit 84 stores the parameters for signal processing according to each class, and selects corresponding one or a plurality of parameters using the class or the bounding box of the detected object identified by the class identification unit 83, for example. Then, the parameter selection unit 84 sets the one or the plurality of parameters in the logic unit 5.

Furthermore, the parameter selection unit 84 stores a template of an advanced ROI (AROI) calculated by class in advance on the basis of the class for calculating the ROI on the basis of the bounding box, as in the third embodiment, and may perform processing of selecting the template.

Furthermore, the parameter selection unit 84 may perform processing of storing the set values of the idling mode and the normal mode in the fifth embodiment, selecting the mode on the basis of the object detection, and controlling the signal processing unit 30.

These functions by the calculation unit 8 are processes not normally performed in the array sensor, and in the present embodiment, the object detection, class recognition, and control based on these processes are executed in the array sensor. Thereby, the image signal to be supplied to the processor 11 is made appropriate according to the detection purpose and the data amount is reduced without deteriorating detection performance.

Note that the interface unit 7 can output image signal to the processer 11, and also output information of the object detected in the calculation unit 8, information of the class, the number of detected objects, and information of the selected parameters as metadata together with the image signal, for example, or can output the aforementioned information independently of the image signal, to the processor 11. Furthermore, the interface unit 7 can also output only the information of class, for example.

Furthermore, it is conceivable that the processor 11 side instructs the interface unit 7 on necessary information, and the interface unit 7 outputs the corresponding information, for example.

<2. First Embodiment: Classified Image Adaptation>

Classified image adaptation processing will be described as processing of a first embodiment executable by the sensor device 1 having the configuration in FIG. 1.

The accuracy of image recognition varies depending on image quality adjustment. For example, the accuracy of image recognition by deep learning is improved by adjusting the image quality.

Then, the image quality desirable for image recognition, that is, the image quality at which the accuracy of object detection is high, may not necessarily be the image quality that a person perceives beautiful.

Figure 2:
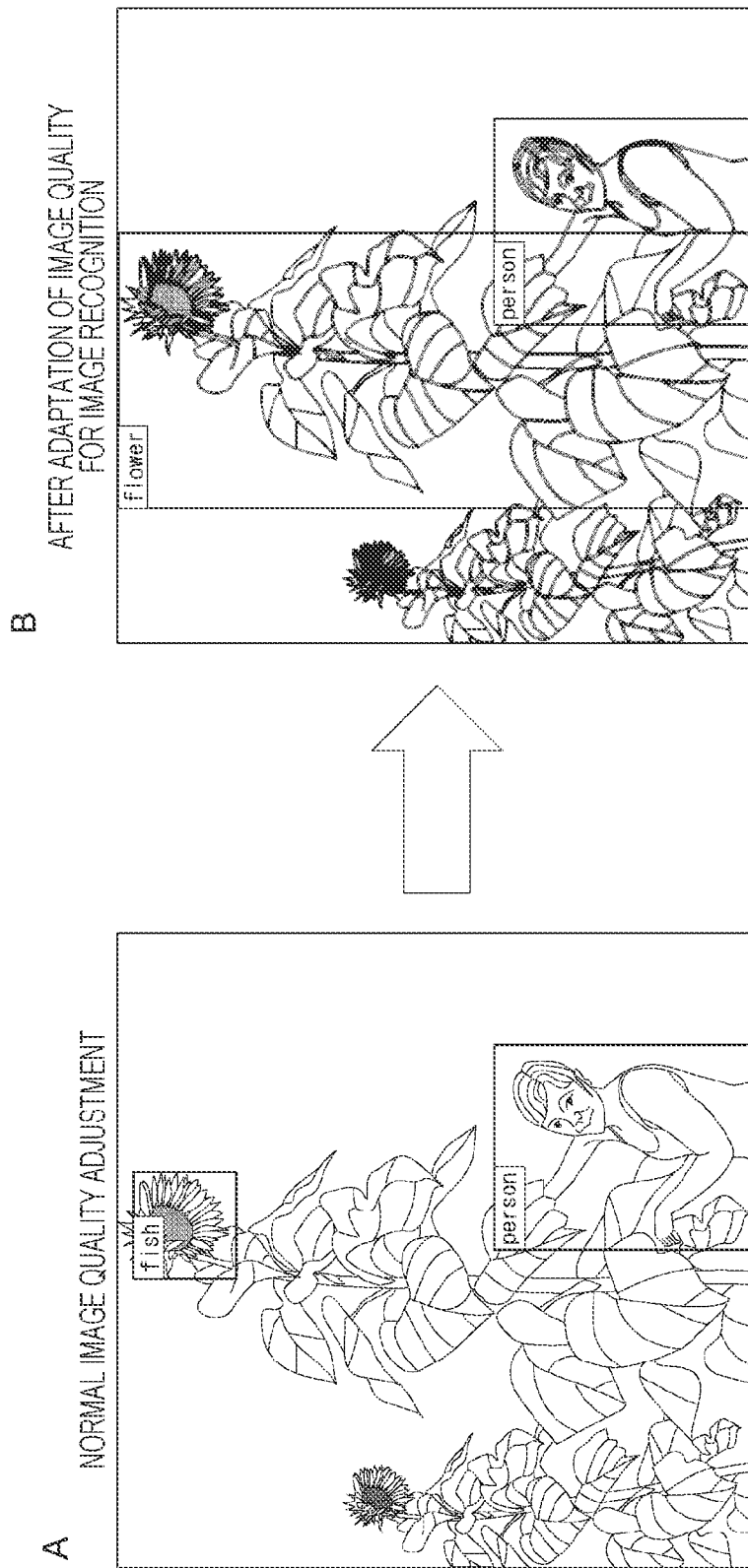
FIG. 2 is an explanatory diagram of a relationship between image recognition accuracy and image quality.

For example, FIG. 2A illustrates an example of an image that a person perceives high quality, while FIG. 2B is an image that a person perceives that the image quality is slightly deteriorated due to, for example, reduction in the number of gradations.

However, as an object detection result in a case where the image in FIG. 2A is analyzed by a neural network, the flower is erroneously determined as fish, while the flower is correctly determined as flower in the image in FIG. 2B.

As can be seen from this example, to improve the accuracy of image recognition, it is desirable to perform image quality adjustment different from image quality adjustment based on human aesthetics.

Furthermore, the image quality suitable for such object detection is not the image quality adjusted by uniform parameters, and differs depending on the object to be detected. For example, a desired image quality adjustment state differs between a case of detecting a person and a case of detecting an automobile. That is, values of desirable parameters for image quality adjustment differ depending on the detection target.

Therefore, as the classified image adaptation processing, appropriate parameters (image quality adjustment values) are stored for each class of an object that can be targeted. Then, for the image captured by the array sensor 2, object detection and class identification of a detected object are performed, the parameters are selected according to the identified class and set in the logic unit 5, and the processing using the parameters is performed in the logic unit 5.

Figure 3:
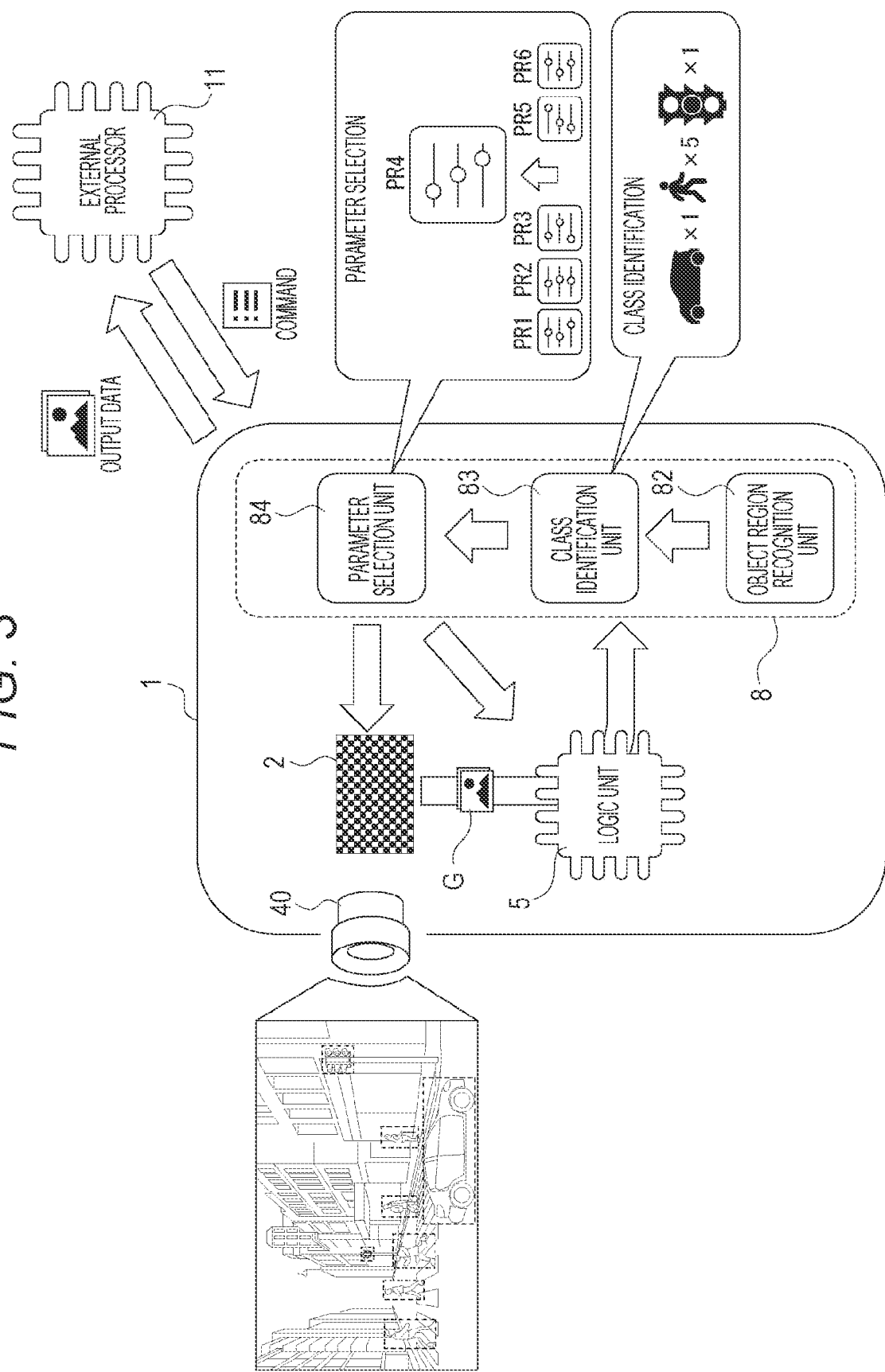
FIG. 3 is an explanatory diagram of an outline of classified image adaptation processing according to the first embodiment.

FIG. 3 illustrates an outline of such classified image adaptation processing. Note that FIG. 3 is an extract of a part of the configuration in FIG. 1 for describing the outline.

In the sensor device 1, object light is focused on the array sensor 2 by an imaging optical system 40, and an image is captured. An obtained image signal G is processed by the logic unit 5, but is also supplied to the calculation unit 8.

In the calculation unit 8, the object region recognition unit 82 detects a candidate object and performs processing of recognizing an object region. The object region recognition unit 82 also calculates the bounding box for the required object region.

Furthermore, in the calculation unit 8, the class identification unit 83 performs class identification for the detected object. In a case where a plurality of objects or a plurality of types of objects is detected, the class identification is performed for each of the plurality of objects, and the objects are classified into classes. For example, in the case in FIG. 3, the class identification and classification are performed such that one object in the class "car", five objects in the class "person", and one object in the class "traffic light".

The information of the classes and the information of the bounding box are provided to the parameter selection unit 84, and the parameter selection unit 84 selects one parameter set using the information of the classes from among stored parameter sets PR1, PR2, and the like. FIG. 3 illustrates a state in which the parameter set PR4 has been selected, for example.

Note that the parameter set stores the values of a plurality of parameters used in the processing of the logic unit 5, such as the gain set value, the color correction coefficient, the number of gradations, the compression rate, and the frame rate, as one set.

The selected parameter set PR4 is set in the logic unit 5. The logic unit 5 performs various types of signal processing for the image signal G, using the parameters indicated by the parameter set PR4.

The array sensor outputs all or any of the output data (image signal, class, number of objects, presence or absence of a target class, and the like) in response to a request of the processor 11.

Furthermore, the processor 11 can transmit various instructions to the sensor device 1.

In this way, the sensor device 1 performs the classified image adaptation (parameter selection according to a target genre from the object detection) that the calculation unit 8 has the class identification function (object categorization function) based on object detection, and the parameters of the logic unit 5 are adaptively set according to the output of the class identification unit.

Regarding the parameter set, appropriate parameters (image quality set values) are generated and stored for each class in advance by pre-learning by deep learning.

For example, in a case of generating the parameter set of the class "person", as illustrated in FIG. 4A, deep learning is performed using a large number of human images as training data SD, and the parameter set PR1 with the highest image recognition rate in the viewpoint of recognition of a person is generated.

Similarly, for each of the other classes, the parameter sets PR2, PR3, and the like with the highest image recognition rate are generated using the deep learning.

Then, as illustrated in FIG. 4B, the parameter sets PR1, PR2, PR3, and the like corresponding to the generated classes are stored so that the parameter selection unit 84 can select them.

Figure 5:
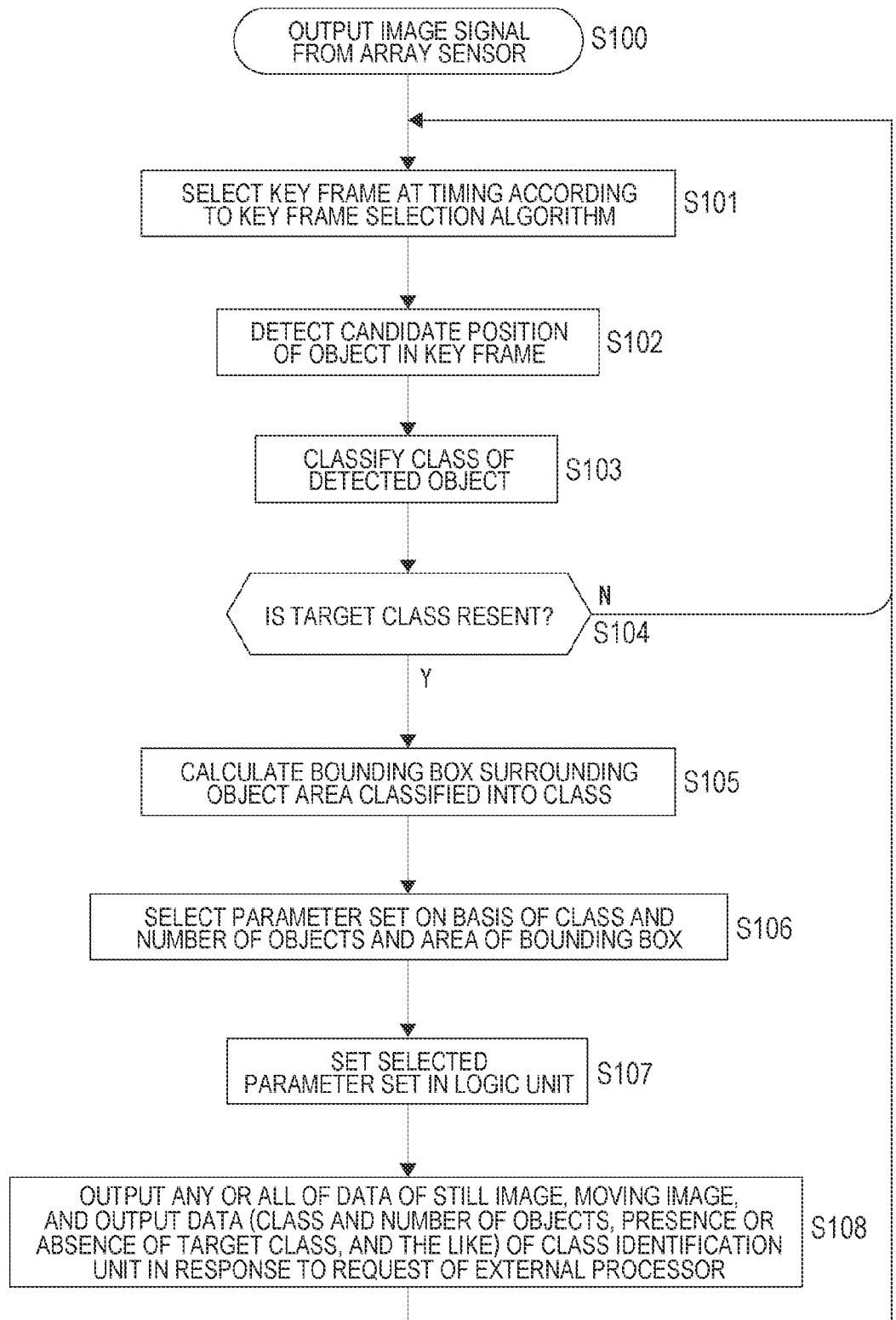
FIG. 5 is a flowchart of the classified image adaptation processing according to the first embodiment.
Figure 6:
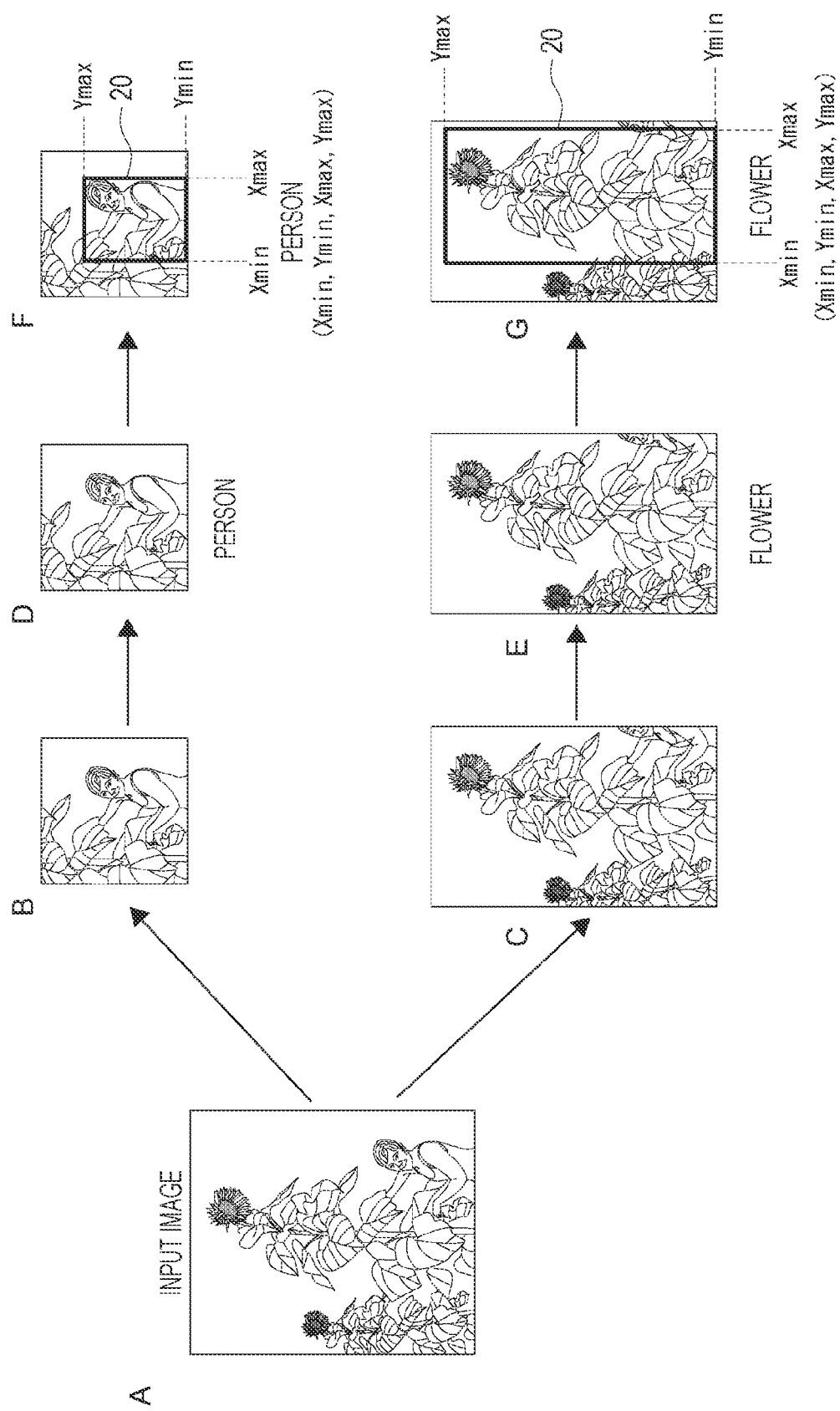
FIG. 6 is an explanatory diagram of an object detection process according to the first embodiment.

FIG. 5 illustrates a specific example of the classified image adaptation processing in the sensor device 1. The specific example will be sequentially described with reference to FIG. 6.

FIG. 5 illustrates processing executed in the sensor device 1 (mainly calculation unit 8) after output of the image signal in frame units from the array sensor 2 is started as step S100.

In FIG. 5, the processing of the calculation unit 8 is processing executed by the functions as the keyframe selection unit 81, the object region recognition unit 82, the class identification unit 83, and the parameter selection unit 84 illustrated in FIG. 1. Note that this similarly applies to FIGS. 9, 14, 16, and 18, which will be described below.

In step S101, the calculation unit 8 (keyframe selection unit 81) performs processing of selecting a keyframe at timing according to a keyframe selection algorithm.

The sensor device 1 selects the keyframe from the image signal in frame units as a pixel array output signal of the array sensor 2 and performs image recognition, thereby recognizing the class to be captured. Keyframe selection is performed by a keyframe selection algorithm, thereby a still image (a certain one frame) is selected.

An example of a keyframe selection algorithm is given.

First, there is a method of selecting one frame at specified time intervals. For example, one frame is selected as a keyframe at intervals of 30 seconds. Of course, 30 seconds is an example.

Furthermore, it is also conceivable to select a keyframe as timing by a command from the outside (processor 11 or the like) of the sensor device 1. For example, it is assumed that the sensor device 1 responds to an instruction from a device side on which the sensor device 1 is mounted. For example, in a case where the sensor device 1 is mounted on an automobile, and the keyframe is selected at timing when the automobile has started traveling from a stopped state in a parking lot.

Furthermore, the keyframe selection method may be changed depending on a situation. For example, in the case where the sensor device 1 is mounted on an automobile, the keyframe interval is changed during stopped, during normal traveling, and during high-speed traveling.

When the keyframe is selected, the calculation unit 8 (object region recognition unit 82) detects a candidate position of an object in the keyframe in step S102.

That is, the calculation unit 8 searches for a candidate object to be detected in the keyframe image, and obtains one or a plurality of candidate positions (position coordinates in the image).

For example, it is assumed that an input image in FIG. 6A is selected as the keyframe. The calculation unit 8 detects a portion that seems to be an object to be detected in the image. For example, regions in FIGS. 6B and 6C are the portions that seem to be objects to be detected. These portions are the candidate objects.

In step S103 in FIG. 5, the calculation unit 8 (class identification unit 83) classifies the detected object into a class. That is, the calculation unit 8 identifies and classifies the class for each candidate object.

As described above, the class is a category of an object recognized using image recognition.

For example, as illustrated in FIGS. 6D and 6E, the class identification such as "person" and "flower" is performed.

In step S104 in FIG. 5, the calculation unit 8 confirms whether or not a target class is present in the class obtained as a class identification result.

The target class is a class specially set by processor 11 among the classes. For example, in a case where the target class is set to "person", the sensor device 1 shall enter a process specified when recognizing a person.

Note that it is desirable to be able to specify a plurality of target classes.

For example, in a case where "person" and "flower" are the target classes, and "person" or "flower" is present in the classes identified in step S103, the calculation unit 8 moves the processing from step S104 to S105.

On the other hand, in a case where the target class is not present, the calculation unit 8 returns to step S101 and selects the next keyframe.

In the case where the processing proceeds to step S105 due to the presence of the target class, the calculation unit 8 (object region recognition unit 82) calculates accurate position coordinates (bounding box) surrounding an object area classified into the class.

FIGS. 6F and 6G illustrate a bounding box 20. The bounding box 20 is defined by a minimum coordinate value Xmin and a maximum coordinate value Xmax as a region range on an X axis, and a minimum coordinate value Ymin and a maximum coordinate value Ymax as a region range on a Y axis.

In step S106 in FIG. 5, the calculation unit 8 (parameter selection unit 84) selects a parameter set on the basis of the class and the number of objects, and the area of the bounding box 20.

For example, in a case where one target class is present, the calculation unit 8 selects the parameter set corresponding to that class.

In a case where objects of a plurality of types of target classes are present on a screen, the following examples are conceivable.

For example, it is conceivable to select the parameter set corresponding to the class with the largest number of objects among the classes.

Alternatively, in the case where objects of a plurality of types of target classes are present on the screen, it is conceivable to select the parameter set corresponding to the class of the object having the largest area of the bounding box 20.

Alternatively, in the case where objects of a plurality of types of target classes are present on the screen, it is conceivable to select the parameter set corresponding to the class with the largest total area of the bounding box 20 for each class.

Alternatively, in the case where objects of a plurality of types of target classes are present on the screen, it is conceivable to obtain the class with the highest priority from the number of objects and the total area (or the maximum value) of the bounding box 20 for each class and select the parameter set corresponding to the class.

Of course, there are various other parameter set selection methods, but in any case, it is only required to select the parameter set according to the class of a dominant object or an object to be preferentially detected on the screen.

In step S107, the calculation unit 8 (parameter selection unit 84) performs processing of setting the selected parameter set in the logic unit 5.

Thereby, the logic unit 5 performs various types of image processing for the sequentially input image signals of the frames, using the set parameter set.

Information of the processed image signal, the set parameters, the identified classes, and the like are temporarily stored in the DRAM 6.

In step S108, the sensor device 1 outputs all or at least one of the information of the image signals (still image or moving image), class identification information (classes, the number of objects, the presence or absence of the target class, and the like), used parameter sets, and the like in response to the request of the processor 11.

That is, any of the information temporarily stored in the DRAM 6 is read out and transmitted by the interface unit 7 in response to the request of the processor 11.

Note that the processing in step S108 may be controlled by the calculation unit 8, or may be executed by the processor 11 accessing the DRAM 6 via the interface unit 7. In a case where the calculation unit 8 does not control the interface unit 7, the processing of the calculation unit 8 returns to step S101 after step S107.

Through the above processing, the processor 11 is supplied with the image signal to which the parameters have been set according to the presence of the target class as an object included in the image. The image signal is an image signal to which the image processing suitable for detecting the object of the target class has been performed.

Furthermore, when the information of the detected classes (target classes) and the number of objects is provided to the processor 11, the information will be useful information for the object detection processing in the processor 11.

As a result, the processor 11 can perform highly accurate object detection.

Note that it is also possible to simply set the class inside the sensor device 1 and recognize the class in more detail outside. For example, face recognition and license plate recognition are not executed by the sensor device 1 but can be executed by the processor 11.

Furthermore, in the processing example in FIG. 5, the portion that seems to be an object is detected in step S102 (FIGS. 6B and 6C), the class is identified in step S103 (FIGS. 6D and 6E), and then the bounding box 20 is set in step S105 (FIG. 6F and FIG. 6G). However, the processing is not limited to this procedure. For example, when a portion that seems to be an object is detected at the stage of step S102, the bounding box 20 may be set and then the class may be identified in step S103, and when the target class is present, the processing may proceed from step S104 to step S106.

<3. Second Embodiment: Area-Clipping>

Area-clipping will be described as processing of a second embodiment executable by a sensor device 1 having the configuration illustrated in FIG. 1.

Regarding an image signal detected by an array sensor 2, it is conceivable to transmit information of all of pixels of frames to a processor 11 to execute image recognition.

However, when the information of all the pixels of all frames is transferred to the processor 11 and an object is detected by the processor 11, the amount of transferred information remarkably increases and transfer time is required, especially, with higher definition of a captured image by the array sensor 2. Furthermore, in a case of cloud transmission, an increase in communication volume significantly affects communication cost and time. Moreover, there is a concern that a burden of storage capacity in the processor 11 and the cloud will increase, an analysis processing load and processing time will also increase, and object detection performance will deteriorate.

Therefore, in the second embodiment, after recognizing a necessary object in an image of a certain frame, the image signal is acquired and transferred roughly at a pixel level of a region of the object from the next frame onward, and pixels of the other region are made absent as information, to improve efficiency of processing.

FIG. 7 illustrates an outline.

FIG. 7A illustrates an image of a certain frame F1. In a case where "person" is set as an object to be detected, a region of a person is detected in the image of the frame F1. The region where a person is detected is set as a ROI 21 that is a region of interest.

In subsequent frames F2, F3, . . . , and Fn, only the pixels in the region set as the ROI 21 are read from the array sensor 2. The image is an image including only information of the ROI 21 portions as illustrated in FIG. 7B.

Then, an analysis in a calculation unit 8 is performed on the basis of the image signal including such partial pixel information, or the image is transferred to the processor 11 and an image analysis is performed.

Specifically, as schematically illustrated in FIG. 8A, among the image signals obtained by the array sensor 2, the certain frame F1 obtained at a ratio of one in N frames is analyzed as an image including information of all the effective pixels. Then, the calculation unit 8 scans the entire screen to detect presence or absence and position of a target object. Then, the ROI 21 is set.

Figure 8:
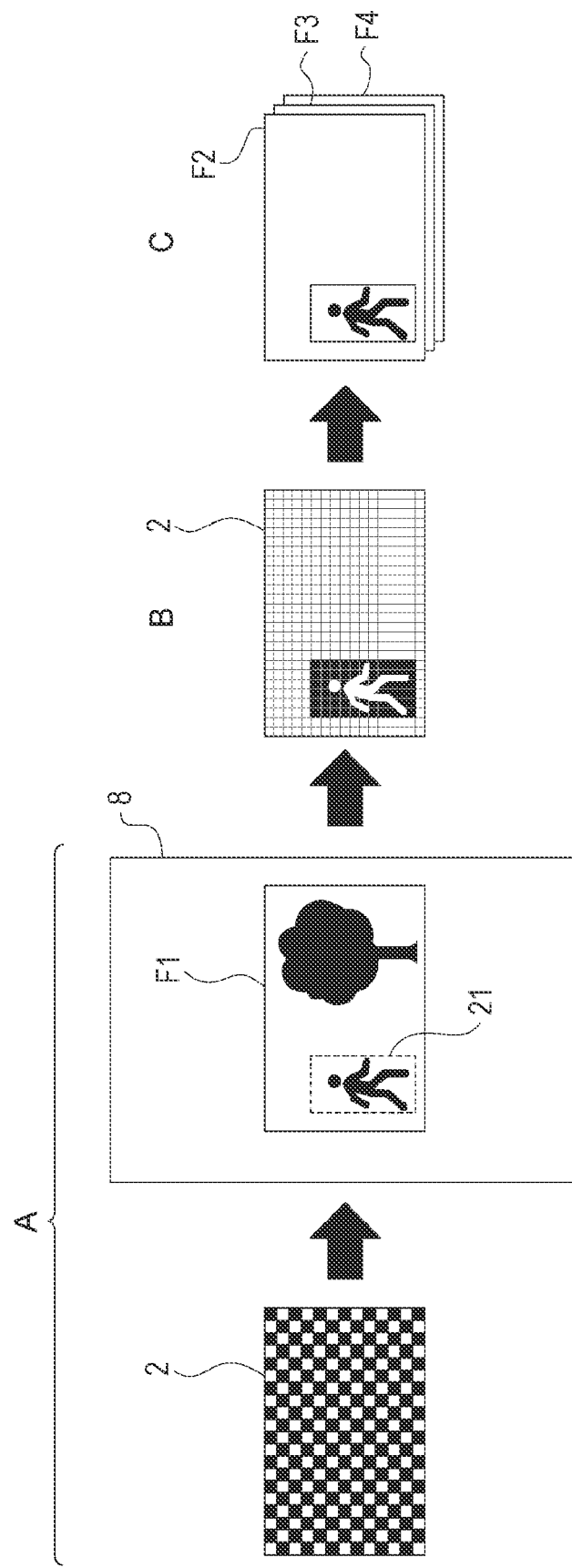
FIG. 8 is an explanatory diagram of an outline of an area-clipping analysis according to the second embodiment.

When acquiring the subsequent frame F2, the image signal in which only pixels of the ROI 21 set as a target area have been AD-converted is acquired, as in FIG. 8B. Note that, in FIG. 8, each square separated by the grid indicates a pixel.

In this way, for example, only one frame in every N frames is scanned in full screen to detect the target object, and in the subsequent frames F2, F3, F4, and the like, only the detection area of the object in the previous frame is analyzed, as in FIG. 8C.

By performing this process, the amount of analysis data and the amount of communication data are reduced without degrading the accuracy of object detection that is a target of an application, and power consumption of the sensor device 1 is reduced and the image analysis regarding the object detection in the entire system in which the sensor device 1 is mounted is speeded up.

Figure 9:
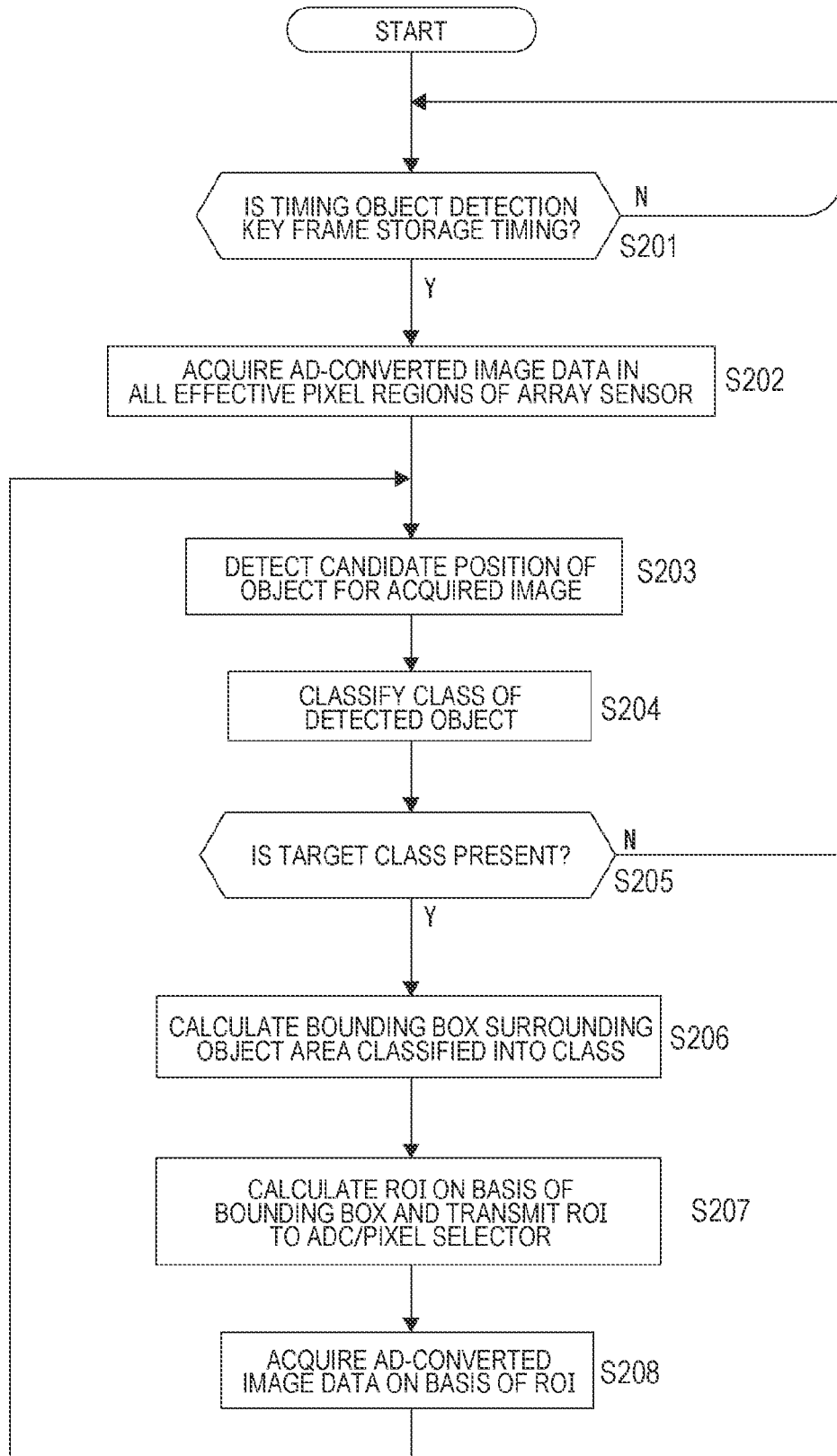
FIG. 9 is a flowchart of the area-clipping analysis according to the second embodiment.

FIG. 9 illustrates a processing example of the calculation unit 8 of the sensor device 1 as the area-clipping analysis. The processing will be sequentially described with reference to FIG. 10.

In step S201, the calculation unit 8 (keyframe selection unit 81) determines whether or not it is object detection keyframe recording timing.

The object detection keyframe recording timing means timing at which the information is acquired in the entire effective pixel region of the array sensor 2 for object detection.

The object detection keyframe recording timing may be determined by, for example, a command from the outside of the sensor device 1 such as the processor 11. For example, it is assumed to determine the object detection keyframe recording timing at intervals of 60 seconds in response to an instruction of 60 seconds.

When the object detection keyframe recording timing has arrived, the calculation unit 8 proceeds to step S202 and acquires AD-converted image data in the entire effective pixel region of the array sensor 2. For example, an ADC/pixel selector 3 outputs the image signal of one frame from the array sensor 2 for the entire effective pixel region.

In step S203, the calculation unit 8 (object region recognition unit 82) detects a candidate position of an object in the acquired image.

As illustrated in FIG. 10A, for example, when a frame F1 is selected as an object detection keyframe, the calculation unit 8 (object region recognition unit 82) detects candidate regions 23 of objects in the image of the frame F1. In this case, regions including images of "person" and "tree" are detected as the candidate regions 23.

In step S204 in FIG. 9, the calculation unit 8 (class identification unit 83) classifies the objects detected as candidates into classes.

For example, as illustrated in FIG. 10B, class identification such as "person" and "tree" is performed for the objects in the candidate regions 23.

In step S205 in FIG. 9, the calculation unit 8 confirms whether or not a target class is present in the classes obtained as a class identification result.

For example, in a case where "person" is the target class, the target class is present as the identified class as illustrated in FIG. 10B. In such a case, the calculation unit 8 proceeds from step S205 to step S206 in FIG. 9.

On the other hand, in a case where the target class is not present, the calculation unit 8 returns to step S201, and waits for the next object detection keyframe recording timing.

In step S206 in FIG. 9, the calculation unit 8 (object region recognition unit 82) calculates a bounding box 20 with accurate position coordinates surrounding the area of the object classified into the target class.

For example, FIG. 10C illustrates an example of the bounding box 20 for the image of the person as the target class. That is, the bounding box 20 is calculated as a more accurate region of the object corresponding to the target class.

In step S207 in FIG. 9, the calculation unit 8 (object region recognition unit 82) calculates an ROI on the basis of the bounding box 20.

FIG. 10D illustrates a ROI 21 and the bounding box 20. The ROI 21 is calculated by enlarging (ax×by) vertical and horizontal sizes (x×y) of the bounding box 20. Enlargement scales a and b can be separately set in vertical and horizontal directions. Although an enlargement ratio may be fixed, it is also conceivable that the enlargement ratio is specified from the outside of the sensor device 1 (for example, the processor 11).

The calculation unit 8 (object region recognition unit 82) transmits the ROI thus calculated to the ADC/pixel selector 3.

In response to the transmission of the ROI, the ADC/pixel selector 3 AD-converts and outputs only pixels corresponding to the ROI 21 in the array sensor 2.

In step S208 in FIG. 9, the calculation unit 8 acquires image data of the next frame including information of only the pixels in the ROI 21. Then, the calculation unit 8 performs processing in steps S203 and S204 for the acquired frame.

Figure 10:
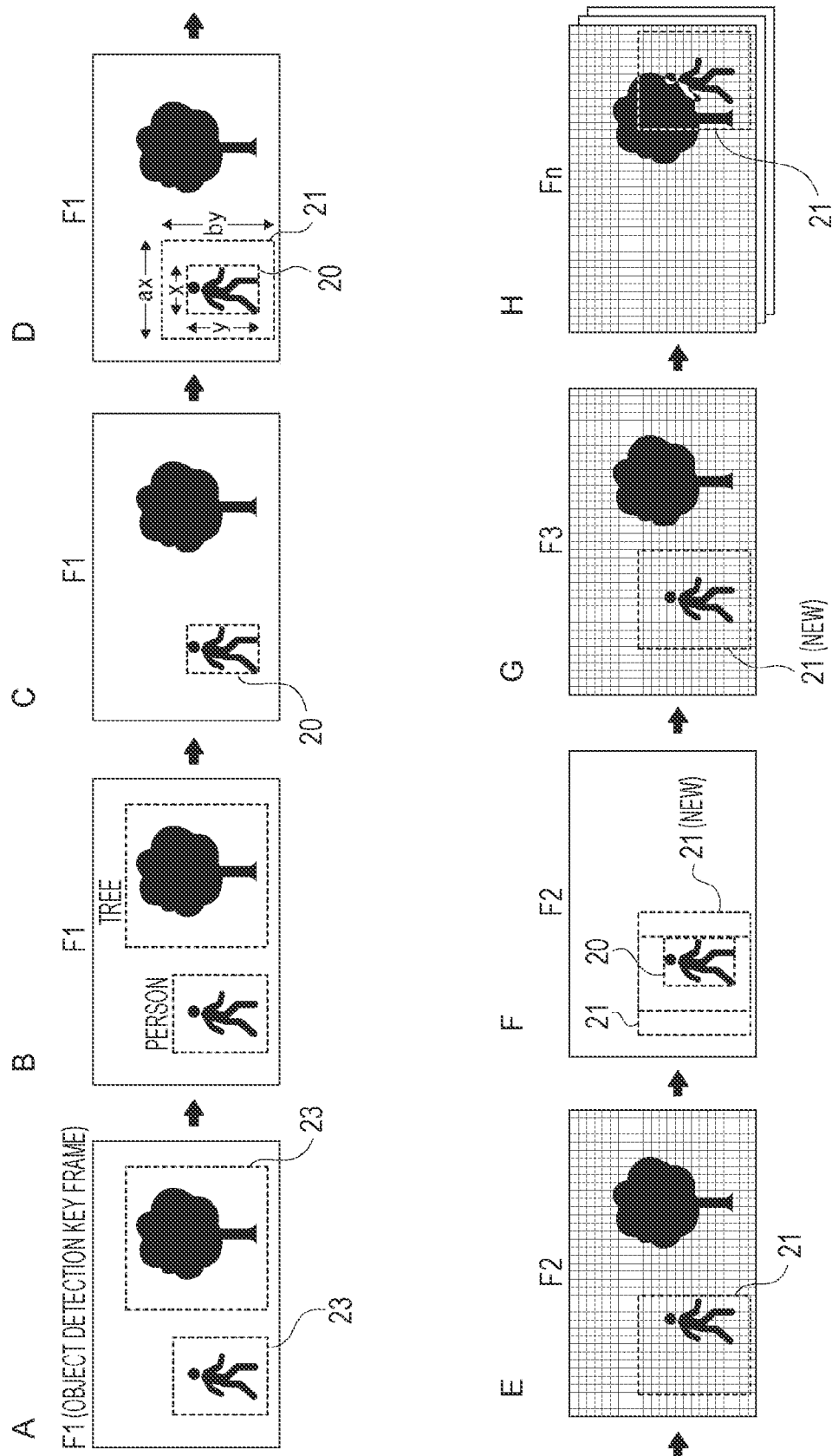
FIG. 10 is an explanatory diagram of calculation of a region of interest (ROI) from a bounding box according to the second embodiment.

FIG. 10E schematically illustrates that AD conversion is performed only for the pixels in the ROI 21 among all the effective pixels (each square separated by the grid indicate a pixel in FIG. 10).

By such AD conversion, an image of a frame F2 having the information of only the portion of the ROI 21 as illustrated in FIG. 10F is acquired by the calculation unit 8.

Then, in steps S203 and S204 in FIG. 9, the calculation unit 8 detects the object candidate position and classifies the image of the frame F2. For example, in the case of FIG. 10F, since a person is detected, the processing proceeds to steps S206 and S207, a new bounding box 20 is calculated and a new ROI 21 based on the bounding box 20 is calculated. FIG. 10F illustrates the newly obtained ROI as "ROI 21 (NEW)".

Note that the bounding box 20 is expanded and the ROI 21 is generated to cope with movement of the object as an object (or a change in an object direction of an imaging device).

For example, the position of the person in the frame F2 in FIG. 10E changes to the right from the position of the person in frame F1 in FIG. 10A. However, since the ROI 21 is set wider, a possibility of acquiring the image of the target person in the frame F2 is increased even only with the pixels in the ROI 21.

Note that the ROI 21 expands the bounding box 20 so that the target object can be detected even in the next frame, but it is conceivable that the enlargement scales a and b of when expanding (ax×by) the vertical and horizontal sizes (x×y) can correspond to a frame rate.

For example, when the frame rate is low, the time between frames becomes long and the amount of movement of an object such as a person becomes large, so it is conceivable to expand the ROI 21 than when the frame rate is high.

Furthermore, the ROI 21 is recalculated for each frame (the new ROI 21 (NEW) is generated) to cope with the movement of the object as an object (or the change in an object direction of an imaging device).

Due to the movement of the person, the person is detected at a right position in the ROI 21, as compared with the image in FIG. 10F. Therefore, the ROI is updated to follow the movement of the person, as in the ROI 21 (NEW), by newly calculating the bounding box 20 surrounding the region of the person and obtaining the ROI 21.

In step S207, the calculation unit 8 transmits the new ROI 21 (NEW) to the ADC/pixel selector 3. As a result, in the next frame, only the pixels in the new ROI 21 (NEW) are AD-converted (see FIG. 10G).

Similarly, in step S208, the calculation unit 8 acquires the image signal of only the information of the pixels in the ROI 21 (NEW) and performs the processing of step S203 and the subsequent steps.

Such processing is repeated until it is determined that the target class is not present in step S205. Therefore, for example, since the position of the ROI 21 is updated according to the person as an object, even if the position of the person is moved, as in a frame Fn in FIG. 10H, for example, the image signal of the frame Fn including the information of the region of the person can be acquired on the basis of the ROI 21 calculated in the previous frame F(n−1) (not illustrated).

If the detected person is out of the frame and becomes unable to be detected, the target class becomes unable to be acquired. Therefore, the calculation unit 8 returns from step S205 to S201 and waits for the next object detection keyframe recording timing.

By performing the area-clipping analysis processing as described above, the image signal of the keyframe at the object detection keyframe recording timing includes the data of all the effective pixels, whereas in the subsequent frames, only the pixels necessary for object detection are included in the image signal in which the data amount is extremely reduced, whereby the image suitable for detecting the target object can be obtained. Moreover, reduction in the power consumption due to reduction in the number of pixels read in the array sensor 2 can be implemented.

Note that, in the case of the processing example in FIG. 9, the ROI 21 is set for each object of one target class, and the region of the ROI 21 corresponding to each object is read from the array sensor 2, which is limited to the object detected in the object detection keyframe. For example, even if a new object (for example, a person) appears as an object at the timing of frames F2 and F3, the image of that person may not be acquired.

This is not a problem if the purpose of use is to track and analyze the object found in the object detection keyframe at certain time intervals, for example. However, in a case of a monitoring system for monitoring all of persons appearing as objects, for example, objects appearing in frames other than the object detection keyframe are desired to be detected.

Therefore, for example, even if the detection of the object of the target class continues (that is, even if the determination of "YES" continues in step S205), it is conceivable to always return to step S202 at predetermined time intervals and acquire the image signals of all the effective pixels.

It is also favorable that the time interval for acquiring the image signals of all the effective pixels can be specified from the processor 11 or the like.

Alternatively, it is also conceivable to always set a peripheral edge of an image as an AD conversion target region separately from the ROI 21, and detect a new object when the new object comes in the frame as an object, and set the ROI 21 for the new object.

An example in which the ROI 21 is set to a rectangular region by expanding the bounding box 20 has been described. However, the ROI 21 is not limited to the rectangular region.

The ROI 21 may be calculated from the area of the object of that target class using, for example, semantic segmentation, that is, object area detection at the pixel level.

Figure 11:
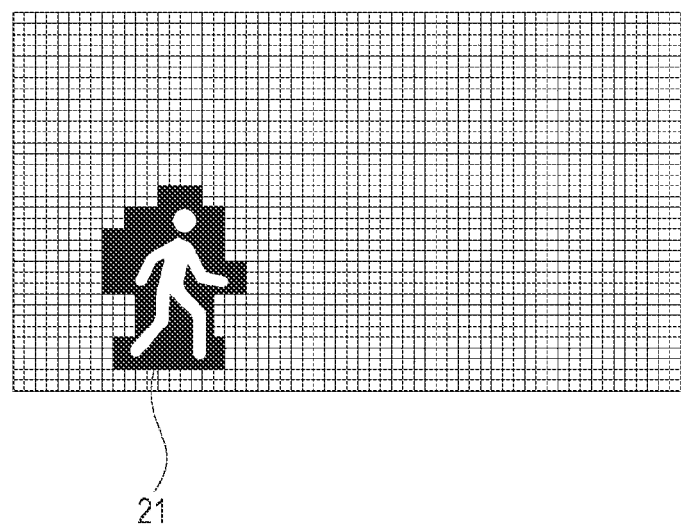
FIG. 11 is an explanatory diagram of another example of a ROI according to the second embodiment.

FIG. 11 illustrates the ROI 21 based on semantic segmentation. This is an example in which a non-rectangular ROI 21 is set by expanding the pixel region as the object (for example, a person).

For example, there are some cases where some portions are not included in the rectangular ROI 21 or the rectangular ROI 21 is too large, such as a track with protrusions, or a person riding a bicycle. If the non-rectangular ROI 21 is generated according to the object position at the pixel level, the possibility of obtaining the ROI 21 that achieve both the reduction in the data amount and acquisition of necessary information can be increased.

Note that, by executing the area-clipping of the second embodiment in combination with the classified image adaptation processing of the first embodiment, the effects of reducing the data amount and improving the detection accuracy can be more effectively obtained.

<4. Third Embodiment: Area-Clipping Using AROI>

Area-clipping using an advanced ROI (also written as "AROI") will be described as processing of a third embodiment executable by a sensor device 1 having the configuration illustrated in FIG. 1.

The AROI is an ROI set using a template set according to a class.

An array sensor 2 (image sensor) consumes a largest amount of power in photoelectric conversion. Therefore, to reduce power consumption, it is desirable to reduce the number of pixels to be photoelectrically converted as much as possible.

Furthermore, since an image signal obtained by the array sensor 2 is for image analysis and is not viewed by a person, an image does not need to be visible and recognizable by a person or a clear image. In other words, an image from which an object can be accurately detected is important.

For example, in the second embodiment, the class identification is performed for the detected object. If the class identification is performed in this way, a minimum area for recognition according to the class is only required to set as the ROI. Therefore, an AROI 22 as illustrated in FIGS. 12 and 13 is set.

Figure 12:
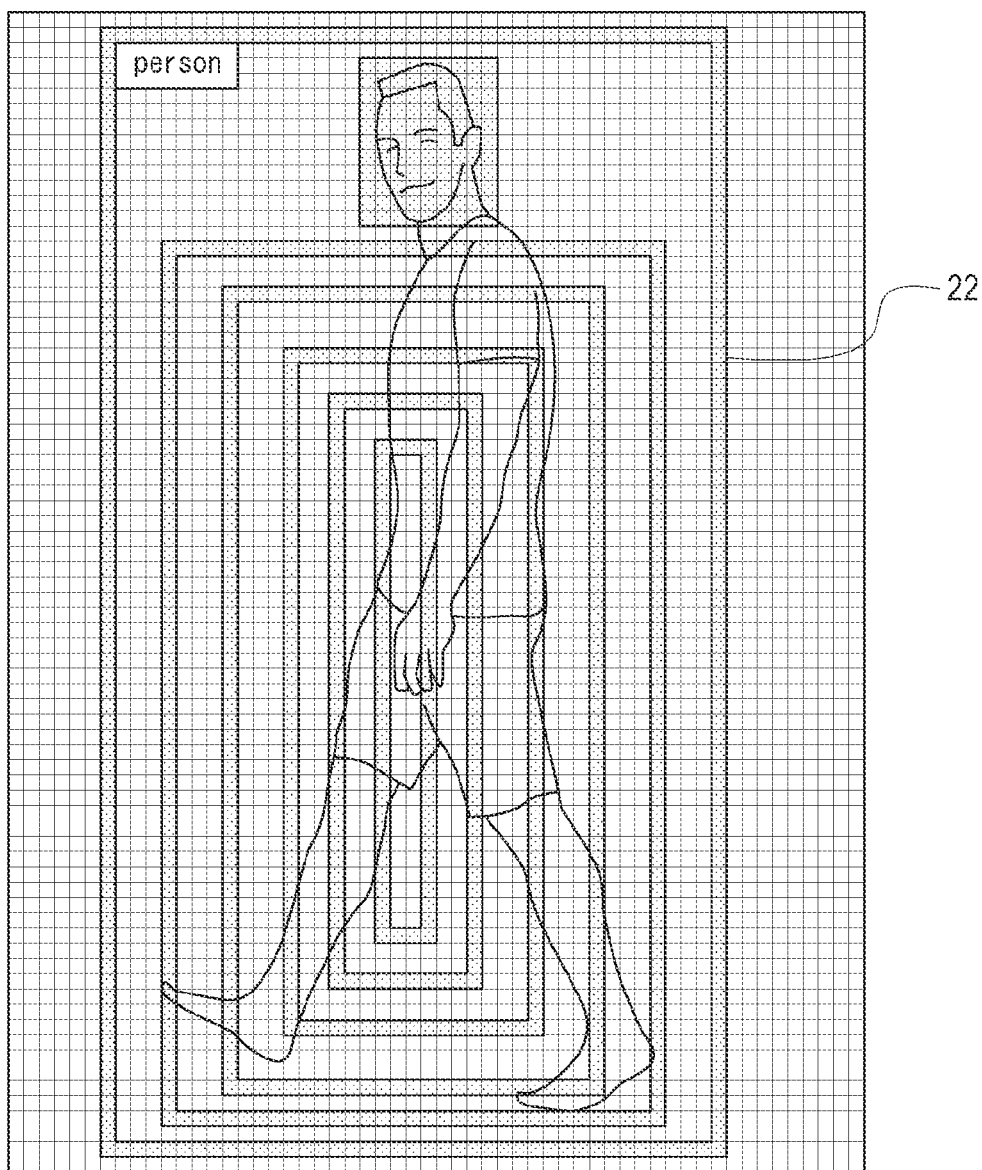
FIG. 12 is an explanatory diagram of an advanced ROI according to a third embodiment.

FIG. 12 illustrates the AROI 22 generated using a template corresponding to a class "person" for an image region of a person. The grid in FIG. 12 indicates pixels, and the dark pixels are assumed to be pixels specified by the AROI.

For example, the template corresponding to the class "person" has necessary pixels arranged at high density in a face portion and necessary pixels arranged at low density in a body portion to cover the entire image region.

Figure 13:
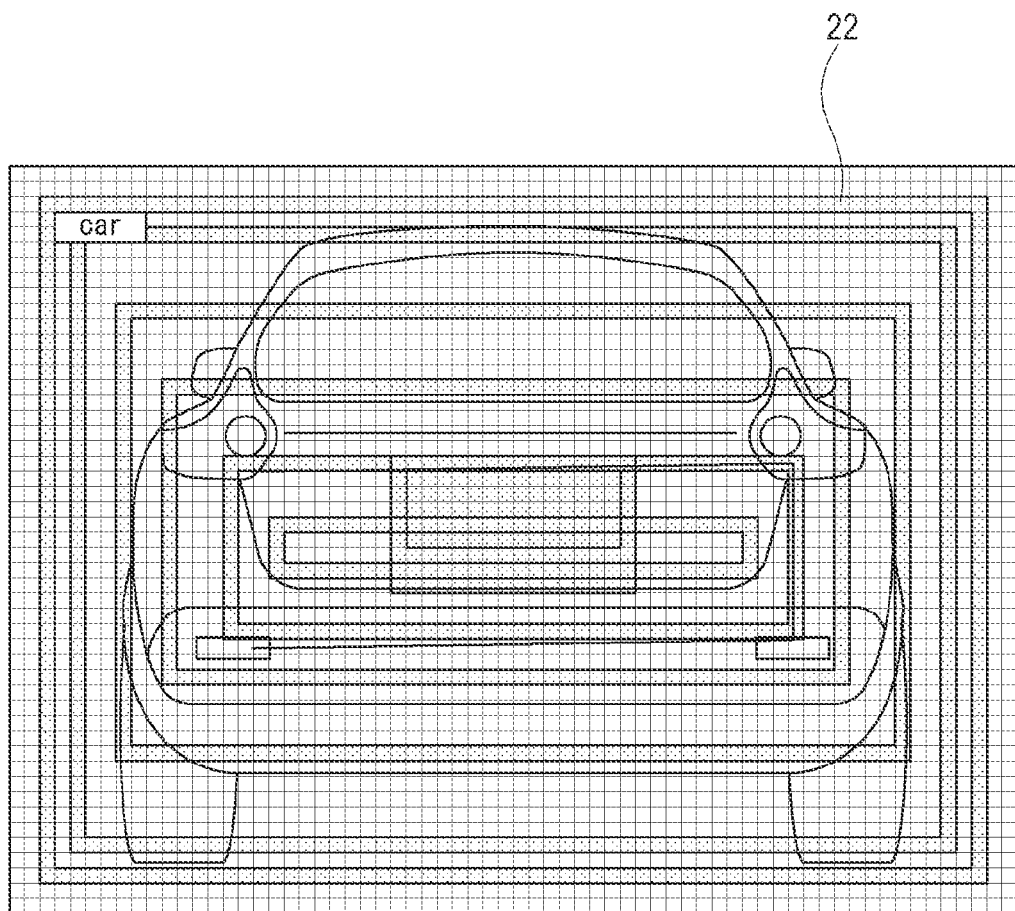
FIG. 13 is an explanatory diagram of an advanced ROI according to the third embodiment.

Furthermore, FIG. 13 illustrates the AROI 22 generated using a template corresponding to a class "automobile". In this example, the template is adapted to a rear image of an automobile, and has necessary pixels arranged at high density in a portion where a license plate is located and necessary pixels arranged at low density in the other portion to cover the entire image region.

In practice, it is conceivable to subdivide the template of the class "person" into "person turning the head away", "person facing front", "sitting person", and the like, or it is also conceivable to subdivide the template of the class "automobile" into "side image", "front image", "rear image", and the like.

In this way, the template is selected according to the class, and the template is scaled according to a region size in the actual frame to generate the AROI 22.

Figure 14:
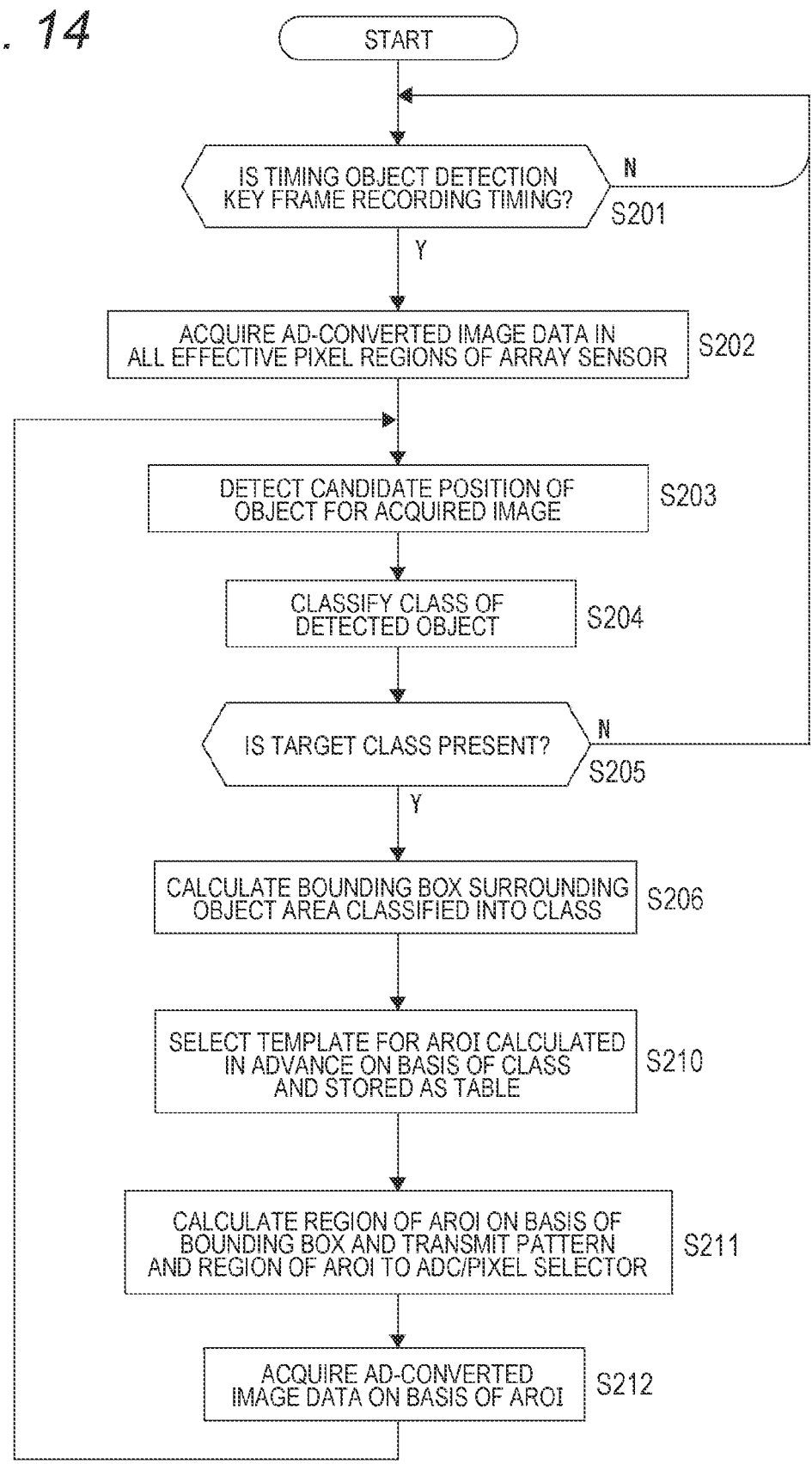
FIG. 14 is a flowchart of an area-clipping analysis using an advanced ROI according to the third embodiment.

FIG. 14 illustrates a processing example using the AROI 22.

Note that, since steps S201 to S206 are similar processing to the processing in FIG. 9, redundant description is avoided.

In step S206, a calculation unit 8 (object region recognition unit 82) calculates a bounding box 20 in a case where an object of a target class is present in an image signal of all of effective pixels obtained at object detection keyframe recording timing.

Then, in step S210, the calculation unit 8 (parameter selection unit 84) selects the template for AROI that is calculated and stored in advance based on classes.

For example, in a case where "person" is the target class and a person is present in the image, the template for "person" is selected.

In step S211 the calculation unit 8 (object region recognition unit 82) calculates the AROI 22 on the basis of the bounding box 20.

For example, the AROI 22 is obtained by adjusting the size of the template according to the size of the bounding box 20.

Then, the calculation unit 8 (object region recognition unit 82) transmits the AROI 22 (pattern and region of AROI) to an ADC/pixel selector 3.

In response to the transmission of the AROI, the ADC/pixel selector 3 AD-converts and outputs only pixels corresponding to the AROI 22 in an array sensor 2.

In step S212, the calculation unit 8 acquires image data of the next frame including information of only the pixels in the AROI 22. Then, the calculation unit 8 performs processing in steps S203 and S204 for the acquired frame.

The subsequent flow of the processing is similar to the flow described in FIG. 9.

By generating the AROI 22 using the template set according to the class in this way, it is possible to obtain information in which the object can be accurately detected according to the class even if the number of pixels to be photoelectrically converted is significantly reduced.

Note that ensuring that the object detection keyframe recording timing always occurs at certain time intervals and that the peripheral edge of the image is always set as the AD conversion target region, which has been described in the second embodiment, can also be applied to the third embodiment.

Furthermore, by executing the area-clipping using the AROI 22 of the third embodiment in combination with the classified image adaptation processing of the first embodiment, the effects of reducing the data amount and improving the detection accuracy can be more effectively obtained.

<5. Fourth Embodiment: Intelligent Compression>

Intelligent compression processing will be described as processing of a fourth embodiment executable by the sensor device 1 having the configuration in FIG. 1.

Intelligent compression is to identify an object to be detected, and compress the object at a low compression rate and compress a non-object region at a high compression rate.

FIG. 15 illustrates a specific example.

FIG. 15A illustrates a state in which a ROI 21 is generated corresponding to each automobile region in a case where a class "automobile" as a target class is detected from an image of a certain one frame.

FIG. 15B illustrates an image signal obtained by compressing the region of the ROI 21 at a low compression rate and compressing the other region at a high compression rate.

By doing so, the amount of analysis data and the amount of communication data are reduced without degrading the accuracy of object detection that is a target of an application.

Furthermore, power consumption of the sensor device 1 is reduced and an image analysis regarding the object detection in the entire system in which the sensor device 1 is mounted is speeded up.

Figure 16:
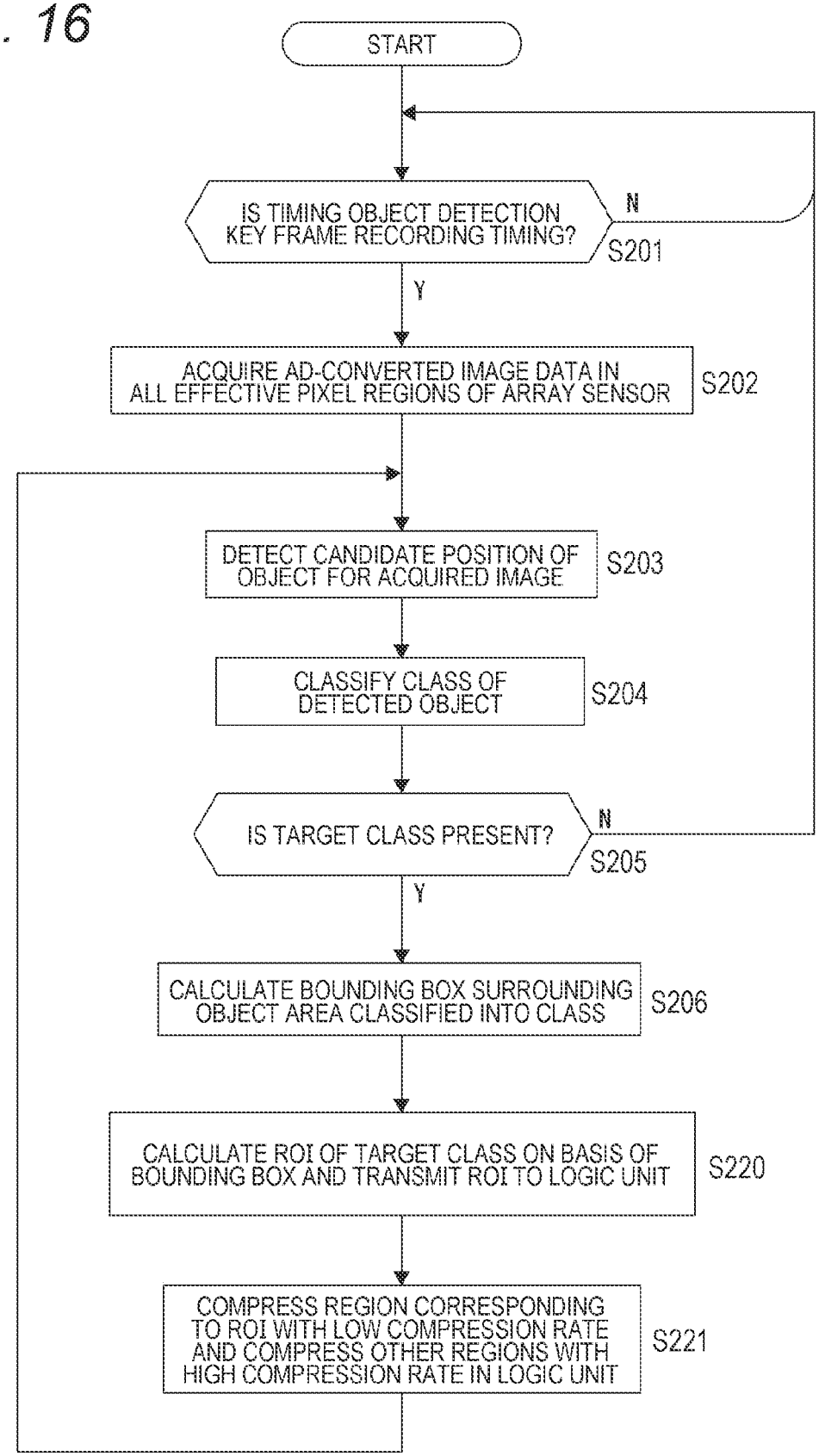
FIG. 16 is a flowchart of the intelligent compression according to the fourth embodiment.

FIG. 16 illustrates an example of the intelligent compression processing.

Note that steps S201 to S206 are similar processing to the processing in FIG. 9. Since the intelligent compression processing has a slightly different point from the above-described area-clipping case, processing of this point will be described.

In step S201, the calculation unit 8 (keyframe selection unit 81) determines whether or not it is object detection keyframe recording timing.

When the object detection keyframe recording timing has arrived, the calculation unit 8 proceeds to step S202 and acquires AD-converted image data in the entire effective pixel region of the array sensor 2.

Note that, in the case of intelligent compression, an ADC/pixel selector 3 reads (performs AD conversion for) signals of all of pixels from the array sensor 2 for every frame.

The calculation unit 8 (object region recognition unit 82) detects a candidate position of an object in an image acquired in step S201. Then, in step S204, the calculation unit 8 (class identification unit 83) classifies the objects detected as candidates.

In step S205, the calculation unit 8 confirms whether or not a target class is present in the classes obtained as a class identification result.

In step S206, the calculation unit 8 (object region recognition unit 82) calculates a bounding box 20 in a case where an object of the target class is present in the image signal of all of the effective pixels obtained at the object detection keyframe recording timing.

In step S220, the calculation unit 8 (object region recognition unit 82) calculates the ROI 21 on the basis of the bounding box 20. Even in this case, it is conceivable to expand the bounding box 20 and set the ROI 21, for example.

The calculation unit 8 (object region recognition unit 82) transmits the ROI 21 thus calculated to a logic unit 5.

In response, in step S221, the logic unit 5 performs compression processing for a pixel region corresponding to an inside of the ROI 21 at a low compression rate and for the other pixel region at a high compression rate of the image signal read from the array sensor 2.

The compressed image signal is then written to a DRAM 6 and transferred to a processor 11 by an interface unit 7.

The processor 11 can perform object detection with high accuracy because the necessary region specified by the ROI 21 is compressed at a low compression rate and sufficient information is present.

As the processing of the calculation unit 8, after step S220, the processing returns to step S203, the candidate position of an object for the next frame is detected, and the class identification of the detected object is performed in step S204.

In the fourth embodiment, all the effective pixels are read in each frame from the array sensor 2. Therefore, in the case where the processing returns to step S203 after step S220 or S211, the calculation unit 8 can scan the range of all the effective pixels to detect the object candidate in step S203. By scanning the range of all the effective pixels to detect the object candidate, it is always possible to cope with appearance of a new target class object during keyframe recording timing.

In this case, if the calculation unit 8 detects the object candidate only in the region of the ROI 21, a processing load on the calculation unit 8 can be reduced.

The calculation unit 8 updates the ROI 21 in steps S206 and S220 in response to confirmation of the presence of the target class.

Therefore, the region compressed at a low compression rate in the logic unit 5 is also updated according to the position of the object in each frame.

In a case where absence of the target class is determined in step S205, the processing of the calculation unit 8 returns to step S202, and waits for the object detection keyframe recording timing.

By the processing in FIG. 16, the intelligent compression processing of compressing a portion necessary for analysis, that is, the ROI 21 where the target class object is present at a low compression rate and compressing the other region at a high compression rate is performed.

Note that ensuring that the object detection keyframe recording timing always occurs at certain time intervals and generating the ROI based on semantic segmentation, which have been described in the second embodiment, can also be applied to the fourth embodiment.

Furthermore, by executing the intelligent compression processing of the fourth embodiment in combination with the classified image adaptation processing of the first embodiment, the effects of reducing the data amount and improving the detection accuracy can be more effectively obtained.

<6. Fifth Embodiment: Active Sampling>

Active sampling will be described as processing of a fifth embodiment executable by a sensor device 1 having the configuration illustrated in FIG. 1.

The active sampling refers to processing of dynamically changing a frame rate depending on presence or absence of an object. The active sampling can be said to be compression of a data amount in a time-axis direction according to the presence or absence of an object. Furthermore, power consumption of the sensor device 1 can be reduced.

Figure 17:
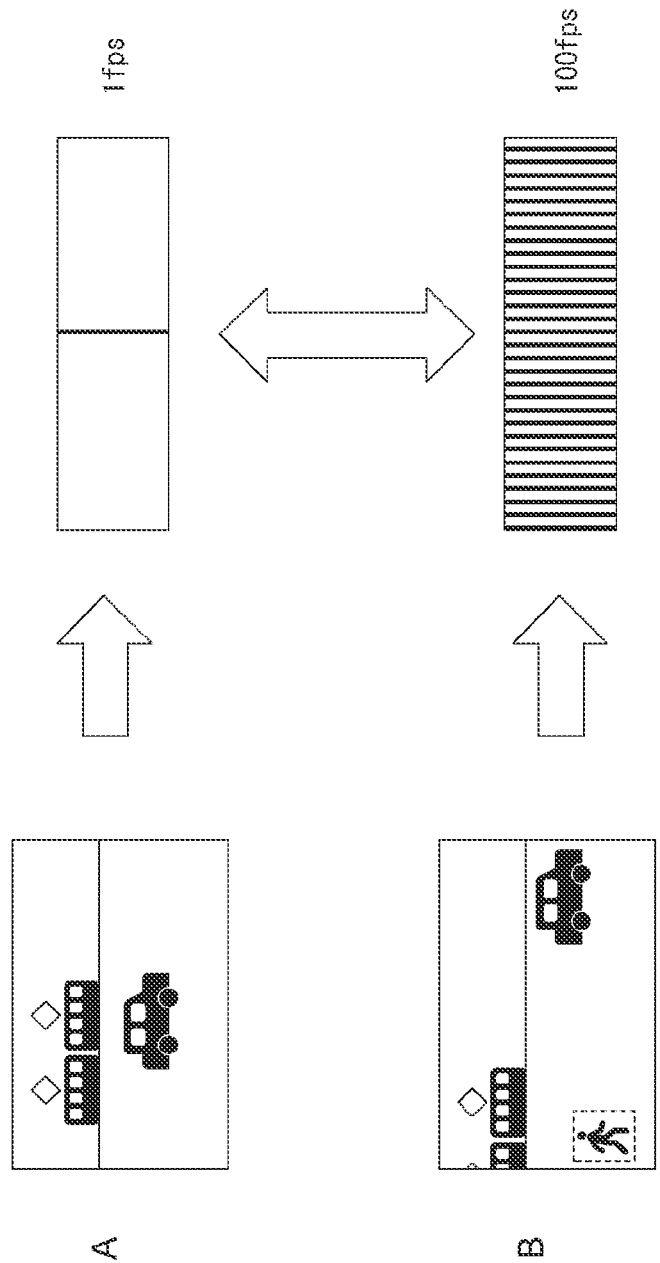
FIG. 17 is an explanatory diagram of active sampling according to a fifth embodiment.

An outline of the active sampling will be described with reference to FIG. 17.

Now, assume that a person is detected from a captured image, where a target class is "person". For example, suppose a case where a surveillance camera is used to image an outside of a building through an entrance.

FIG. 17A illustrates a state in which no person is included in the captured image. In such a case, the frame rate is set to a low rate, for example, 1 fps.

FIG. 17B illustrates a state in which a person is detected in the captured image. In such a case, the frame rate is changed to a higher rate, for example 100 fps.

That is, by dynamically changing the frame rate, limiting the detection target, the frame rate is decreased when particularly not necessary (when no person is detected), and the frame rate is increased when necessary (when a person is detected), thereby to make an information amount dense.

Figure 18:
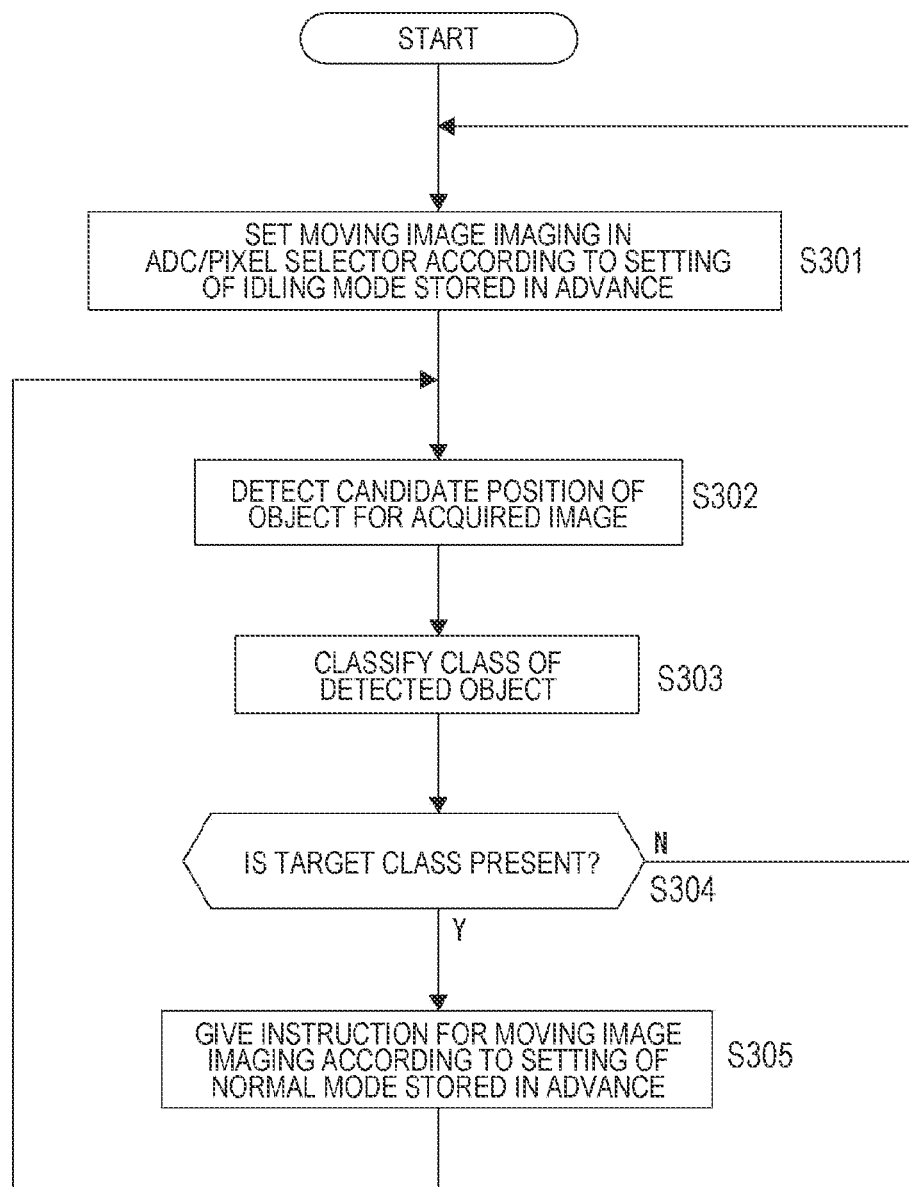
FIG. 18 is a flowchart of the active sampling according to the fifth embodiment.

FIG. 18 illustrates a processing example of the active sampling.

In step S301, a calculation unit 8 (keyframe selection unit 81) sets moving image capture setting in an ADC/pixel selector 3 according to setting of an idling mode stored in the calculation unit 8 in advance, for example.

For example, in the calculation unit 8, a parameter selection unit 84 stores the idling mode setting and normal mode setting.

The active sampling is provided with the idling mode and the normal mode. The idling mode is a mode before entry of a target class object in a captured screen is confirmed.

In the idling mode, a moving image is captured at a frame rate slower than the normal mode.

It is conceivable to start the idling mode by a command from an outside of the sensor device 1. Furthermore, the idling mode may be started in response to a command at idling mode data acquisition timing intervals from the outside of the sensor device 1. For example, in a case of an instruction of 60 seconds, the object detection keyframe recording timing is set at intervals of 60 seconds.

The normal mode is a normal moving image capture mode. For example, the normal mode responds to a command at normal mode data acquisition timing intervals from the outside of the sensor device 1.

In the normal node, normally, a moving image is captured at a frame rate faster than the idling mode. For example, in a case of an instruction of 0.01 sec, an image is captured at intervals of 0.01 sec (100 fps).

Therefore, in step S301, the calculation unit 8 instructs the ADC/pixel selector 3 to set the idling mode, so that a moving image is captured at intervals of 1 sec if the idling mode is set to 1 fsp.

Note that the idling mode setting and the normal mode setting are not necessarily stored in the calculation unit 8, and may be stored in an external memory of the calculation unit 8.

The frame rates in the idling mode and the normal mode are examples.

Further, set values of the idling mode and the normal mode are desirably rewritable from an external device such as a processor 11.

In step S302, the calculation unit 8 (object region recognition unit 82) detects a candidate position of an object in the acquired image.

In step S303, the calculation unit 8 (class identification unit 83) classifies the objects detected as candidates into classes.

In step S304, the calculation unit 8 confirms whether or not a target class is present in the classes obtained as a class identification result.

When the target class is not present, the calculation unit 8 performs the processing of steps S301, S302, and S303. That is, the calculation unit 8 acquires an image of the next frame in the idling mode, and similarly detects the candidate position of the object and identifies the class. In this case, for example, assuming that the image is captured at 1 fps, this processing is performed for the image after 1 second.

For example, in a case where "person" is set as the target class and "person" is present as the identified class, the calculation unit 8 moves the processing from step S304 to S305.

The calculation unit 8 (keyframe selection unit 81) sets moving capture setting in the ADC/pixel selector 3 according to the stored normal mode setting, and instructs the ADC/pixel selector 3 to capture an image in the normal mode.

Therefore, if the normal mode is set to 100 fsp, a moving image is captured at intervals of 0.01 sec, for example.

In the state where the mode is switched to the normal mode, the calculation unit 8 performs the processing of steps S302 and S303.

Then, the normal mode continues as long as the target class is present in the captured image, while the processing returns to step S301 when the target class is no longer present and the normal mode is switched to the idling mode.

The processing as the active sampling is performed as described above. Thereby, the frame rate is decreased and the data amount is compressed especially during the period when the target class is not present, thereby the power consumption is reduced.

Although the calculation unit 8 instructs the ADC/pixel selector 3 to change the frame rate to make the frame rate variable, the calculation unit 8 may instruct a logic unit 5 to convert the frame rate.

For example, read from an array sensor 2 is always performed at 100 fps, and in the idling mode, the logic unit 5 is instructed to thin out frames. Thereby, the data amount regarding transmission to the processor 11 can be reduced.

Note that, by combining the active sampling processing and the second, third, or fourth embodiment, a more effective effect of reducing the data amount without deteriorating detection accuracy.

Furthermore, by combining the active sampling processing and the classified image adaptation processing of the first embodiment, the detection accuracy can be improved in addition to the effective reduction in the data amount.

<7. Sixth Embodiment: Image Adaptation by Threshold Setting>

Image adaptation processing will be described as processing of a sixth embodiment. The example described here is an example of adding an idea of parameter change according to threshold setting to the classified image adaptation processing of the first embodiment.

As an example of parameters referred to here, parameters used in image processing in a logic unit 5 are assumed, and the parameters of the image processing used in the logic unit 5 are set (adjusted or changed) to satisfy, for example, a threshold set in a sensor device 1.

Furthermore, as the parameters, parameters used in imaging processing such as signal read by an ADC/pixel selector 3 or exposure operation by an array sensor 2 are also assumed. Control parameters of an imaging processing operation of the ADC/pixel selector 3 or the array sensor 2 are set (adjusted or changed) to satisfy, for example, a threshold set in the sensor device 1.

In the above-described first embodiment, the parameters used in the logic unit 5 are selected according to the class identification. The selected parameters can be set (adjusted or changed) on the basis of the threshold.

Alternatively, the parameters are not necessarily limited to the parameters selected on the basis of the class identification, and it is conceivable to set parameters on the basis of a threshold as long as the parameters are parameters used in the logic unit 5, the ADC/pixel selector 3, or the array sensor 2.

Specific examples of the parameters related to the imaging processing and the parameters related to the image processing, which are automatically set on the basis of a threshold, will be described.

For example, the parameters related to the image processing are exemplified as follows:
  image aspect ratio;
  resolution;
  the number of color gradations (the number of colors or a bit depth);

contrast adjustment value;
sharpness adjustment value;
gray level adjustment value;
gamma correction value; and
sampling rate conversion ratio.

The image aspect ratio and resolution parameters are also reflected in a ROI 21.

The number of color gradations, contrast adjustment value, sharpness adjustment value, gray level adjustment value, gamma correction value, and resolution are parameters related to image quality.

The sampling rate conversion ratio is a parameter of time resolution.

Furthermore, the parameters related to the imaging processing include:
sampling rate;
resolution (for example, resolution set at the time of reading of the ADC/pixel selector 3);
shutter speed (exposure time) of the array sensor and the like.

Of course, the parameters that are automatically set on the basis of a threshold include parameters other than those listed above.

Such settings according to the threshold of the parameters are used to reduce the data amount, speed up the processing, reduce the power consumption, and the like while ensuring practical accuracy for an output of object detection in a case where a processor 11 performs the data detection on the basis of learning using a deep neural network (DNN), for example.

That is, the amount of imaging data is reduced by changing the parameters such as the resolution and the number of colors. However, even with the reduction, the accuracy of the object detection is maintained at required level.

The idea of setting parameters based on a threshold will be described with reference to FIG. 19.

For example, it is assumed that, in a case where a person is imaged by the sensor device 1, full-color image data having information of all of pixels (all of effective pixels) of the array sensor 2 is output at a frame rate of 60 frames per second (fps) as an output image.

Then, it is assumed that, in a case where the processor 11 performs object detection for such image data, for example, the person can be correctly detected at a rate of 98% with a confidence rate CR=0.98. The confidence rate is a rate of certainty that an object can be correctly identified and detected.

Meanwhile, it is assumed that, in a case where image data in which the resolution is slightly lowered, the number of color gradations is slightly lowered, and the frame rate is set to 30 fps is output, the confidence rate CR=0.92 is obtained.

Meanwhile, it is assumed that, in a case where image data in which the resolution is further lowered, the number of color gradations is further lowered, and the frame rate is set to 15 fps is output, the confidence rate CR=0.81 is obtained.

Moreover, it is assumed that, in a case where image data in which the resolution is significantly lowered, the number of color gradations is significantly lowered, and the frame rate is set to 10 fps is output, the confidence rate CR=0.58 is obtained.

The above examples are merely examples for description, but the confidence rate varies by changing the parameters regarding imaging or image quality such as the resolution, the number of colors, and the time resolution of the image data to be analyzed in this way. That is, the accuracy of image analysis and object detection changes.

By the way, the confidence rate of object detection cannot be too high. In reality, the highest rate is not always required.

For example, when considering a case of roughly detecting the number of people from an image obtained by capturing a park from a bird's-eye view as illustrated in FIG. 7A, not so much accuracy is required. For example, in a case of obtaining a detection result such as several people, around 10 people, around 20 people, or the like, the confidence rate of CR=0.6 or so may be sufficient.

On the other hand, in a case of strictly monitoring intrusion of people with a security camera, or the like, the confidence rate of CR=0.95 or so may be required.

In addition, the confidence rate CR=0.70 may be used in the daytime, but the confidence rate CR=0.90 or so may be requested at night.

That is, the confidence rate CR required for the accuracy of object detection differs depending on various factors such as the purpose, target, type of device/application program, time, and region for the detection.

Moreover, the confidence rate varies depending on the analysis ability and learning degree of the processor 11, and also varies depending on the detection target and the class.

From these facts, for example, by determining the threshold on the basis of a required appropriate confidence rate and changing the parameters accordingly, an image signal that meets the requirements such as object detection can be output.

Figure 19:
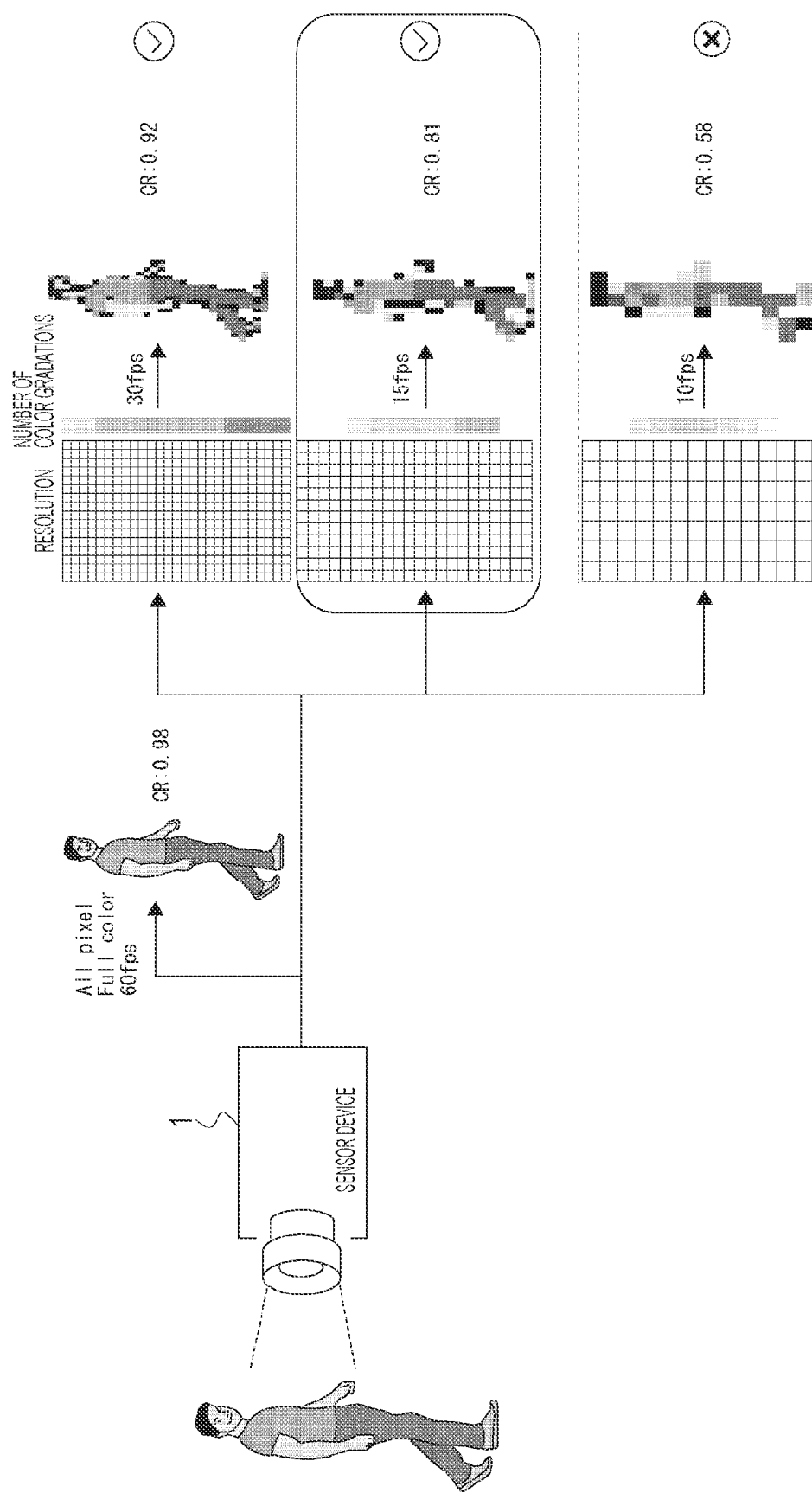
FIG. 19 is an explanatory diagram of threshold setting for image adaptation processing of a sixth embodiment.

Now, in the example in FIG. 19, it is assumed that the confidence rate CR=0.80 or more is required.

In that case, the parameters in which the threshold as the confidence rate CR becomes 0.80 or more are calculated, and the parameters used in the logic unit 5 and the like are set. In particular, the parameters that are higher than the threshold but have a relatively small amount of data are set.

For example, the parameters such as the resolution, the number of color gradations, and the frame rate in which the illustrated confidence rate CR=0.81 are set.

Then, the amount of data can be significantly reduced and the required object detection accuracy can be maintained, as compared with a case where the parameters are set to obtain the confidence rate CR=0.98 and the image signal is output, for example.

Note that the "threshold" may be considered as a required value as the confidence rate, but in the sense of a threshold calculated for parameter adjustment, the "threshold" can be considered as a parameter value for obtaining the required confidence rate as "threshold".

That is, in a technical sense, as processing of "setting a threshold of parameters and causing processing using the parameters set on the basis of the threshold to be performed", the following processing methods [1] and [2] are assumed.

[1] Calculate a threshold of an index value such as the confidence rate suitable for a use mode or a use environment, and set parameters to be actually used as parameter values for obtaining an index value that exceeds the threshold of the index value. That is, the threshold of the parameters is set from the viewpoint of the index value of object detection.

[2] Calculate thresholds of parameters for obtaining a required value as an index value such as the confidence rate, and set the parameters to be actually used on the basis of the thresholds. That is, the thresholds of the parameters are set from the viewpoint of the values of the parameters themselves.

In the present embodiment, for example, the threshold is set as in [1] or [2] on the basis of the confidence rate, and the parameters to be actually used are adapted to cause an image data amount to be as small as possible. Such parameters are calculated in real time (for example, periodically during imaging) and the parameters are dynamically changed.

For example, by calculating an appropriate threshold and corresponding parameters by DNN processing according to an application of the sensor device 1, the target class, or an imaging environment, and changing the parameters, an increase in speed, reduction in power consumption, and high accuracy adapted to an application or the like are achieved.

In particular, in the example described as the sixth embodiment, the parameter adjustment is performed such that the threshold based on the confidence rate of object detection is provided, and set values of the parameters to approach the threshold and not to fall below the threshold are calculated.

Furthermore, it is appropriate to set the threshold and the corresponding parameters for each class.

Figure 20:
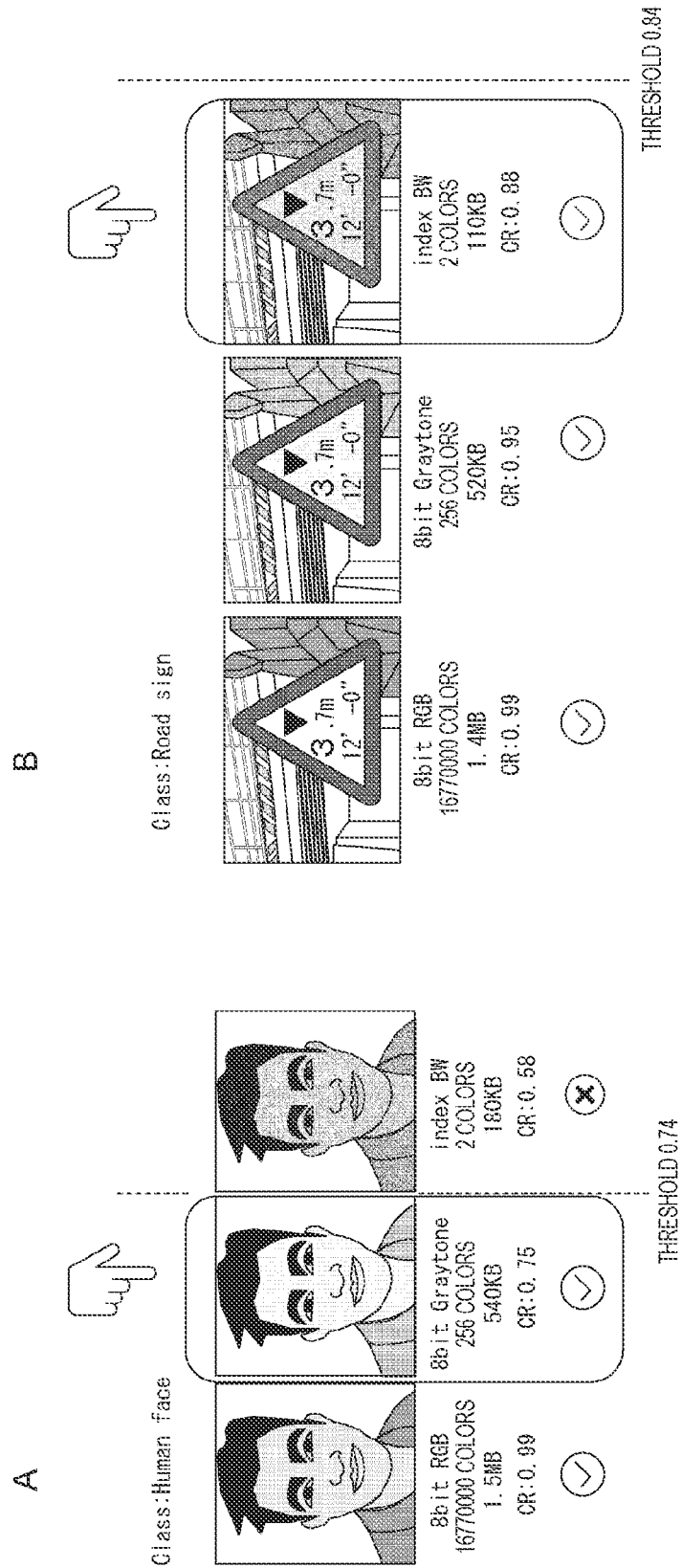
FIG. 20 is explanatory diagrams of threshold setting by class according to the sixth embodiment.

FIG. 20A illustrates images classified into "human face" as the class, and FIG. 20B illustrates images classified into "road sign" as the class.

FIG. 20A illustrates that, in the case of a human face, the confidence rate is CR=0.99 when the image signal is 16777216 colors of 8-bit RGB data and the data amount is 1.5 MB, the confidence rate is CR=0.75 when the image signal is 256 colors of 8-bit gray tone and the data amount is 540 KB, and the confidence rate is CR=0.58 when the image signal is black and white two colors of data and the data amount is 180 KB.

For example, in this case, when the threshold for the human face is the confidence rate CR=0.74, the image on the right side is not appropriate, and the parameters of the center image are suitable as the parameter settings.

FIG. 20B illustrates that, in the case of a road sign, the confidence rate is CR=0.99 when the image signal is 16777216 colors of 8-bit RGB data and the data amount is 1.4 MB, the confidence rate is CR=0.95 when the image signal is 256 colors of 8-bit gray tone and the data amount is 520 KB, and the confidence rate is CR=0.88 when the image signal is black and white two colors of data and the data amount is 110 KB.

For example, in this case, when the threshold for the load sign is the confidence rate CR=0.85, any image is appropriate. The parameters of the right image are suitable as the parameter setting.

For example, as described above, since the detection accuracy and the required accuracy for the quality of the image signal differ depending on the class of the object, it is appropriate to set the threshold and change the parameters according to the class.

Hereinafter, a specific example of the sixth embodiment will be described.

Figure 21:
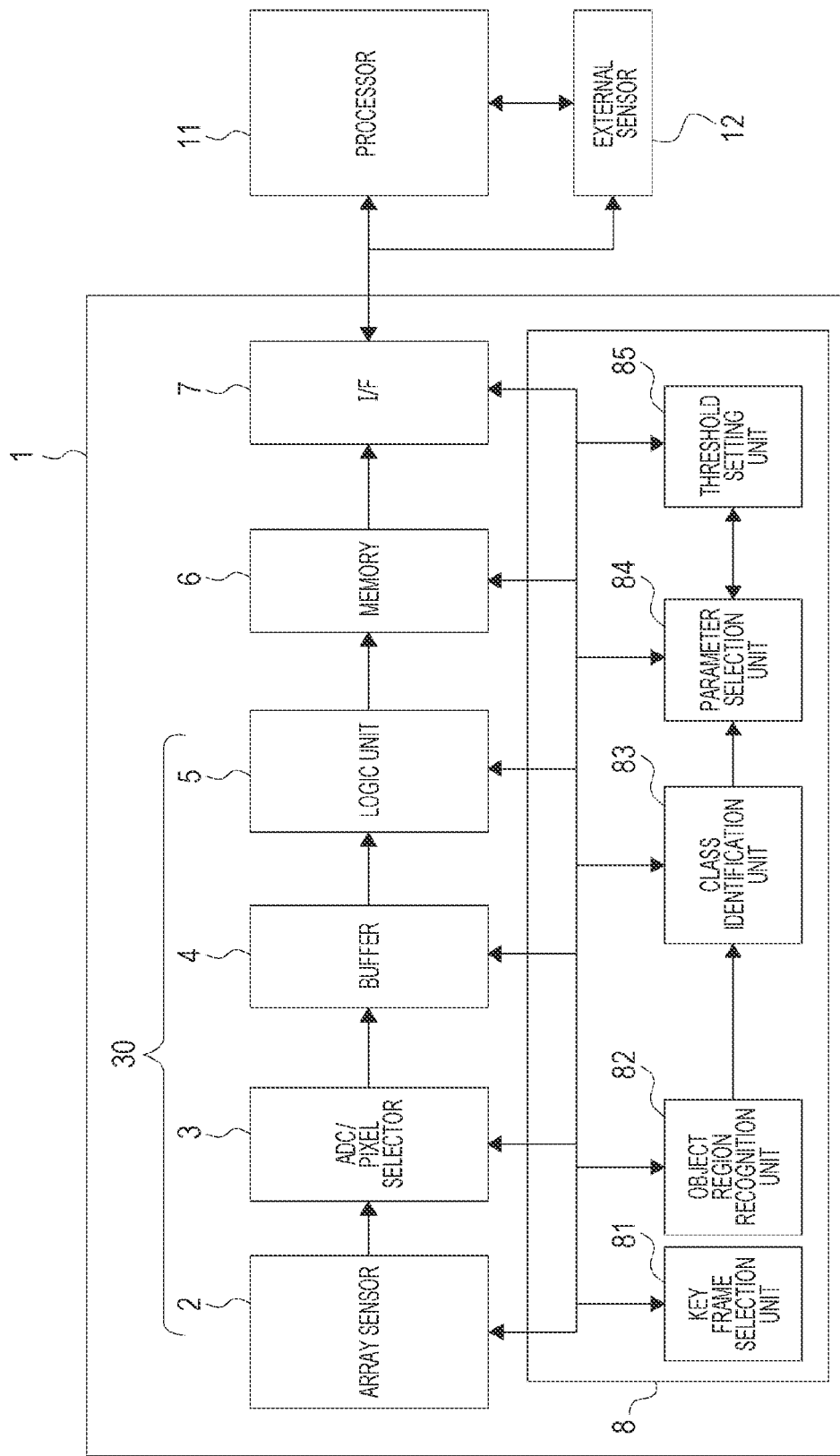
FIG. 21 is a block diagram of a sensor device applicable to sixth to ninth embodiments of the present technology.

First, FIG. 21 illustrates a configuration example of the sensor device 1. Note that the same components as those in FIG. 1 are given same reference numerals, and redundant description is avoided.

The configuration in FIG. 21 is different from FIG. 1 in that a threshold setting unit 85 is provided as a calculation function in a calculation unit 8 configured as an AI processor, for example.

The threshold setting unit 85 has a function as a DNN engine, and performs processing of setting a parameter threshold for all or some of parameters used in image processing by a logic unit 5 or imaging processing regarding imaging by an array sensor 2 (processing of the array sensor 2 and an ADC/pixel selector 3).

Furthermore, the threshold setting unit 85 causes all or some of the logic unit 5, the array sensor 2, and the ADC/pixel selector 3 to perform processing using the parameters changed on the basis of the threshold.

Specifically, the threshold setting unit 85 changes the parameters used for the image processing in the logic unit 5 on the basis of the threshold, and sets the changed parameters in the logic unit 5, for example.

Alternatively, the threshold setting unit 85 changes the parameters used for the imaging processing such as the exposure operation by the array sensor 2, and the read processing and the AD conversion processing of the ADC/pixel selector 3 on the basis of the threshold, and sets the changed parameters in the array sensor 2 and the ADC/pixel selector 3.

Figure 22:
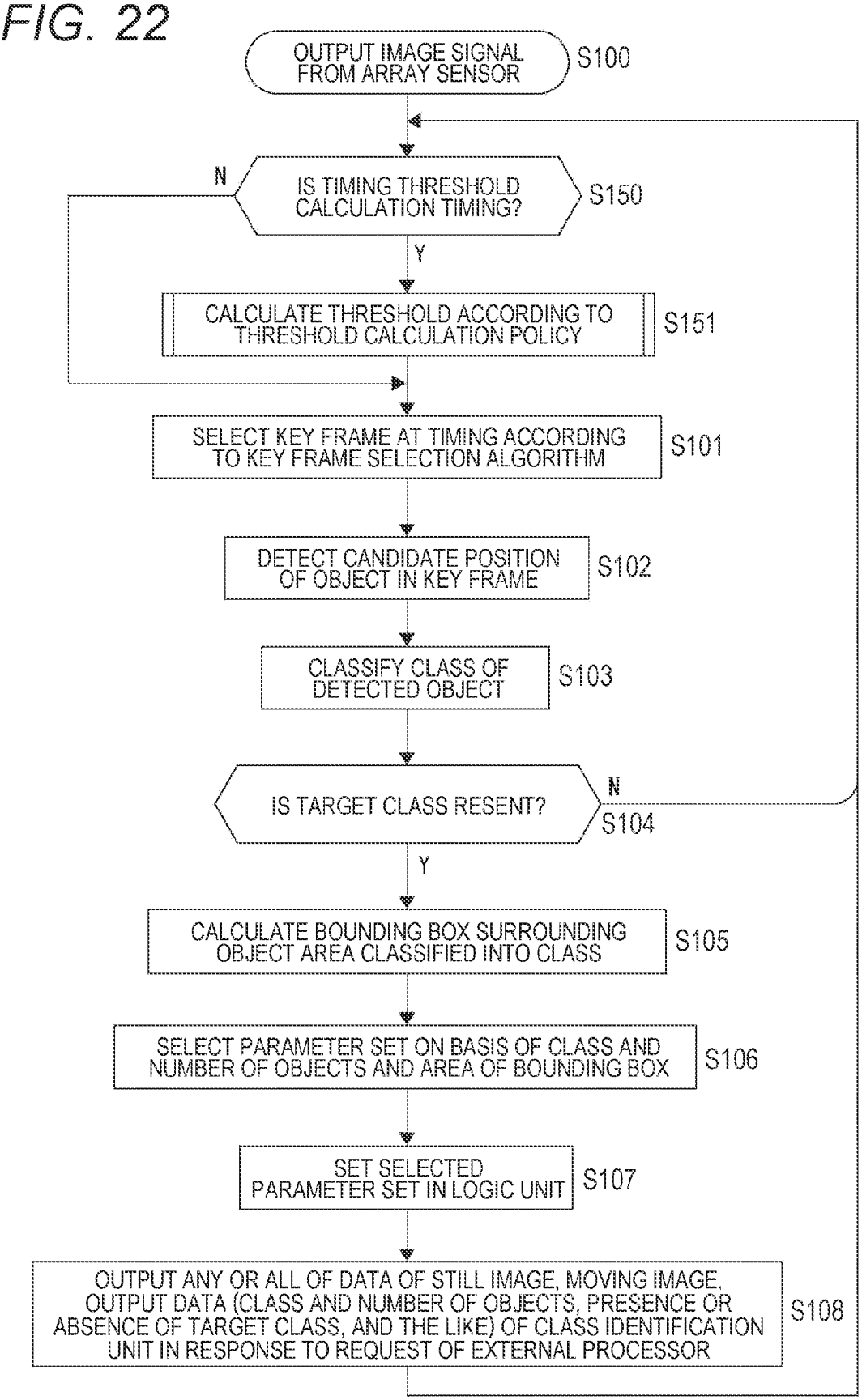
FIG. 22 is a flowchart of parameter setting processing according to the threshold according to the sixth embodiment.

FIG. 22 illustrates a processing example of the calculation unit 8 of the sensor device 1. FIG. 22 illustrates an example in which the processing of the above threshold setting unit 85 is added to the classified image adaptation processing in FIG. 5. In FIG. 22, the same processing as in FIG. 5 is given the same step numbers and the description thereof is omitted.

In FIG. 22, steps S150 and S151 as the processing by the threshold setting unit 85 are added to the processing in FIG. 5.

In step S150, the calculation unit 8 determines whether or not it is threshold calculation timing, and proceeds to step S151 in a case where it is the threshold calculation timing or proceeds to step S101 in a case where it is not the threshold calculation timing.

The threshold calculation timing is, for example, the following timing:

a. every predetermined time interval: for example, every hour from the start of imaging;

b. every predetermined set time: for example, every 0:00 am;

c. every number of times of appearance of a predetermined target class: for example, every 1000 times of appearance of the target class;

d. every imaging time of a predetermined target class: for example, every five hours of time that the target class is being imaged; and e. timing by an external command: an instruction from a device/equipment side on which the sensor device 1 is mounted, such as the processor 11.

For example, when these timings and the like are determined in step S150 and the threshold calculation timing has arrived, the calculation unit 8 calculates the threshold according to a threshold calculation policy in step S151. That is, the threshold is determined and the parameters according to the threshold are set.

This threshold calculation policy (threshold) is divided into several policies depending on the types of the parameters of the imaging processing or the image processing focused on when calculating the threshold, and differs depending on an application. Examples are given below.

Use an inflection point of a descending curve of the confidence rate

When lowering the resolution, there is an advantage of reduction in data size and calculation cost, but on the contrary, the confidence rate generally decreases.

In FIG. 23A, the horizontal axis represents the resolution and the vertical axis represents the confidence rate.

As illustrated in FIG. 23A, the confidence rate greatly decreases at a low resolution equal to or lower than certain resolution (inflection point). Therefore, for example, the inflection point of a curve of the relationship between the confidence rate and the resolution is obtained while changing the resolution. Parameter settings are performed to lower the resolution, considering that the inflection point or a vicinity of the inflection point as the threshold.

Use a maximum value of the confidence rate

In the classification of object detection, the confidence rate is not necessarily high when the number of colors is large depending on the class, and there is an optimum number of colors that maximizes the confidence rate depending on the target class.

In FIG. 23B, the horizontal axis represents the number of color gradations and the vertical axis represents the confidence rate.

In a case where a peak of the confidence rate is observed as illustrated in FIG. 23B, the threshold is calculated on the basis of the maximum value. For example, the maximum value (the peak of the curve of the relationship between the confidence rate and the number of color gradations) is considered as the threshold, or a predetermined range close to the maximum value (for example, a value obtained by lowering predetermined % of the confidence rate) is considered as the threshold. Then, the parameter of the number of color gradations is set according to the threshold.

Use remaining battery power

The parameter settings that enable N-hour imaging are obtained on the basis of remaining battery power, and the parameters are set to make the confidence rate the highest (or equal to or larger than a specified value).

For example, it is conceivable to lower the threshold such as the confidence rate according to the remaining battery power so that the imaging time can be obtained as long as possible, and set the parameters according to the confidence rate.

Use a time resolution that can maintain object tracking

Object tracking is to track and recognize a specific detection object (object) in frames of successive image signals in a frame traveling direction.

In general, calculation cost regarding the object tracking increases as the time resolution of the image signal is lowered.

The parameter that can maintain the object tracking is set as the threshold, and the time resolution and other parameters are determined by giving priority to reducing the calculation cost of the object tracking.

Figure 24:
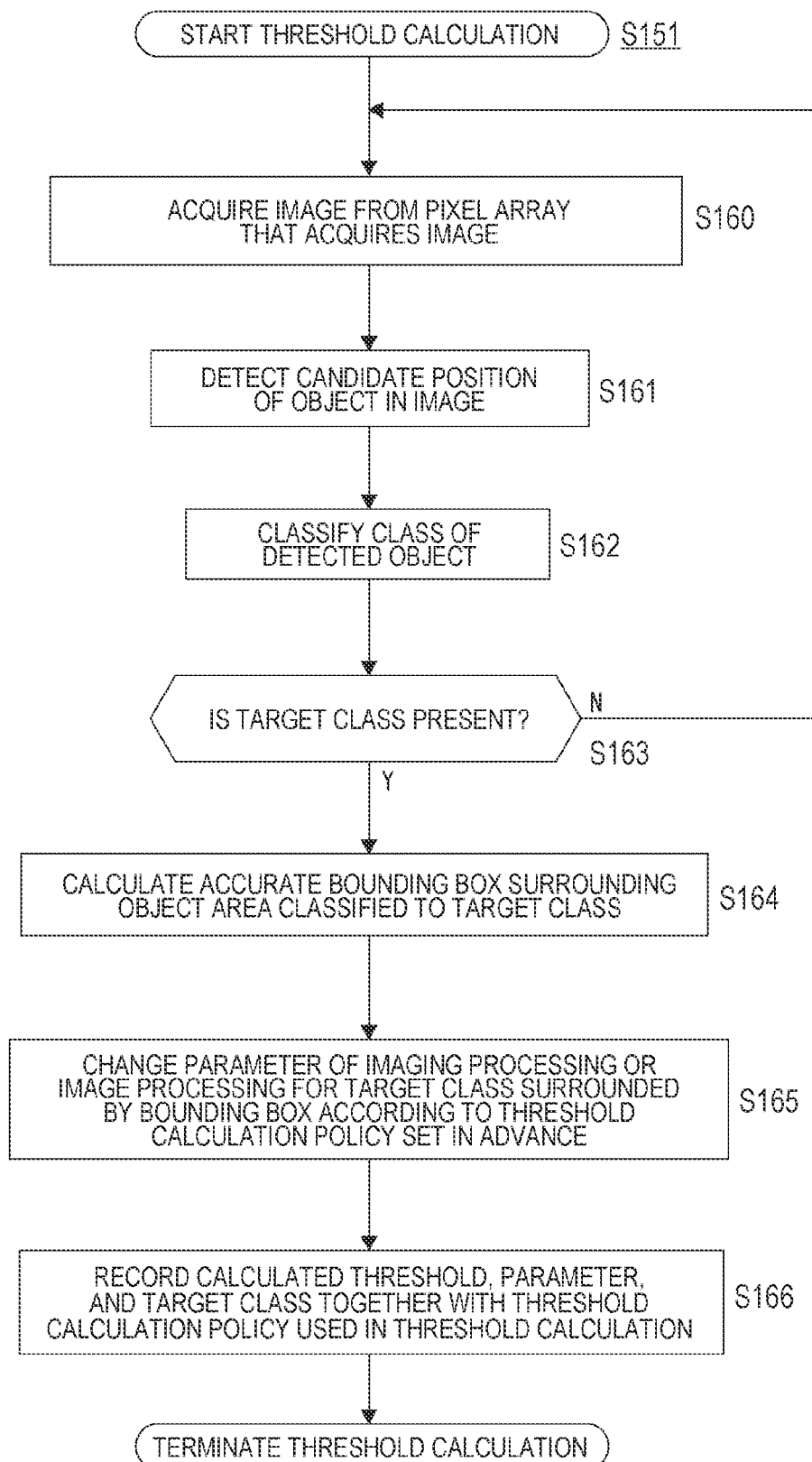
FIG. 24 is a flowchart of threshold calculation according to the sixth embodiment.

For example, one of the policies as in the above examples is adopted, and the threshold is calculated by a predetermined algorithm. FIG. 24 illustrates an example of threshold calculation processing of the calculation unit 8.

The processing of the calculation unit 8 in FIG. 24 is processing executed by the functions as the object region recognition unit 82, the class identification unit 83, and the threshold setting unit 85 illustrated in FIG. 21.

In step S160, the calculation unit 8 acquires an image signal in units of one frame from the array sensor 2.

In step S161, the calculation unit 8 (object region recognition unit 82) detects a candidate position of an object in the acquired frame.

That is, the calculation unit 8 searches for a candidate object to be detected in the frame image, and obtains one or a plurality of candidate positions (position coordinates in the image).

In step S162, the calculation unit 8 (class identification unit 83) classifies the detected object into a class. That is, the calculation unit 8 identifies and classifies the class for each candidate object.

In step S163, the calculation unit 8 confirms whether or not a target class is present in the classes obtained as a class identification result.

The target class is, for example, a class set by the processor 11 as described above. That is, a class targeted for object detection in the processor 11 is assumed.

In a case where the target class is not present, the calculation unit 8 returns to step S160 and acquires image data of the next frame.

In a case where the target class is present, the calculation unit 8 moves the processing from step S163 to S164.

In the case where the processing proceeds to step S164, the calculation unit 8 (object region recognition unit 82) calculates the accurate position coordinates (bounding box 20) surrounding the object area classified into the class. The bounding box 20 is as described with reference to FIGS. 6F, 6G, and the like.

In step S165, the calculation unit 8 (threshold setting unit 85) calculates the threshold and parameters to be used in the imaging processing or the image processing while changing the threshold and parameters according to the threshold calculation policy set in advance, for the target class surrounded by the bounding box 20.

In step S166, the calculation unit 8 (threshold setting unit 85) records the threshold and the parameters calculated in step S165, the target class, and the threshold calculation policy in association with one another.

For example, the information is recorded in a recording region inside the calculation unit 8, recorded in a predetermined region of the memory 6, or transferred to the processor 11 for recording.

Thereby, the threshold and the parameters according to the target class are set.

In step S151 in FIG. 22, for example, the threshold and the parameters are set as described above. Therefore, the parameter set for a certain target class is changed every time the threshold calculation timing has arrived.

For example, in the case where a person is the target class, all or some of the parameters of the parameter set corresponding to a person are changed according to the threshold.

Since steps S101 to S107 in FIG. 22 are similar to the processing in FIG. 5, the parameter set is selected according to the target class in this case. Then, in step S107, the parameter set is set in the logic unit 5.

The parameter set set in the logic unit 5 is a parameter set applicable to the target class, but is a parameter set changed on the basis of the threshold calculated in the processing of step S151.

The calculation unit 8 (threshold setting unit 85) performs necessary processing, for example, transfer of the parameters to the logic unit 5 or a change instruction so that the parameters to be used in the logic unit 5 are changed in this way.

Thereby, the parameters regarding the image processing or the imaging processing are set to the values with an image data amount that is as small as possible on the basis of the threshold.

Therefore, the image signal output from the interface unit 7 can have image quality or the like that can maintain the accuracy of object detection required by the processor 11, and can have a small data amount.

Note that the processing example in FIG. 22 above is an example of adding the idea of parameter change based on threshold setting to the classified image adaptation processing in FIG. 5. However, the idea does not necessarily have to be combined with the classified image adaptation processing.

For example, a processing example of only steps S150, S151, S107, and S108 (a processing example in which steps S101 to S107 are eliminated in FIG. 22) is conceivable.

That is, the parameters to be used in the image processing in the logic unit 5 or the parameters to be used in the imaging processing in the array sensor 2 or the ADC/pixel selector 3 are set on the basis of the threshold calculation in step S151.

Then, at the time of step S107, the parameters set according to the threshold is set in the logic unit 5, the array sensor 2, or the ADC/pixel selector 3.

That is, the calculation unit 8 (threshold setting unit 85) transfers the parameters set according to the threshold to some or all of the logic unit 5, the array sensor 2, and the ADC/pixel selector 3 or gives a change instruction.

In this case, processing of sequentially changing the parameters set by default in the logic unit 5, the array sensor 2, and the ADC/pixel selector 3, for example, on the basis of the threshold is implemented instead of the idea of using the parameter set according to the class.

Figure 25:
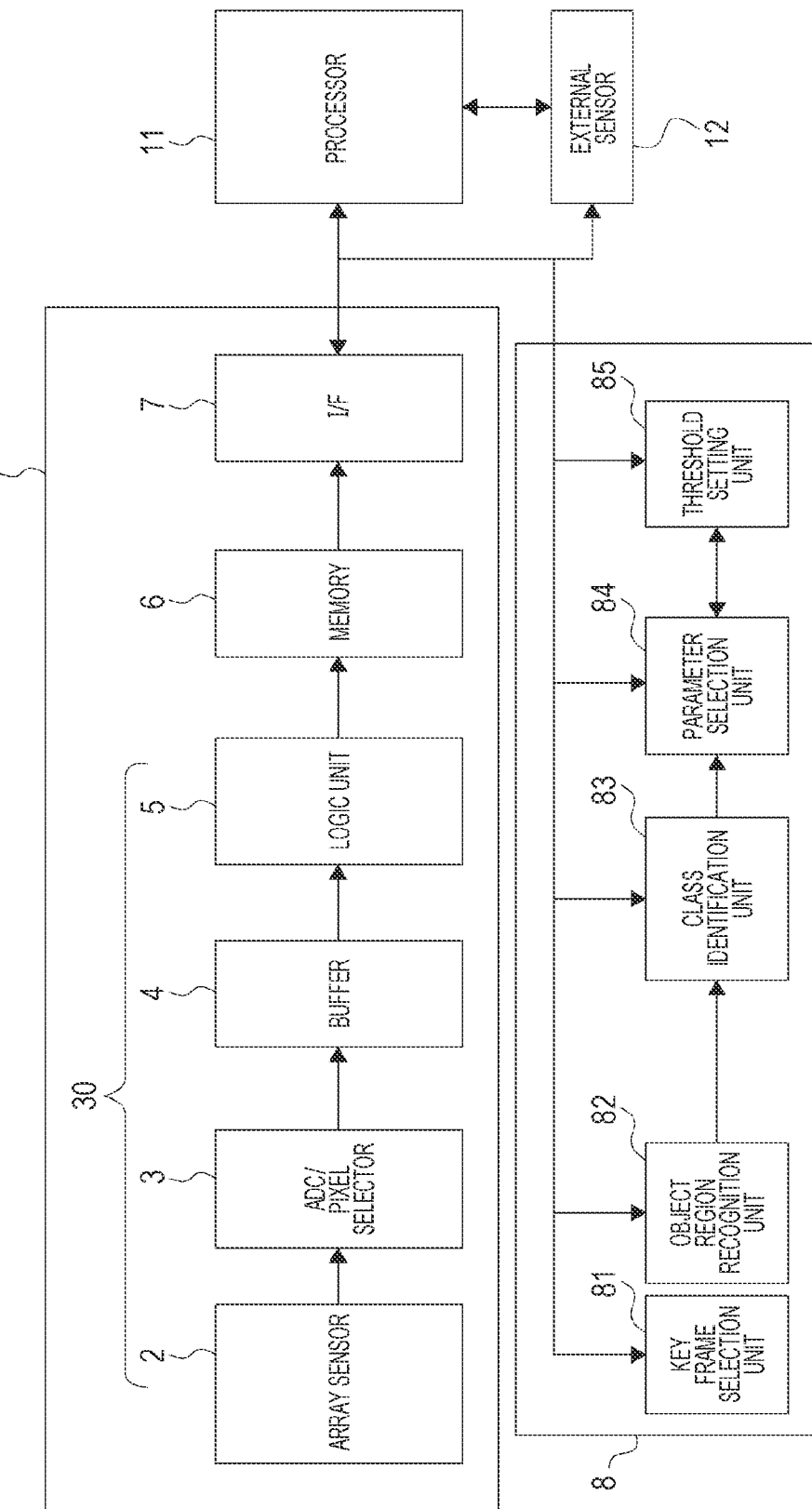
FIG. 25 is a block diagram of another configuration example applicable to the sixth to ninth embodiments.
Figure 26:
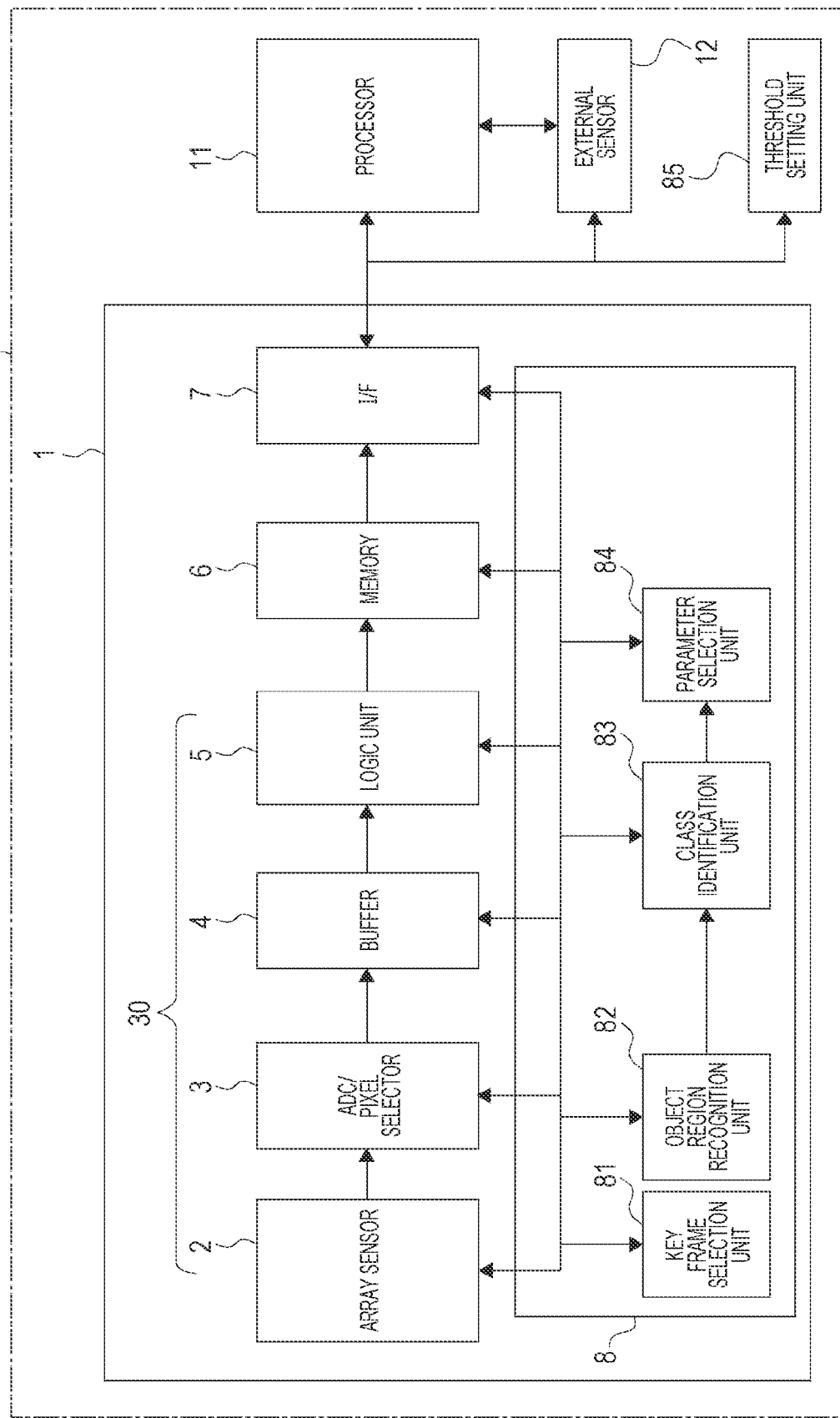
FIG. 26 is a block diagram of still another configuration example applicable to the sixth to ninth embodiments.

The configuration having the threshold setting unit 85 is not limited to the configuration in FIG. 21, and configuration examples as in FIGS. 25 and 26 are also conceivable.

FIG. 25 illustrates a configuration example in which the calculation unit 8 is provided separately from the sensor device 1, as a terminal device 100. Note that, as the terminal device 100, various devices such as an information processing terminal and an imaging device terminal are conceivable.

The calculation unit 8 is provided in the terminal device 100 as a separate chip from the sensor device 1, and can communicate with the sensor device 1 via the interface unit 7.

Then, the calculation unit 8 includes the threshold setting unit 85 that serves as a DNN engine for threshold setting.

Thereby, the calculation unit 8 in FIG. 25 can also perform similar processing to the case in FIG. 22 above.

Note that the configuration example illustrated in FIG. 25 can also be applied to the configuration example in FIG. 1 according to the first to fifth embodiments. The calculation unit 8 may be separate from the sensor device 1.

The configuration example in FIG. 26 is an example in which the threshold calculation unit 85 serving as a DNN engine for threshold setting is formed by a processor or the like independent of the sensor device 1 and the calculation unit 8.

For example, the configuration example in FIG. 26 is a configuration including the sensor device 1 (including the calculation unit 8), the processor 11, the external sensor 12, and the threshold setting unit 85, as the terminal device 100.

Even in this case, the threshold setting unit 85 can communicate with the sensor device 1 via the interface unit 7, and can perform similar processing to FIG. 22 above in cooperation with the calculation unit 8.

Moreover, although not illustrated, the threshold setting unit 85 may be further configured by a separate processor or the like in the configuration in which the sensor device 1 and the calculation unit 8 are different configurations as in FIG. 26.

Note that it is conceivable to arrange the keyframe selection unit 81, the object region recognition unit 82, the class identification unit 83, the parameter selection unit 84, and the like outside the sensor device 1 or outside the calculation unit 8, similarly to the threshold setting unit 85. This point can also be applied as a modification of the configuration illustrated in FIG. 1.

<8. Seventh Embodiment: Active Area-clipping>

An example of implementing more efficient processing using the ROI of the second embodiment will be described as a seventh embodiment.

Note that the processing of the seventh embodiment below can be applied to any of the configurations illustrated in FIGS. 1, 21, 25, and 26.

In the second embodiment, an example of setting the ROI 21 for the object to be detected, and reading only the pixels in the region set as the ROI 21 from the array sensor 2 has been described as illustrated in FIGS. 7 and 8.

Note that the region set as the ROI 21 being concentrated in a specific region in the image is focused.

Figure 27:
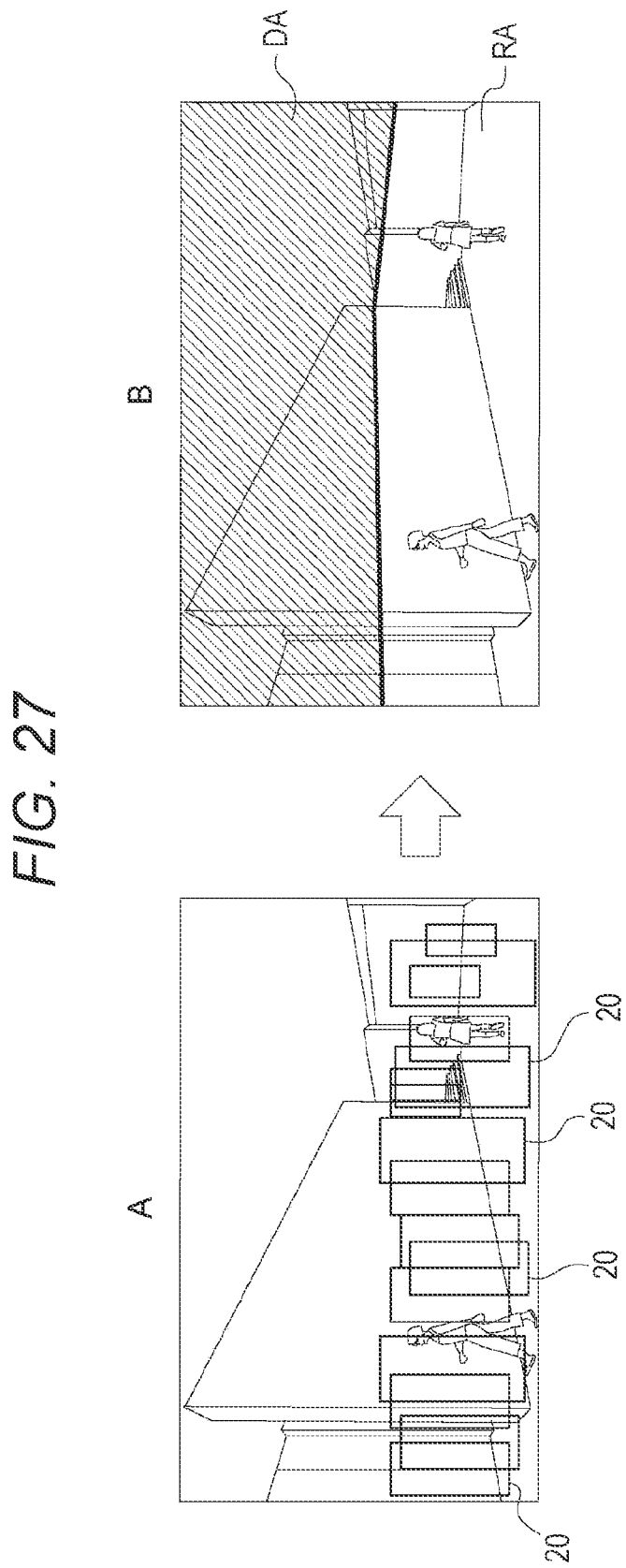
FIG. 27 is an explanatory diagram of active area-clipping according to a seventh embodiment.

FIG. 27A illustrates an example of an image of a surveillance camera in a building. It is assumed that the ROI 21 is set to detect a person. FIG. 27 illustrates the positions of the bounding box 20 in the image, which are the base of the ROI 21 set within the past predetermined period in the image.

For example, in this case, the set positions of the bounding box 20 (and ROI 21) are in a region close to the floor in the image within a past predetermined period.

In other words, since no person appears in a region near the ceiling in the image, it can be said that it is not necessary to perform the person detection processing in an image region near the ceiling.

Therefore, for example, as illustrated in FIG. 27B, a region where the "person" to be detected appears, that is, a region where the bounding box 20 has been set in the past predetermined period, is set as an active area RA, and a region where the "person" to be detected does not appear, that is, a region where the bounding box 20 has not been set in the past predetermined period, is set as an inactive area DA.

Figure 28:
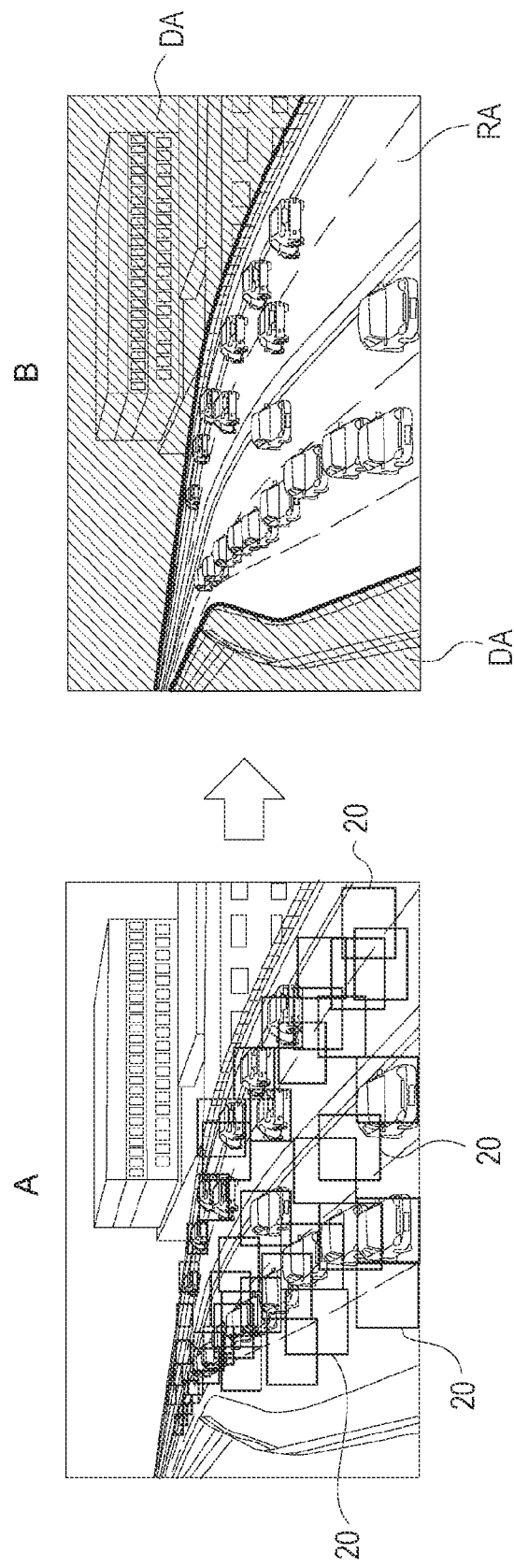
FIG. 28 is an explanatory diagram of the active area-clipping according to the seventh embodiment.

FIG. 28A illustrates an example of an image of a surveillance camera for monitoring cars as objects to be detected on a highway, and illustrates positions of the bounding box 20 set in a past predetermined period.

In this case as well, since the cars appear near the road surface, the active area RA and the inactive area DA can be set as illustrated in FIG. 27B.

The active area RA is set as in the above example in FIG. 27B or 28B, and an object is detected from the detection signal of the active area RA in captured pixels by the array sensor 2. Then, an instruction of the ROI 21 generated on the basis of the object detection is given to the signal processing unit 30 as a region related to the acquisition of the detection signal or the signal processing of the detection signal, as in the second embodiment.

That is, photoelectric conversion is partially performed on the basis of history information of the object detection instead of full-screen scan, and an object is detected, for an object detection keyframe.

Note that the object detection keyframe is a frame in which information is acquired in the entire effective pixel region of the array sensor 2 for object detection in the processing of the second embodiment. Acquiring the information only in the pixel region of the active area RA in the keyframe is the processing of the seventh embodiment.

Figure 29:
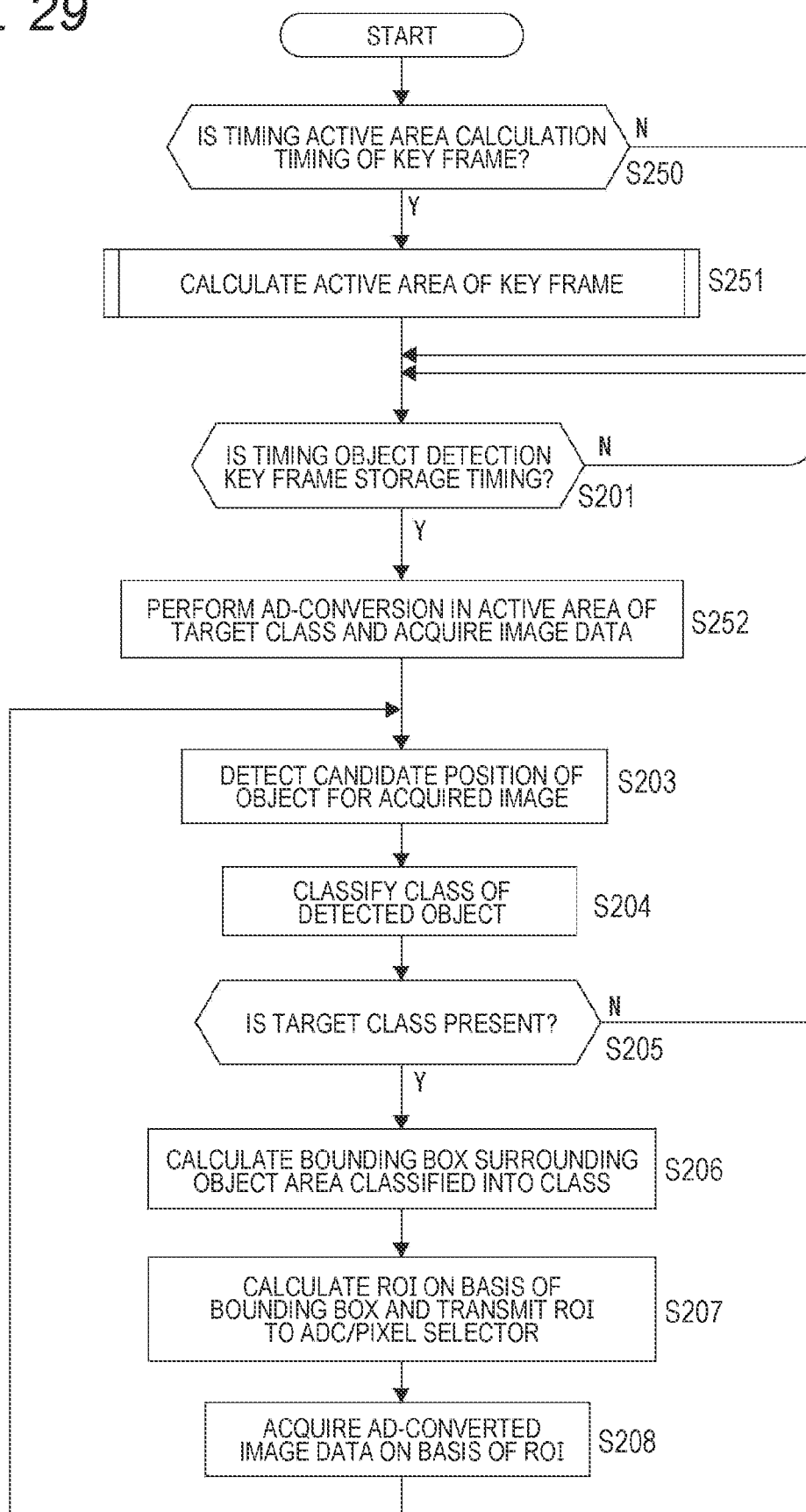
FIG. 29 is a flowchart of the active area-clipping according to the seventh embodiment.

FIG. 29 illustrates a processing example of the calculation unit 8. Note that the same processing as that in FIG. 9 is given the same step numbers.

In step S250, the calculation unit 8 determines whether or not it is calculation timing of the active area for the keyframe, and proceeds to step S161 in a case where it is the calculation timing or proceeds to step S201 in a case where it is not the threshold calculation timing.

Calculation timing for the active area RA for the keyframe can be as follows, for example:

a. every predetermined time interval: for example, every hour from the start of imaging;

b. every predetermined set time: for example, every 0:00 am;

c. every number of times of appearance of a predetermined target class: for example, every 1000 times of appearance of the target class;

d. every capture time of a predetermined target class: for example, every five hours of time that the target class is being imaged; and e. timing by an external command: an instruction from a device/equipment side on which the sensor device 1 is mounted, such as the processor 11.

In the case where it is the calculation timing and the processing proceeds to step S161, the calculation unit 8 calculates the active area RA for the keyframe.

Figure 30:
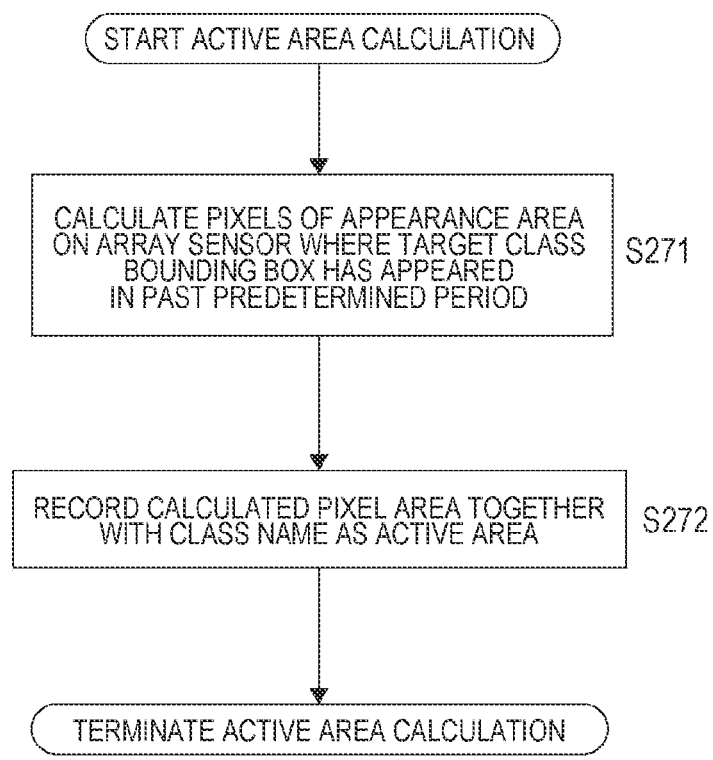
FIG. 30 is a flowchart of keyframe active area calculation according to the seventh embodiment.

FIG. 30 illustrates an example of the processing of calculating the active area RA for the keyframe.

In step S271, the calculation unit 8 (object region recognition unit 82) calculates pixels of an appearance area on the array sensor 2, where the bounding box 20 of the target class has appeared in the past predetermined period.

In this case, all the pixels in each appearing bounding box 20 are the pixels of the appearance area. A range surrounding all the appearing bounding boxes 20 in an envelope manner is set, and all the pixels in the range may be set as the pixels of the appearance area.

Moreover, the range surrounding all the appearing bounding boxes 20 in an envelope manner may be expanded in a peripheral direction, and all the pixels in the expanded range may be set as the pixels of the appearance area.

A pixel range including all of the appearance areas of the bounding boxes 20 calculated in this way is the active area RA.

In step S272, the calculation unit 8 (object region recognition unit 82) records the calculated pixel area together with the class name as the active area RA for the keyframe. For example, the information is recorded in a recording region inside the calculation unit 8, recorded in a predetermined region of the memory 6, or transferred to the processor 11 for recording.

Thereby, the active area RA according to the target class is set.

In step S201 in FIG. 29, the calculation unit 8 (keyframe selection unit 81) determines in step S201 whether or not it is object detection keyframe recording timing.

The object detection keyframe recording timing means timing at which information is acquired from the array sensor 2 for object detection, similar to the second embodiment (FIG. 9).

The object detection keyframe recording timing may be determined by, for example, a command from the outside of the sensor device 1 such as the processor 11. For example, it is assumed to determine the object detection keyframe recording timing at intervals of 60 seconds in response to an instruction of 60 seconds.

When the object detection keyframe recording timing has arrived, the calculation unit 8 proceeds to step S252 and acquires AD-converted image data of the pixels of the active area RA of the array sensor 2. For example, the ADC/pixel selector 3 outputs the image signal of one frame from the array sensor 2 for the active area RA.

In step S203, the calculation unit 8 (object region recognition unit 82) detects a candidate position of an object in the acquired image. Steps S203 to S208 are similar to the steps in FIG. 9.

According to the processing in FIG. 29, the object detection in step S203 can be performed only in the active area RA, not in the entire effective pixel region of one frame. Then, the active area RA is a region where target class object detection is possible. In other words, the target class object detection is almost not possible in the region other than the active area RA.

Therefore, for example, efficient processing and reduction in power consumption can be achieved by the reduction in the number of pixels to be read and the decrease in the detection range of the object detection keyframe.

Note that, in the above example, the active area RA is set on the basis of the history of the bounding box 20. However, the active area RA may be set on the basis of the history of the ROI 21. In that case, it is conceivable to include the history of the pixel position of the ROI (ROI 21 (NEW) described in FIG. 10) that moves for each frame.

<9. Eighth Embodiment: Threshold Setting and Area-Clipping Using AROI>

A processing example of further improving efficiency of the area-clipping using the AROI 22 described as the third embodiment will be described as an eighth embodiment. Note that the processing of the eighth embodiment can be performed in any of the configurations in FIGS. 21, 25, and 26.

In the eighth embodiment, in a case of using an AROI 22 using a template, parameters are set on the basis of a set threshold, for an object (class) or a portion to be detected, for example. That is, the idea of the threshold of the sixth embodiment is adopted, and the threshold is determined on the basis of a correct answer rate of object detection calculated by a DNN, and the parameters are set.

For example, resolution distribution of a region of interest in the AROI 22 is determined according to the threshold set using a confidence rate.

Figure 31:
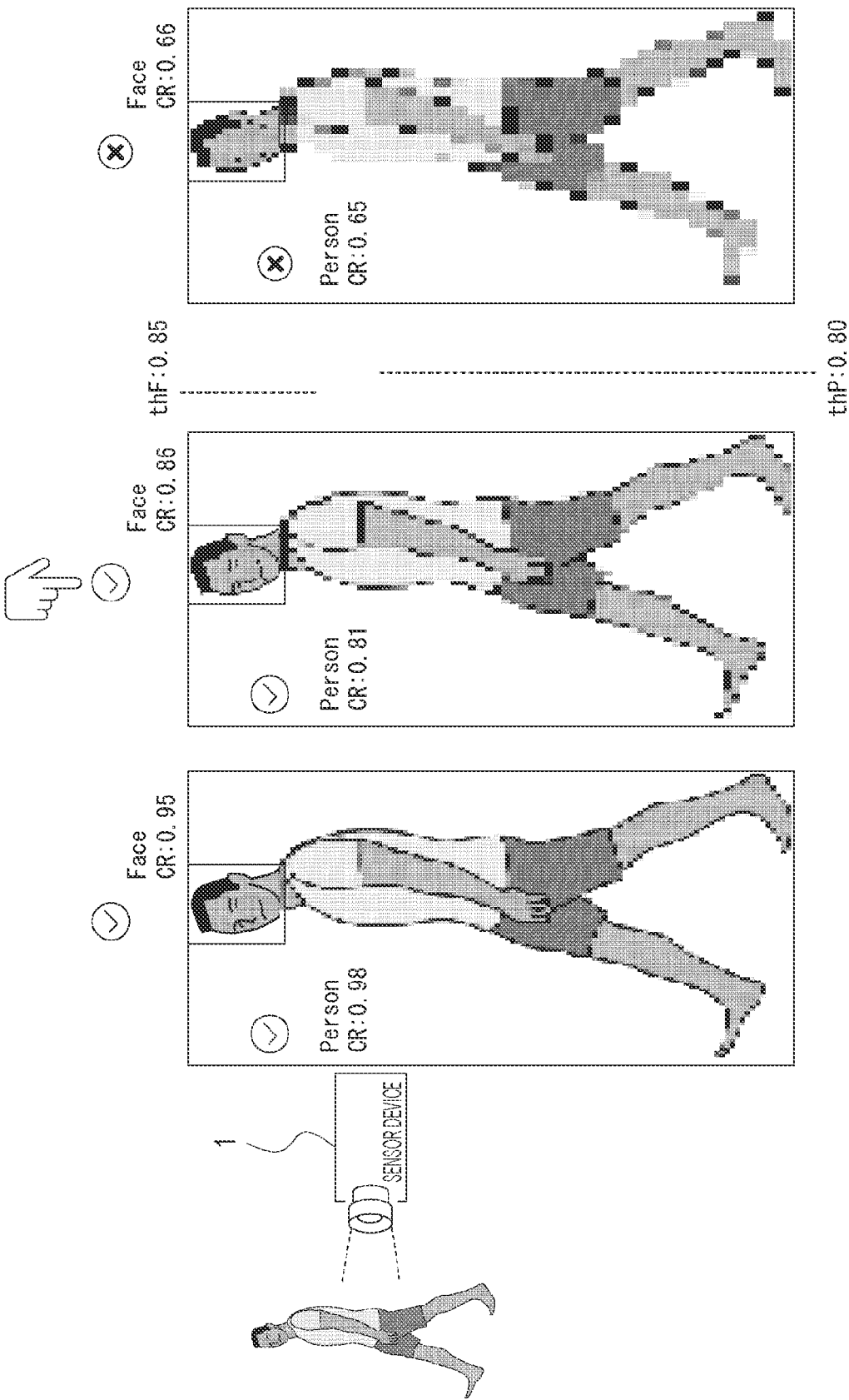
FIG. 31 is an explanatory diagram of threshold setting for an advanced ROI (AROI) according to an eighth embodiment.

FIG. 31 schematically illustrates an example. Consider a case where a person is a target class and a case where a face is a target class.

It is assumed that first resolution >second resolution >third resolution is satisfied.

A confidence rate CR for face detection is 0.95 with the first resolution, 0.86 with the second resolution, and 0.66 with the third resolution.

The confidence rate CR for human (body) detection is 0.98 with the first resolution, 0.81 with the second resolution, and 0.65 with the third resolution.

In a case where a threshold thF for face detection is 0.85, the second resolution is selected as a parameter adapted to cause an image data amount to be as small as possible, and image processing for the pixels in the template is performed.

Further, in a case where a threshold thP for face detection is 0.80, the second resolution is selected as a parameter adapted to cause an image data amount to be as small as possible, and image processing for the pixels in the template is performed.

In both cases, the second resolution is favorable. However, in some cases, the first resolution is set in the case of face detection where the threshold thF is 0.94, or the third resolution is set in the case of human detection where the threshold thP is 0.60.

That is, in the case of using the AROI 22, the threshold is set for each target class, and the parameters of the image processing, readout processing, or other processing for the pixels in the AROI 22 are set.

Figure 32:
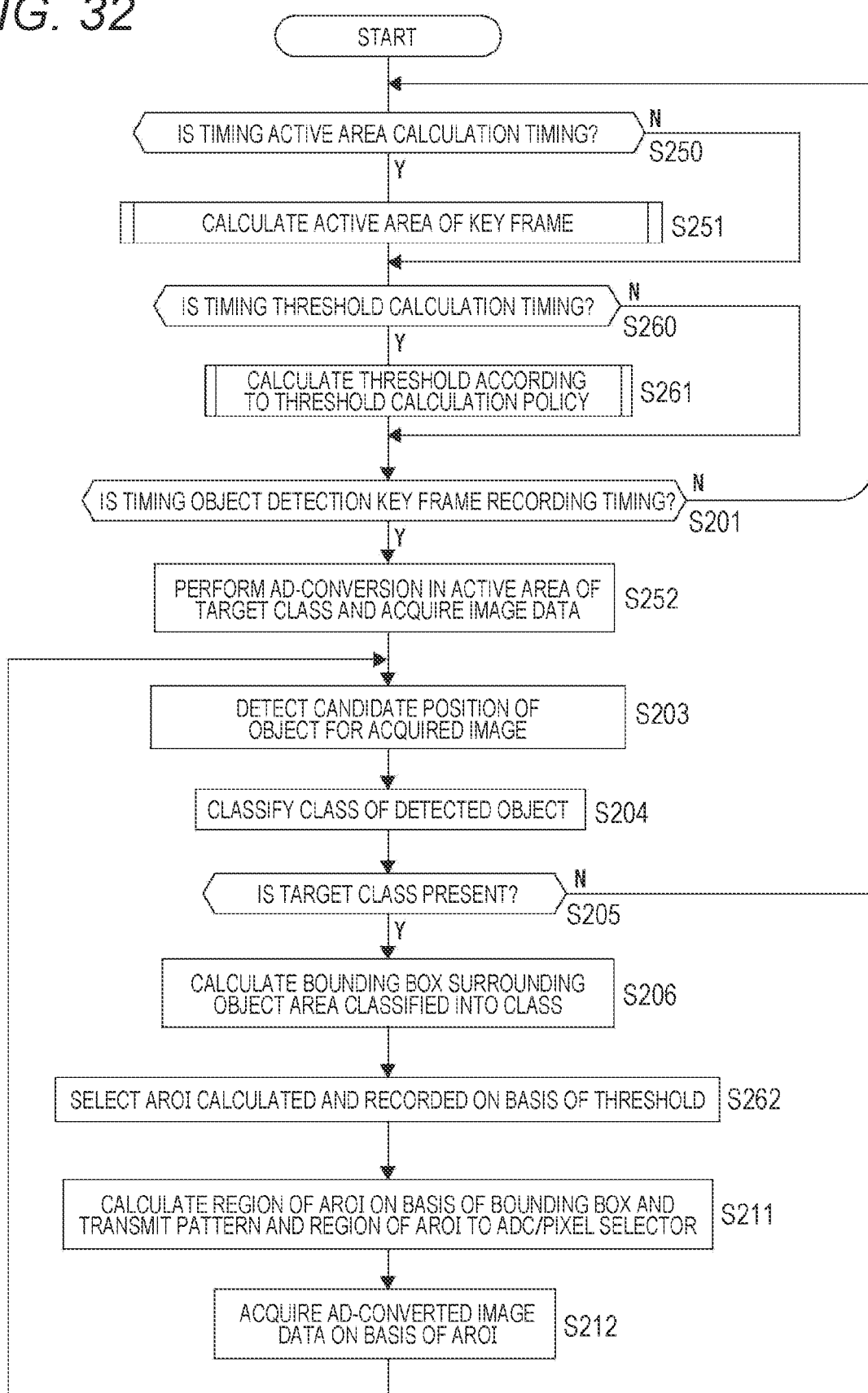
FIG. 32 is a flowchart of an area-clipping analysis using an advanced ROI according to the eighth embodiment.

FIG. 32 illustrates a processing example of a calculation unit 8.

Steps S250 and S251 in FIG. 32 are similar to steps S250 and S251 in FIG. 29, and the calculation unit 8 calculates an active area RA (processing in FIG. 30) at detection timing of the active area RA for the keyframe.

Steps S260 and S261 are similar to steps S150 and S151 in FIG. 22. That is, in step S260, the calculation unit 8 (threshold setting unit 85) determines whether or not it is threshold calculation timing, and calculates the threshold in a case where it is the threshold calculation timing in step S261 (the processing in FIG. 24).

As the threshold calculation processing in FIG. 24 in this case, the calculation unit 8 (object region recognition unit 82) performs steps S160 to S164 similarly to the above description. Then, in step S165, the calculation unit 8 (threshold setting unit 85) calculates the threshold based on the confidence rate from data of a pixel region corresponding to an AROI pattern as a template while changing resolution for a target class surrounded by a bounding box 20.

In this case, for the AROI pattern as a template according to the class, parameters are set according to the threshold. For example, the resolution for the region on the AROI pattern is set.

Then, in step S166, the threshold, the target class, the AROI pattern, the necessary parameters, and a threshold calculation policy information are recorded in association with one another. For example, the information is recorded in a recording region inside the calculation unit 8, recorded in a predetermined region of the memory 6, or transferred to the processor 11 for recording.

In step S201 in FIG. 32, the calculation unit 8 determines whether or not it is object detection keyframe recording timing, and when the object detection keyframe recording timing has arrived, the calculation unit 8 proceeds to step S252 and acquires AD-converted image data of pixels of the active area RA of an array sensor 2. For example, the ADC/pixel selector 3 outputs the image signal of one frame from the array sensor 2 for the active area RA.

In step S203, the calculation unit 8 (object region recognition unit 82) detects a candidate position of an object in the acquired image. Steps S203 to S206 are similar to the steps in FIG. 9.

After calculating the bounding box 20 in step S206, the calculation unit 8 (parameter selection unit 84) selects the AROI pattern calculated and recorded on the basis of the threshold in step S262.

In step S211 the calculation unit 8 (object region recognition unit 82) calculates an actual AROI 22 on the basis of the bounding box 20. That is, an actual pixel region corresponding to the selected AROI pattern is obtained. For example, the AROI 22 is obtained by adjusting the size of the template according to the size of the bounding box 20.

Then, the calculation unit 8 (object region recognition unit 82) transmits the AROI 22 (pattern and region of AROI) to an ADC/pixel selector 3.

In response to the transmission of the AROI, the ADC/pixel selector 3 AD-converts and outputs only pixels corresponding to the AROI 22 in an array sensor 2.

In step S212, the calculation unit 8 acquires image data of the next frame including information of only the pixels in the AROI 22. Then, the calculation unit 8 performs processing in steps S203 and S204 for the acquired frame.

As described above, for example, the parameters are set according to the confidence rate for the AROI 22, and the parameters such as the resolution are set, whereby imaging processing and image processing can be made efficient while maintaining object detection accuracy.

<10. Ninth Embodiment: Active Sampling by Threshold Setting>

An example of adding a method of determining time resolution on the basis of a correct answer rate of object detection calculated by a DNN to the active sampling method described in the fifth embodiment will be described as a ninth embodiment.

That is, processing of dynamically changing a frame rate is performed on the basis of an average moving amount per unit time of a target class.

Note that the processing of the ninth embodiment can be performed in any of the configurations in FIGS. 21, 25, and 26.

In the fifth embodiment described above, the normal mode and the idling mode are prepared, and a low frame rate is set as the idling mode during the period when the presence of the target class is not detected in the captured image. Then, when the presence of the target class is confirmed, the frame rate is increased as the normal mode to make an information amount dense.

In the ninth embodiment, the frame rate in the normal mode is set according to the target class, in addition to the processing.

FIG. 32A illustrates an example of an image in a case where a sensor device 1 is used in a surveillance camera for capturing a highway. The target class is car and bounding boxes 20 are illustrated. The dashed arrow indicates a traveling direction of the cars.

FIG. 32B illustrates a moving amount of a captured car as a change in position (pixel position) of the bounding box 20 in the image in successive frames. When considering such a moving amount in many cars, it is assumed that an average moving amount is 1152 pixels/second.

In this case, it is assumed that a sampling rate that can maintain object tracking (tracking of an object on successive frame images) is 46 fps.

Figure 33:
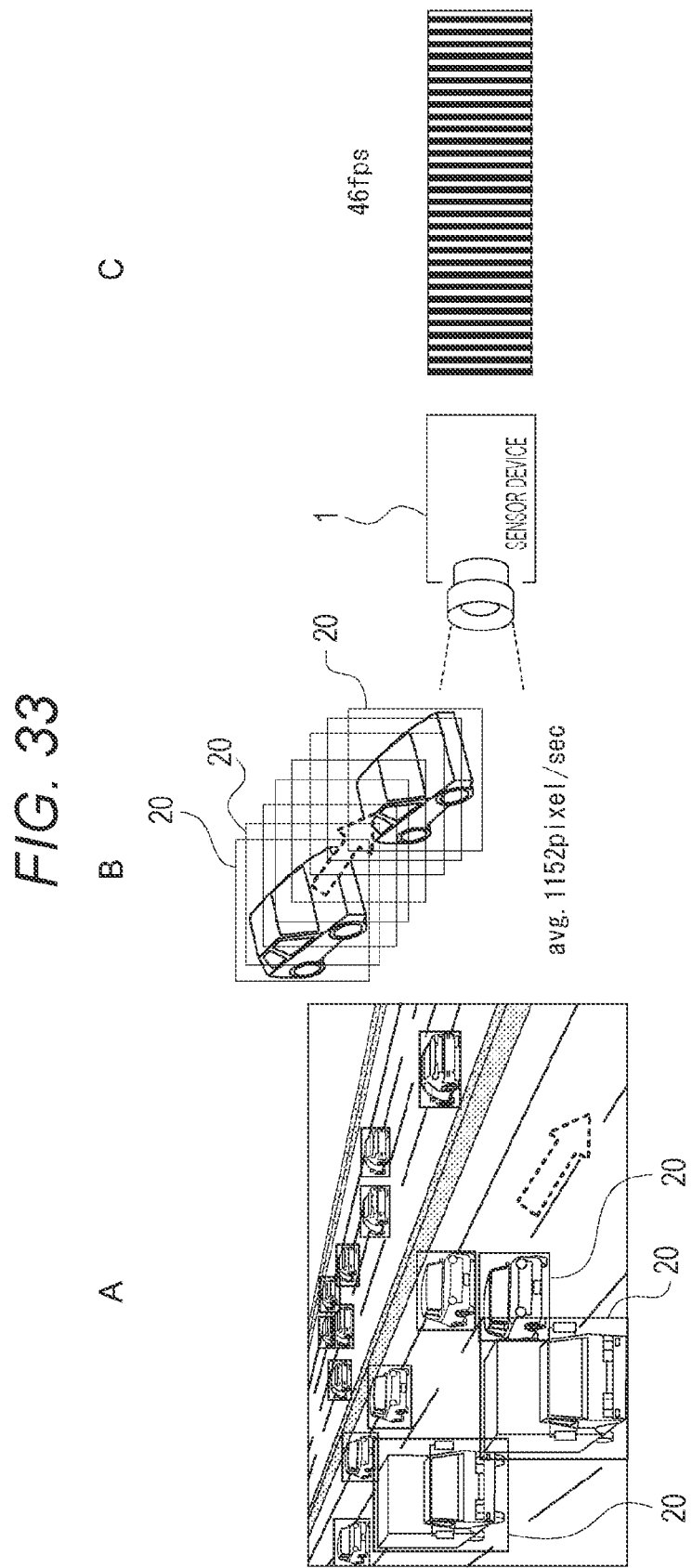
FIG. 33 is an explanatory diagram of active sampling according to a ninth embodiment.

FIG. 33A illustrates an example of an image in a case where the sensor device 1 is used in a surveillance camera in a building. The target class is person and bounding boxes 20 are illustrated. The dashed arrow indicates a moving direction of the persons.

FIG. 32B illustrates a moving amount of a captured person as a change in position (pixel position) of the bounding box 20 in the image in successive frames. When considering such a moving amount in many persons, it is assumed that an average moving amount is 192 pixels/second.

In this case, it is assumed that a frame rate that can maintain object tracking is 5 fps.

The frame rate that can maintain the object tracking differs between the case where the target class is car and the case where the target class is person, as described above, for example.

Then, the frame rate that can maintain the object tracking is obtained by a DNN according to the target class, and a threshold (allowable frame rate lower limit) is obtained, so that the accuracy of object detection can be maintained while tracking the object.

Note that, the frame rate is determined according to setting of read timing of an array sensor 2 or setting of the sampling rate of an ADC/pixel selector 3.

Figure 35:
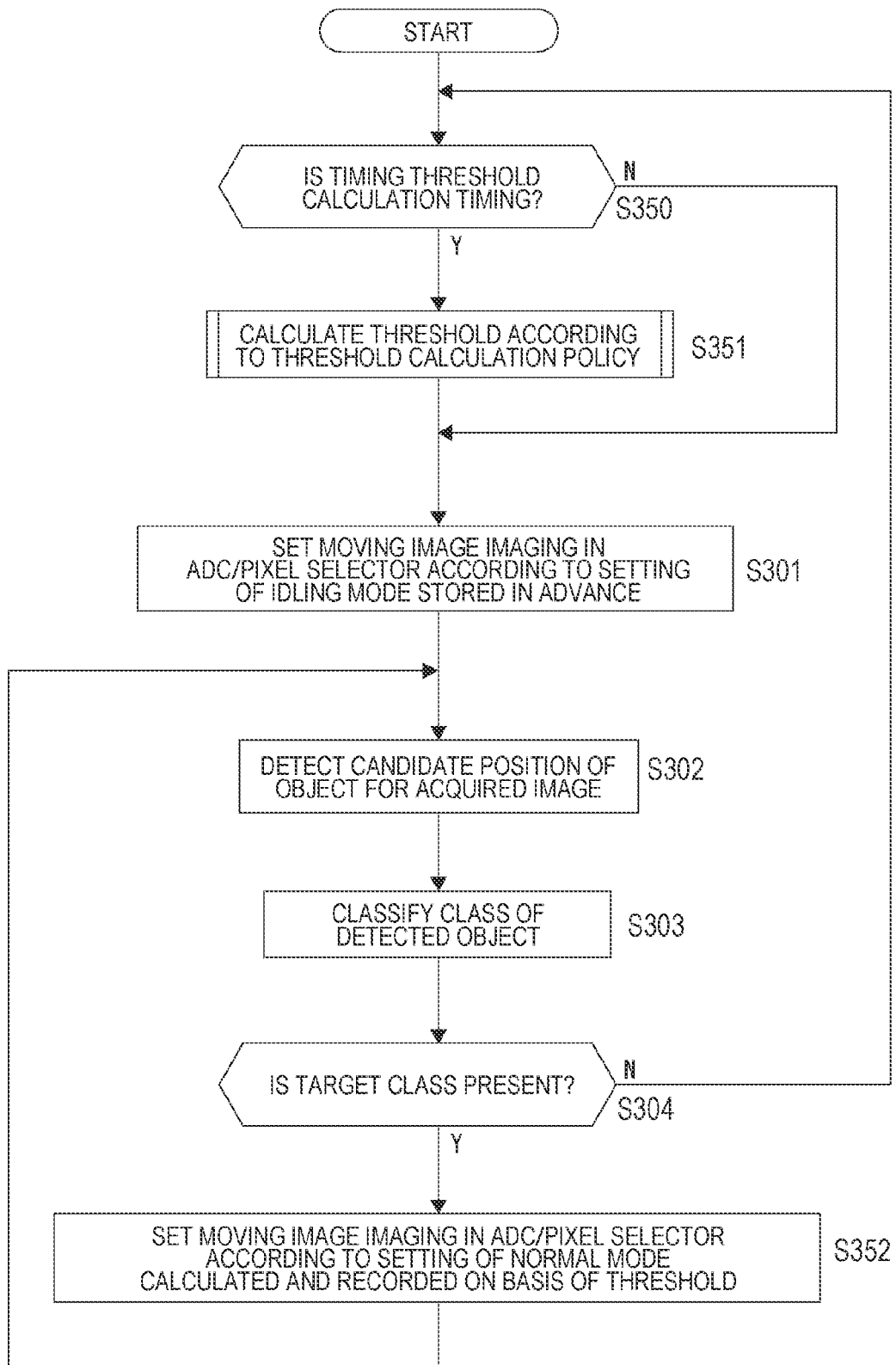
FIG. 35 is a flowchart of the active sampling according to the ninth embodiment.

FIG. 35 illustrates a processing example of a calculation unit 8.

Steps S350 and S351 are similar to steps S150 and S151 in FIG. 22. That is, in step S350, a calculation unit 8 (threshold setting unit 85) determines whether or not it is threshold calculation timing, and calculates the threshold in a case where it is the threshold calculation timing in step S351 (the processing in FIG. 24).

As the threshold calculation processing in FIG. 24 in this case, the calculation unit 8 (object region recognition unit 82) performs steps S160 to S164 similarly to the above description. Then, in step S165, the calculation unit 8 (threshold setting unit 85) calculates the threshold (the frame rate to serve as the threshold) that can maintain the object tracking while changing the frame rate for the target class surrounded by the bounding box 20.

Thereafter, in step S166, the calculation unit 8 (threshold setting unit 85) records the threshold calculated in step S165, the target class, and threshold calculation policy information used for calculating the threshold in association with one another. For example, the information is recorded in a recording region inside the calculation unit 8, recorded in a predetermined region of the memory 6, or transferred to the processor 11 for recording.

Thereby, for example, a parameter based on the threshold according to the target class, that is, the value of the frame rate that can maintain the object tracking, which is as low as possible, is set.

Steps S301 to S106 in FIG. 35 are similar to the steps in FIG. 18.

In step S301, a calculation unit 8 (keyframe selection unit 81) sets moving image capture setting in an ADC/pixel selector 3 according to setting of an idling mode stored in the calculation unit 8 in advance, for example.

Therefore, if the idling mode is set to 1 fsp, a moving image is captured at intervals of 1 sec, for example.

In step S302, the calculation unit 8 (object region recognition unit 82) detects a candidate position of an object in the acquired image.

In step S303, the calculation unit 8 (class identification unit 83) classifies the objects detected as candidates into classes.

In step S304, the calculation unit 8 confirms whether or not a target class is present in the classes obtained as a class identification result.

When the target class is not present, the calculation unit 8 repeats the processing of steps S301, S302, and S303 via steps S350 and S351.

During the processing, the processing of step S351 is performed when the threshold calculation timing has arrived.

In the case where the presence of the target class is determined in step S304, the calculation unit 8 moves the processing from step S304 to S352.

The calculation unit 8 (keyframe selection unit 81) sets the parameter stored in the processing in step S351 to the normal mode setting, and sets moving capture setting in the ADC/pixel selector 3 according to the stored normal mode setting and instructs the ADC/pixel selector 3 to capture an image in the normal mode.

Figure 34:
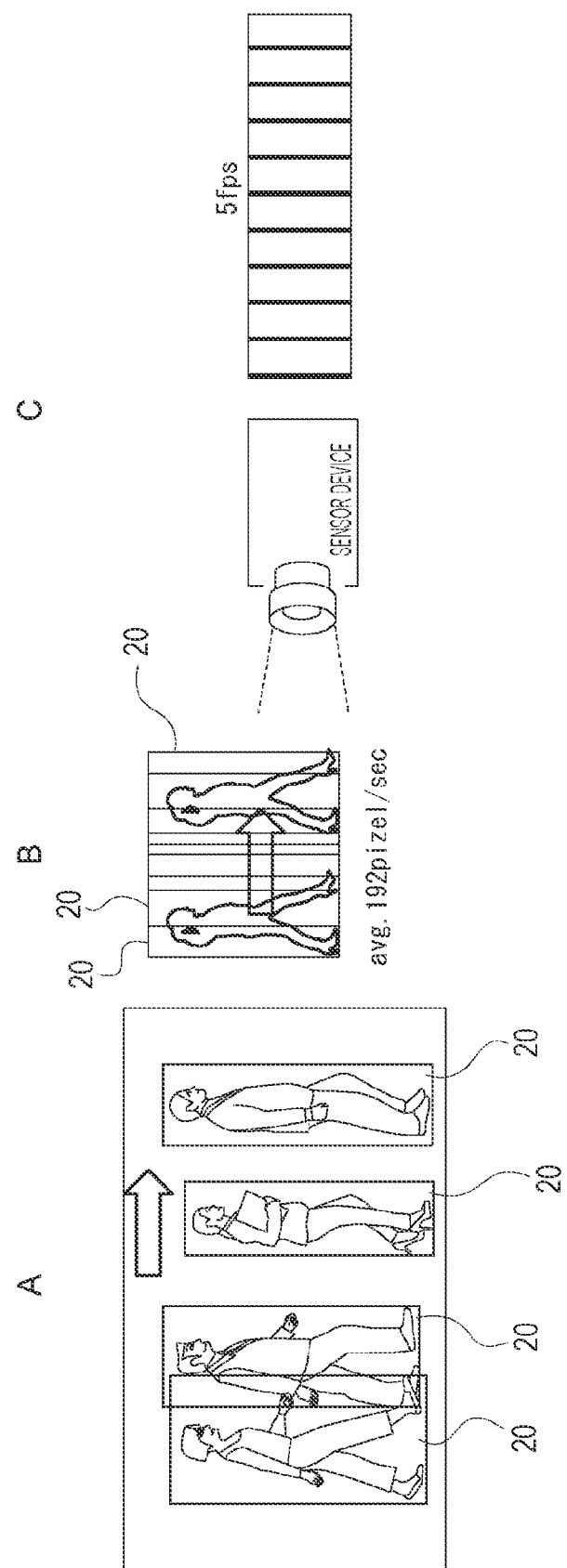
FIG. 34 is an explanatory diagram of the active sampling according to the ninth embodiment.

For example, in a case where the target class is person, the object tracking can be maintained at 5 fps as illustrated in FIG. 34C, and the frame rate=5 fps, the frame rate setting in the normal mode is 5 fsp.

In the state where the mode is switched to the normal mode, the calculation unit 8 performs the processing of steps S302 and S303.

Then, the normal mode continues as long as the target class is present in the captured image, while the processing returns to step S301 via steps S350 and S351 when the target class is no longer present and the normal mode is switched to the idling mode.

The processing as the active sampling is performed as described above. Thereby, the frame rate is decreased and the data amount is compressed especially during the period when the target class is not present, thereby the power consumption is reduced.

Furthermore, even in the normal mode, the processing is performed at the frame rate adapted according to the target class. Therefore, the frame rate is considerably low depending on a class (the above 5 fps, for example). Therefore, even in the normal mode, the data amount is compressed and the power consumption is reduced.

Although the calculation unit 8 instructs the ADC/pixel selector 3 to change the frame rate to make the frame rate variable, the calculation unit 8 may instruct a logic unit 5 to convert the frame rate.

For example, read from the array sensor 2 is always performed at 100 fps, but the logic unit 5 is instructed to thin out frames according to the parameters set in the idling mode and the normal mode. Thereby, the data amount regarding transmission to the processor 11 can be reduced.

<11. Application to Moving Body>

The technology according to the present disclosure can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 36:
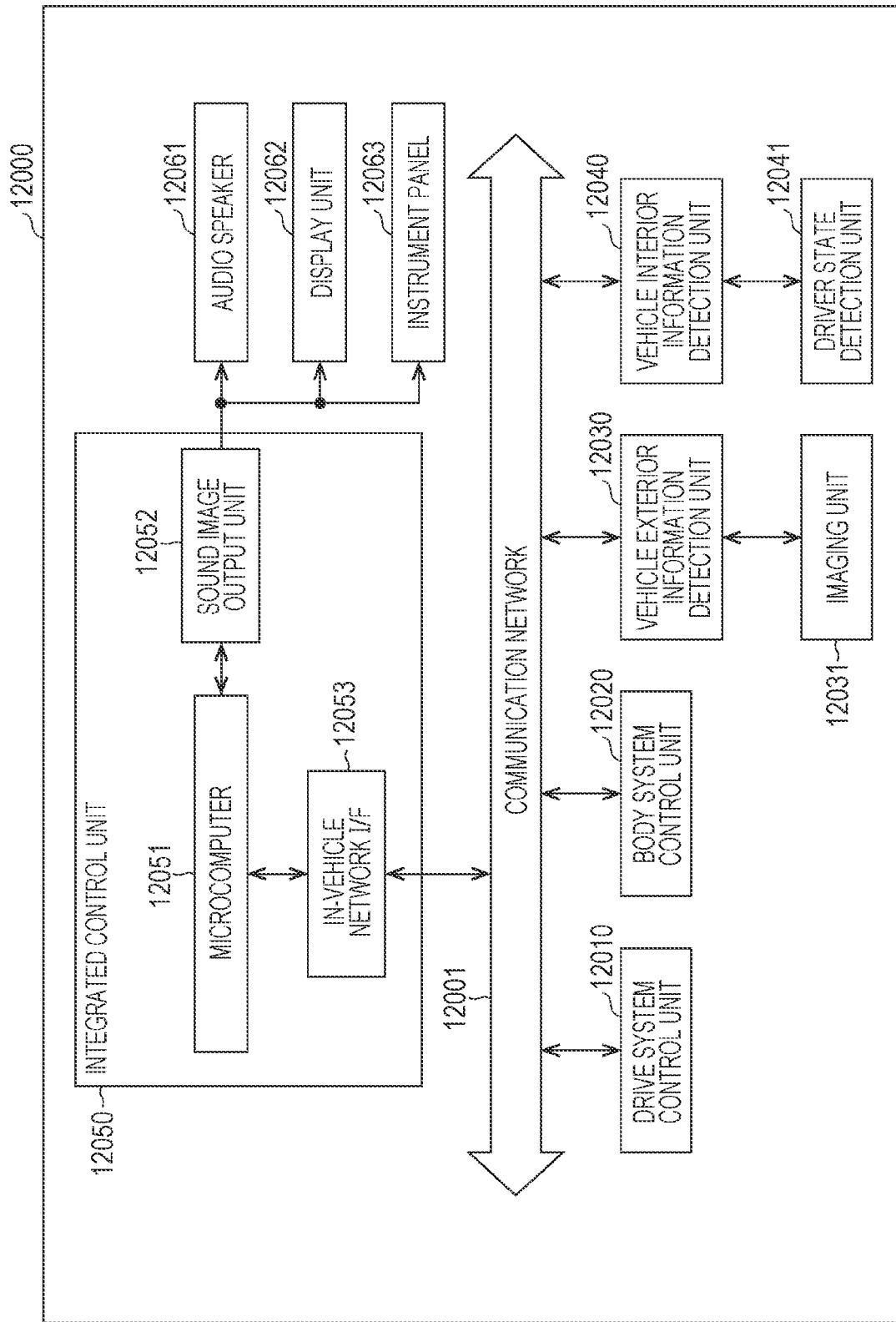
FIG. 36 is a block diagram illustrating an example of a schematic configuration of a vehicle control system.

FIG. 36 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 36, the vehicle control system 12000 includes a drive system control unit 12010, a body system control unit 12020, a vehicle exterior information detection unit 12030, a vehicle interior information detection unit 12040, and an integrated control unit 12050.

Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light reception amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on a vehicular gap, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12030 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 36, as the output device, an audio speaker 12061, a display unit 12062, and an instrument panel 12063 are exemplarily illustrated. The display unit 12062 may include, for example, at least one of an on-board display or a head-up display.

Figure 37:
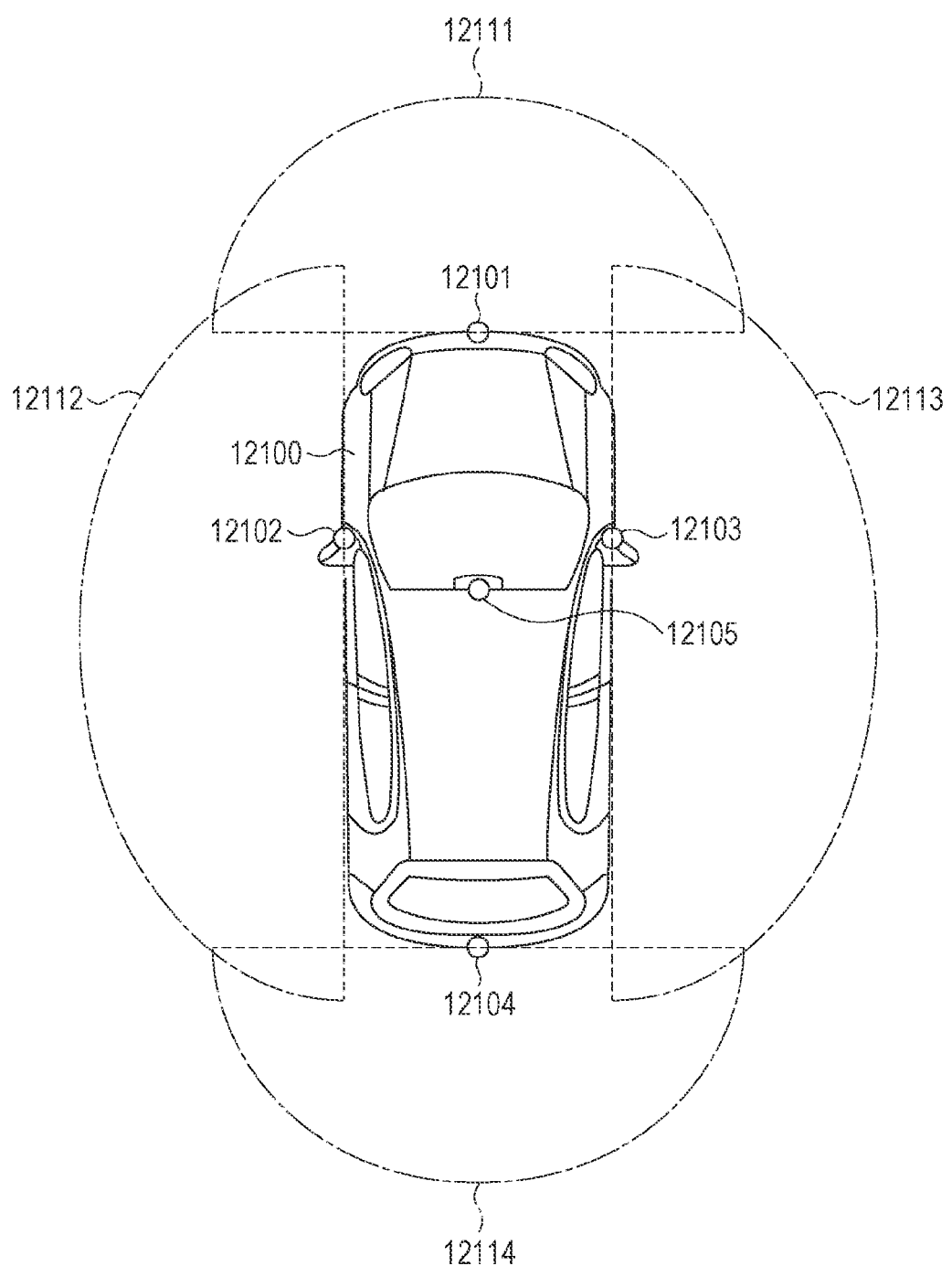
FIG. 37 is an explanatory diagram illustrating an example of installation positions of a vehicle exterior information detection unit and an imaging unit.

FIG. 37 is a diagram illustrating an example of an installation position of the imaging unit 12031.

In FIG. 37, imaging units 12101, 12102, 12103, 12104, and 12105 are included as the imaging unit 12031.

The imaging units 12101, 12102, 12103, 12104, and 12105 are provided at positions such as a front nose, side mirrors, a rear bumper, a back door, and an upper portion of a windshield in an interior of the vehicle 12100, for example. The imaging unit 12101 provided at the front nose and the imaging unit 12105 provided at an upper portion of the windshield in an interior of the vehicle mainly acquire front images of the vehicle 12100. The imaging units 12102 and 12103 provided at the side mirrors mainly acquire side images of the vehicle 12100. The imaging unit 12104 provided at the rear bumper or the back door mainly acquires a rear image of the vehicle 12100. The imaging unit 12105 provided at the upper portion of the windshield in the interior of the vehicle is mainly used for detecting a preceding vehicle, a pedestrian, an obstacle, a traffic signal, a traffic sign, a lane, or the like.

Note that FIG. 37 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations, for example. Specifically, as an image sensor mounted on the imaging unit 12031, the sensor device 1 of the present disclosure is applied, and some or all of split image adaptation, area-clipping, intelligent compression, and active sampling can be executed. Thereby, for example, image processing adapted to detect the vehicle exterior information, and reduction in the processing load by appropriate reduction in the information amount without deteriorating the detection accuracy become possible.

<12. Conclusion and Modification>

In the above embodiments, the following effects can be obtained.

As described in the first and sixth embodiments, the sensor device 1 includes the array sensor 2 in which a plurality of visible or non-visible light imaging elements is arranged in a one dimensional or two dimensional manner, the logic unit 5 (image processing unit) that performs image processing using the parameters on which an instruction is given for the image signal obtained by imaging in the array sensor 2, and the calculation unit 8. The calculation unit 8 performs the class identification for the object detected from the image signal obtained by the imaging in the array sensor 2, selects the parameters to be used for image processing on the basis of the identified class, and performs processing settings for the logic unit 5 using the selected parameters.

That is, the logic unit 5 applies the image processing to the image signal obtained by the array sensor 2. The parameters of the image processing are set on the basis of the class identification of the detected object in the image signal.

In the case of detecting an object from an image, an image that a person perceives high quality is not necessarily an image with high recognition accuracy. Further, the desired image quality differs depending on the class of the object to be recognized. That is, an image to which the image processing according to normal parameter settings is applied to have visually high quality is not necessarily image quality suitable for object detection. Furthermore, the desired image processing parameters differ depending on the class of the object to be recognized.

Therefore, the parameter set is stored in advance for each class, and the parameter set to be used is selected according to the class identification of the detected object in the captured image. As a result, the image processing suitable for detecting the target object is performed. According to the image for which such image processing has been performed, the object detection accuracy can be improved.

Furthermore, since the image quality adjustment desirable for object detection is different from the image quality adjustment that a person perceives beautiful, a blur filter for giving priority to beauty is not used, for example. Therefore, the parameters that are set often bring about reduction in the processing load.

Furthermore, the data amount is often reduced depending on the parameters according to the class (for example, the parameters related to gradation change and compression), and in that case, a delay in the processing due to a high load of calculation on the processor 11 side or an increase in the power consumption of the entire system can be avoided.

The sensor device 1 of each embodiment includes the interface unit 7 (output unit) that outputs the image signal processed by the logic unit 5 (image processing unit) to an external device.

The sensor device 1 performs the image processing according to the class of the object by the internal logic unit 5, and transmits and outputs the image signal to the processor 11 (step S108 in FIG. 5), thereby eliminating the need of image quality adjustment for improving the object detection in the processor 11. Therefore, it is possible to detect an object with high accuracy while reducing the processing load on the processor 11.

Furthermore, the parameter set selected on the basis of the class recognition is not necessarily the parameter set for obtaining the highest image quality visually recognized by a person. In some cases, the data amount of the image to be processed is reduced. That is, not necessarily an image with the highest image quality viewed by a person but an image with image quality suitable for the object to be recognized by the processor is output, and in some cases, the data amount of the image signal to be transmitted can be reduced.

Thereby, the communication costs can be reduced without degrading the accuracy of object detection. The delay in transfer in a case where calculation processing is performed in the cloud is also improved.

It has been described that the interface unit 7 (output unit) of the embodiment also transmits the information regarding the class identification for the output image signal (step S108 in FIG. 5).

As a result, for example, the output destination processor 11 or a cloud AI processor can detect the object after recognizing the class, and can perform more accurate object detection.

In the first and sixth embodiments, it has been stated that the calculation unit 8 performs object region recognition processing of detecting a candidate object region of an object to be detected in one frame of the image signal, class identification processing of identifying the object in the object region detected in the object region recognition processing, and parameter selection processing of selecting the parameters on the basis of an identification result of the class identification processing and performing the processing settings for the logic unit 5 (see FIGS. 1 and 5).

That is, the calculation unit 8 includes the object region recognition unit 82 that performs the object region recognition processing, the class identification unit 83 that performs the class identification processing, and the parameter selection unit 84 that performs the parameter selection processing, thereby implementing the object candidate detection from one frame of the image signal, the class identification, and the parameter selection based on the class identification.

In the first and sixth embodiments, the calculation unit 8 performs the object region recognition processing of detecting a candidate object region of an object to be detected in one frame of the image signal, the class identification processing of identifying the object in the object region detected in the object region recognition processing, processing of determining whether or not the target class is present among the classes identified in the class identification processing, and the parameter selection processing of selecting the parameters on the basis of a class recognition result of the target class and performing the processing settings for the logic unit 5 in the case where the target class is present (see FIGS. 1, 5, and 22).

By determining the presence of the target class, the parameter selection based on the class of the object to be recognized can be efficiently executed. In other words, since the parameter selection based on detection of an untargeted object is not performed, the image recognition accuracy for the targeted object can be improved due to the absence of unnecessary parameter selection, the presence of efficient processing, and the absence of unnecessary parameter settings.

In the first and sixth embodiments, a plurality of target classes can be set, and in the case where objects of a plurality of target classes are present in one frame, the parameter selection processing is performed on the basis of selected one target class (see step S106 in FIGS. 5 and 22).

By making the plurality of target classes settable, image recognition for an object across a plurality of classes can be coped with.

Further, in the case where objects of a plurality of target classes are present in one frame, an appropriate parameter set can be selected by causing the parameter selection to be performed on the basis of one target class by, for example, selecting a dominant or prevailing target class.

Furthermore, in the first or sixth embodiment (steps S105 and S106 in FIG. 5 or 22), an example of calculating the bounding box 20 surrounding the object for the object region corresponding to the target class, and selecting one target class using the area of the bounding box 20 in the case where a plurality of target classes is present, has been described.

In the case where objects of a plurality of target classes are present, the region of each object is specified by the bounding box 20, and a dominant area in one frame of the objects of each target class is obtained, so that the prioritized target class can be determined. Thereby, the parameters can be appropriately selected.

In the first and sixth embodiments, an example in which the calculation unit 8 selects the parameter set including a plurality of parameters set for each class on the basis of the identified class has been described. That is, the parameter set including parameters of various types of processing of the logic unit as a set is stored in advance, and this parameter set is selected and set in the logic unit (see step S107 in FIGS. 4, 5, and 22).

Thereby, the plurality of parameters suitable for the target class can be set as parameters according to the various types of image processing of the logic unit 5.

In the first embodiment, an example in which the parameter set is a set of a plurality of parameters obtained by deep learning using the image of the object corresponding to each class has been described.

For example, the parameters for image processing with a high image recognition rate of person recognition are obtained by the deep learning using person images as training data, and a parameter set of the obtained parameters is set as the parameter set corresponding to the class of "person" (see FIG. 4).

Thereby, the parameter set suitable for each class can be prepared, and the parameters suitable for the target image recognition can be selected by the selection of the parameter set.

In the first and sixth embodiments, an example in which the calculation unit 8 performs the class identification for the frame serving as the keyframe in the image signal obtained by the imaging in the array sensor 2, and selects the parameters to be used in the image processing on the basis of the identified class has been described (see steps S101 and S102 in FIGS. 5 and 22).

By targeting the keyframe instead of all the frames, the processing load on the calculation unit 8 does not become excessive. Furthermore, by selecting the keyframe on the basis of an appropriate selection algorithm, the state in which appropriate parameter selection is performed can be maintained.

In the first and sixth embodiments, an example in which the keyframe is a frame at predetermined time intervals has been described.

Thereby, the parameter selection is periodically performed. For example, by selecting one frame as a keyframe at intervals of 30 seconds, the processing of the calculation unit 8 is not excessive and appropriate parameter settings can be maintained.

Note that, the interval of the keyframe is desirably set according to various circumstances such as the target object for image recognition, the use environment of the sensor device 1, the purpose of use, and the type of device equipped with the sensor device 1.

Furthermore, a case in which the keyframe is a frame at timing based on a command from an external device has been described.

For example, the keyframe is set according to an instruction from the processor 11 or the like at an image output destination. Thereby, the keyframe selection and parameter selection according to the purpose of recognition processing of the device at the output destination of the image signal and the information regarding class identification, for example, can be performed. For example, the keyframe is set according to the type and purpose of the device equipped with the sensor device 1.

In this case, for example, assuming an in-vehicle device, the keyframes can be set at dense intervals at timing when an automobile starts traveling.

The logic unit 5 of each embodiment performs, as the image processing for the image signal, the color correction, gamma correction, color gradation processing, gain processing, contour enhancement processing, data compression processing, frame rate conversion, resolution conversion, aspect ratio conversion, contrast adjustment processing, sharpness adjustment processing, gray level adjustment processing, sampling rate change processing, and the like.

Image quality adjustment and data amount conversion are performed by the above processing. Since the parameter settings for the image quality adjustment and data amount conversion are performed, the image quality adjustment and data size adjustment (the resolution, the frame rate, and the like) suitable for the class of the object to be recognized are executed. As a result, the image and data size become suitable for the object detection of the target class are obtained, and unnecessary high image quality and an increase in the data amount are suppressed, thereby contributing to reduction in the communication cost, improvement of the processing speed, improvement of the object detection accuracy, and the like.

It has been described that the interface unit 7 (output unit) of each embodiment outputs any or all of the image signal processed by the logic unit 5, the information of the identified class, the number of detected objects, and the information of the presence or absence of the target class, in response to a request of an external device. This is a common operation for the first to fifth embodiments.

That is, the interface unit 7 outputs information required by the processor 11 from among the image signal processed by the logic unit 5, the class information identified by the calculation unit 8, the number of objects, and the information of the presence or absence of the target class, in response to the request from the processor 11, a processor of a cloud, or the like. As a result, unnecessary information transfer can be avoided, the communication amount can be reduced, and the power consumption can be reduced.

In addition, information can be provided according to the processing in the processor 11 or the like.

Although the image signal is targeted in each embodiment, it is assumed that the array sensor 2 is a sound wave detection element array or a tactile sensor element array. In that case, the interface unit 7 outputs the detection signal (detection signal after the processing by the logic unit 5) of the above sensor in response to the request of the external device.

As described in the second, third, fourth, seventh, and eighth embodiments, the sensor device 1 includes the array sensor 2 having a plurality of detection elements arrayed in one or two dimensional manner, the signal processing unit 30 that acquires the detection signal by the array sensor 2 and performs signal processing, and the calculation unit 8 that detects an object from the detection signal by the array sensor 2, and gives an instruction, to the signal processing unit 30, on region information generated on the basis of the detection of the object (ROI 21 or AROI 22) as region information regarding the acquisition of the detection signal from the array sensor 2 or the signal processing for the detection signal.

That is, the detection signal obtained by the array sensor 2 is processed by the signal processing unit 30 and output from the interface unit 7. The region information regarding the acquisition of the detection signal from the array sensor 2 or the signal processing for the detection signal in the signal processing unit 30 is set on the basis of the detection of the object.

In a case of detecting an object from an image as in the embodiments, information of all the pixels of each frame is not always required. For example, in a case of detecting a person, detection information of a region where a person is captured in the frame is sufficient. Therefore, the ROI 21 or the AROI 22 is generated on the basis of the object detection in the calculation unit 8, and the processing of the signal processing unit 30, that is, the acquisition of the detection signal from the array sensor 2 by the ADC/pixel selector 3, and the compression processing in the logic unit 5 are performed using the ROI 21 or the AROI 22.

As a result, the reduction in the amount of data to be processed, the improvement of the processed speed can be achieved, and the image signal that does not reduce the detection accuracy can be obtained.

Note that the object detection can be performed not only for the image signal but also for a detection signal obtained from the array sensor such as a sound wave detection signal or a tactile detection signal, and an instruction on the region information generated on the basis of the object detection can be given to the signal processing unit as the region information regarding the acquisition of the detection signal from the array sensor or the signal processing for the detection signal.

As a result, even in a case of using a sound wave sensor array or a contact sensor array, the reduction in the amount of data to be processed and the improvement of the processing speed can be implemented, and the effect of obtaining the detection signal that does not reduce the detection accuracy can be obtained.

In the case of the second, third, fourth, seventh, and eighth embodiments, the interface unit 7 (output unit) outputs the detection signal processed by the signal processing unit 30 to the external device.

Since the image signal obtained by AD-converting only some pixels using the ROI 21 or the AROI 22 or the image signal with a changed compression rate for each region using the ROI 21 is output to the processor 11 or the like, the amount of data to be transmitted is significantly reduced. As a result, the communication cost can be reduced and the transmission time can be shortened. Then, since the information necessary for object detection is included, the accuracy of object detection in the processor 11 or the like is not reduced. Furthermore, since the data amount is reduced, the processing load on the processor 11 is also reduced.

Furthermore, a delay in the processing due to a high load of calculation on the processor 11 side and an increase in the power consumption of the entire system can be avoided.

In each embodiment, the signal processing unit 30 includes the ADC/pixel selector 3 (acquisition unit) that selectively acquires the detection signal from the detection element of the array sensor 2.

Then, in the second, third, seventh, and eighth embodiments, the ADC/pixel selector 3 acquires the detection signal of the detection element selected on the basis of the ROI 21 or the AROI 22 from the calculation unit 8 as one frame of the detection signal (see FIGS. 9, 14, 29, and 32).

The ADC/pixel selector 3 AD-converts and acquires the photoelectric conversion signal only in the range specified by the ROI 21 or the AROI 22 from the next frame in which an object has been detected, whereby the data amount of one frame can be significantly reduced. By setting the ROI 21 or the AROI 22 on the basis of the object detection, the information of the pixels necessary for the object detection can be appropriately obtained.

In the second, third, seventh, and eighth embodiments, an example in which the calculation unit 8 performs object detection for the detection signal obtained from the array sensor 2 in a state where the ADC/pixel selector 3 (acquisition unit) does not select the detection element by the region information (ROI 21 or AROI 22), and gives an instruction, to the signal processing unit 30, on the ROI 21 or the AROI 22 generated on the basis of the object detection, as the region information to be used for acquisition of the detection signal of a subsequent frame from the array sensor 2 by the ADC/pixel selector 3, has been described (see FIGS. 9, 14, 29, and 32).

By performing the object detection from the image signal including all the effective pixels of one frame, objects to be detected in the captured image can be accurately detected. Then, the ROI 21 or the AROI 22 is generated on the basis of the detected object, and is supplied to the ADC/pixel selector 3, whereby information of only pixels necessary for object detection can be obtained from the next frame. Therefore, appropriate detection information (information of necessary pixels) can be acquired while reducing the data amount.

In the second, third, seventh, and eighth embodiments, an example in which the calculation unit 8 performs object detection for the detection signal obtained from the array sensor 2 in a state where the ADC/pixel selector 3 has selected the detection element by the ROI 21 or AROI 22, regenerates the region information on the basis of object detection, and gives an instruction, to the signal processing unit 30, on the regenerated region information as the region information to be used for acquisition of the detection signal of a subsequent frame from the array sensor 2 by the ADC/pixel selector 3, has been described (see step S203 in FIGS. 9, 14, 29, and 32, and FIG. 10).

By performing the object detection from the frame of the image signal having only the information of some pixels, the ROI 21 or the AROI 22 can be modified according to a change in the object's position. Thereby, in the subsequent frame, the region acquired by the ADC/pixel selector 3 is changed following movement of an object (a person, for example) in the image. That is, even if the position of the target object changes in the image for each frame, the pixels can be selected and read at the position following the change for each frame. Therefore, the state of obtaining appropriate detection information (pixel information) can be continued if frame advances while reducing the data amount.

In the second, third, seventh, and eighth embodiments, the calculation unit 8 performs object detection for the detection signal obtained from the array sensor 2 in a state where the ADC/pixel selector 3 has selected the detection element by the ROI 21 or the AROI 22, and gives an instruction on acquisition of the detection signal from the array sensor 2 in a state where the ADC/pixel selector 3 does not select the detection element by the ROI 21 or the AROI 22 in a subsequent frame in a case where a target object is not detected (see steps S205, S201, and S202 in FIGS. 9, 14, 29, and 32).

That is, the calculation unit 8 returns the acquisition of the detection signal in the acquisition unit to the normal state when a target object is no longer detected in the frame in which only the information of some detection element has been acquired from the array sensor 2.

As a result, the state returns to the state of performing the object detection from the image signal including all the effective pixels of one frame, and the targeted object detection can be performed again in the entire captured image. That is, the entire image can be monitored.

In the second, third, fourth, seventh, and eighth embodiments, an example in which the calculation unit 8 obtains the bounding box 20 surrounding the region of the object detected from the detection signal by the array sensor 2, and generates the ROI 21 or the AROI 22 as the region information on the basis of the bounding box 20, has been described (see FIGS. 9, 14, 16, 29, and 32).

By generating the bounding box 20 by object detection and generating the ROI 21 or the AROI 22 from the bounding box 20, the ROI 21 or the AROI 22 according to the position of the target object in the image can be generated. As a result, readout pixels in the next frame can be appropriately selected.

In the second, fourth, seventh, and eighth embodiments, the calculation unit 8 expands the bounding box 20 to generate the ROI 21 (see FIGS. 9, 16, 29, and 32).

The bounding box 20 surrounds the region of the object in the current frame, but there is a possibility that the position of the object is changed in the subsequent frame. Therefore, the bounding box 20 is expanded to generate the ROI 21.

Thereby, the possibility of including the object as the information (a signal of AD-converted pixels) obtained in the next frame can be increased. That is, it is possible to continue reading pixels including necessary information as much as possible.

In the description of the second embodiment, an example in which the calculation unit 8 determines a region on a detection element to detection element basis for the detected object and generates the region information has been described (see FIG. 11).

That is, the ROI 21 is generated on the basis of semantic segmentation. Thereby, a non-rectangular ROI 21 is also generated.

There are some cases where information is lacked when a region is clipped with a rectangle depending on an object. For example, a truck with protrusions or a person riding a bicycle may have a protruding portion if clipped with a rectangle, and the ROI 21 that covers the protruding portion becomes unnecessarily large, and the data reduction effect is reduced. Therefore, a required region is made selectable at a pixel level. Thereby, the necessary information becomes able to be acquired with a minimum data amount.

Such a ROI 21 based on semantic segmentation is also useful in the case of setting a region with a low compression rate in the fourth embodiment.

In the second, third, fourth, seventh, and eighth embodiments, the calculation unit 8 performs object detection for the frame (keyframe) at the object detection keyframe recording timing in the detection signal obtained from the array sensor 2, and generates the region information on the basis of the object detection (see step S201 in FIGS. 9, 14, 16, 29, and 32).

By targeting the keyframe instead of all the frames, the processing load on the calculation unit 8 does not become excessive. Furthermore, by selecting the keyframe on the basis of an appropriate selection algorithm, the state in which appropriate parameter selection is performed can be maintained.

In this case as well, the keyframe is a frame at predetermined time intervals or at timing based on a command from an external device.

For example, by setting the keyframe according to the type and purpose of the device equipped with the sensor device 1, the object detection is performed for all the pixels of the frame at the timing required by the device or an application, and the data amount can be reduced in the subsequent frames.

In the second, third, fourth, seventh, and eighth embodiments, the calculation unit 8 performs class classification for the object detected from the detection signal obtained from the array sensor 2, determines whether or not the classified class is the target class, and generates the region information (ROI 21 or AROI 22) corresponding to the object of the target class (see steps S204 and S205 in FIGS. 9, 14, 16, 29, and 32).

By determining the presence of the target class and generating the ROI 21 or the AROI 22 using the target class for the object region of the target class, the region information for obtaining the information of the object to be detected can be accurately generated.

In the third and eighth embodiments, an example in which the calculation unit 8 performs class identification for the object detected from the detection signal obtained from the array sensor 2, and generates the region information (AROI 22) corresponding to the object, using the template corresponding to the identified class, has been described (see S210 and S211 in FIG. 14 and S262 and S211 in FIG. 32).

By using the template corresponding to the class, the AROI 22 adapted to an important region that differs for each class becomes able to be generated.

In particular, in the case where the array sensor 2 is formed using imaging elements, the power consumption in the photoelectric conversion is the largest. In this case, it is desirable to reduce the number of pixels to be photoelectrically converted as much as possible. By narrowing down the pixels to be photoelectrically converted according to the template, it is possible to effectively reduce the data amount without affecting the detection accuracy. In particular, the image is not viewed by a person, and an image accurately recognizable by the processor 11 is more important than an image that a person perceives beautiful. An image in which pixels to be photoelectrically converted and converted into digital data using a template is specified is suitable for effective object detection with a small data amount.

Furthermore, the template indicates an acquisition region of the detection signal for each class.

For example, the template indicates a detection element from which detection information is to be acquired among the detection elements of the array sensor according to each class such as "person" or "automobile" (see FIGS. 12 and 13).

By using the template that specifies the pixels to be read corresponding to the class, appropriate information can be read for each class from the array sensor 2. In particular, as illustrated in the examples in FIGS. 12 and 13, since some parts (face part and license plate part) are densified, it is possible to intensively acquire information of particularly necessary parts for each class.

In the fourth embodiment, an example in which, in the signal processing unit 30, the logic unit 5 performs compression processing for the detection signal from the array sensor 2, and the logic unit 5 performs the compression processing with a compression rate different for each region on the basis of the region information from the calculation unit 8 (see FIG. 16).

Thereby, the signal processing unit 30 (logic unit 5) can perform data compression not to reduce important information by differentiating the compression rate between an important region and an unimportant region in the frame.

Furthermore, the logic unit 5 performs the compression processing at a low compression rate in a region specified by the region information, and performs the compression processing at a high compression rate in the other regions (see FIG. 16).

The signal processing unit 30 (logic unit 5) performs the compression processing at a low compression rate in the region specified by the ROI 21 and reduces the data amount with a high compression rate in the other region in the next frame in which an object has been detected. Since the ROI 21 is generated according to object detection, the region indicated by the ROI 21 is also an important region for the object detection by the processor 11, and this region is compressed with a low compression rate so as not to reduce the information. Thereby, the detection accuracy is not reduced. Meanwhile, the region other than the region indicated by the ROI 21 is a region not affect the object detection. Therefore, the region is compressed with a high compression rate to effectively reduce the data amount.

As described in the fifth or ninth embodiment, the sensor device 1 includes the array sensor 2 having a plurality of detection elements arrayed in one or two dimensional manner, the signal processing unit 30 that acquires the detection signal by the array sensor 2 and performs signal processing, and the calculation unit 8 that performs object detection from the detection signal by the array sensor 2, and gives an instruction for making the frame rate of the detection signal from the array sensor 2 variable on the basis of the object detection.

In the case of detecting an object from an image as in the embodiments, the image signal with a high frame rate is not always required. For example, in the case of detecting a person, there is no problem if the frame rate is low in a frame in which no person is captured. On the contrary, by increasing the frame rate during a period when a person appears, the amount of information becomes abundant, and the object (person) detection and information recognizable along with the object detection can be increased.

That is, by changing the frame rate according to the object detection, the data amount can be adaptively increased when necessary and reduced when not necessary, and the amount of processed data and transferred data can be reduced without degrading the object detection performance.

Note that the object detection can be performed not only for the image signal but also for the detection signal obtained from the array sensor such as a sound wave detection signal or a tactile detection signal, and an instruction that the frame rate of the detection signal from the array sensor is made variable can be given on the basis of the object detection. As a result, even in the case of using a sound wave sensor array or a contact sensor array, the data amount can be adaptively increased when necessary and the data amount can be reduced when not necessary, and the effect of reducing the amount of processed data or transferred data without degrading the object detection performance can be obtained.

The frame is an image frame in the case where the array sensor is an imaging element array and has the same meaning in the case of a sound wave detection element or a tactile sensor element, and is a unit of data read in one readout period from a plurality of detection elements of the array sensor, regardless of the type of the array sensor. The frame rate is the density of such frames within a unit time.

In the case of the fifth and ninth embodiments, the interface unit 7 (output unit), which outputs the detection signal processed by the signal processing unit 30 to an external device, outputs the detection signal with a frame rate that is changed on the basis of an object detection result, to the processor 11 or the like.

Therefore, the amount of data to be transmitted is significantly reduced. As a result, the communication cost can be reduced and the transmission time can be shortened. Then, since the information necessary for targeted object detection is included, the accuracy of object detection in the processor 11 or the like is not reduced. Furthermore, since the data amount is reduced, the processing load on the processor 11 is also reduced.

Furthermore, a delay in the processing due to a high load of calculation on the processor 11 side and an increase in the power consumption of the entire system can be avoided.

In the fifth and ninth embodiments, the calculation unit 8 stores at least a set value for the frame rate of the first mode (idling mode) and a set value for the frame rate of the second mode (normal mode), and performs control according to the set value of either the first mode or the second mode according to an object detection result (see FIGS. 18 and 35).

Thereby, control as the active sampling can be implemented by the simple processing of selecting the set value according to the object detection result, that is, the presence or absence of the object of the target class.

One or both of the set value for the frame rate of the first mode and the set value for the frame rate of the second mode in the fifth and ninth embodiments are desirably rewritable from an external device. For example, the set values are made variable according to the use or the processing capacity of the external processor, the use of an application, or the like.

By making the set values rewritable from the processor 11 or the like, the frame rate according to the purpose of the processor 11 or the application can be set.

In the fifth and ninth embodiments, an example in which the calculation unit 8 gives an instruction on a readout interval of the detection signal of the array sensor 2 to make the frame rate variable (see FIGS. 18 and 35).

For example, the calculation unit 8 (keyframe selection unit 81) instructs the array sensor 2 and the ADC/pixel selector 3 to switch the idling mode and the normal mode and changes the readout interval of the image signal by the array sensor 2 and the ADC/pixel selector 3, thereby switching the frame rate.

In this case, in the idling mode in which the frame rate is lowered, the interval between the photoelectric conversion and the readout itself from the array sensor 2 is widened. Since the array sensor 2 has large power consumption due to the photoelectric conversion, widening the readout interval in the array sensor 2 has a significant effect of reducing the power consumption.

In the description of the fifth and ninth embodiments, the calculation unit 8 may instruct the signal processing unit 30 (logic unit 5) to change the frame rate to make the frame rate variable.

That is, the frame rate is switched by frame rate conversion in the signal processing process.

The logic unit 5 can convert the frame rate. For example, the frame rate can be lowered by frame thinning processing. In this case, since the array sensor 2 always performs readout at a high frame rate, the power consumption reduction effect of the array sensor 2 does not occur, but the effect of reducing the amount of data to be transferred to the processor 11 can be obtained.

In the fifth and ninth embodiments, an example in which the calculation unit 8 performs class identification for the object detected from the detection signal obtained from the array sensor 2, determines whether or not the identified class is the target class, and gives an instruction for making the frame rate variable according to a determination result, has been described (see steps S304, S305, and S301 in FIG. 18 and steps S304, S352, and S301 in FIG. 35).

The presence of the target class is determined, and the frame rate is increased as the normal mode due to the presence of the object of the target class. In a case where no object of the target class is detected, the frame rate is decreased as the idling mode. Thereby, detection can be accurately performed according to the presence of the object to be detected.

For example, in a use such as monitoring a person as the target class. Fine monitoring becomes possible by increasing the frame rate. In the other cases, the idling mode is set and the reduction in the consumption power and the data amount becomes possible.

In each embodiment, the detection element of the array sensor 2 is an imaging element That is, the detection signal by the array sensor 2 is an image signal by imaging (photoelectric conversion).

Therefore, in the object detection using a captured image, appropriate reduction in the data amount that can maintain the object detection accuracy, reduction in the processing load associated with the reduction in the data amount, a decrease in the transfer cost, and the like can be achieved.

In the embodiment, the sensor device 1 is assumed to have an integrated sensing module configuration having an AI chip or a DRAM chip as the calculation unit 8.

In contrast, it is also conceivable to configure the AI chip or the DRAM chip as the calculation unit 8 outside the array sensor 2, and allow the external calculation unit to perform the readout and control of signal processing described in each embodiment.

Furthermore, it is also conceivable to integrate the array sensor 2 and the AI chip as the calculation unit 8 and use an external DRAM chip.

In the sixth embodiment, the threshold setting unit 85 is provided, which sets the threshold for all or some of the parameters to be used in the image processing of the logic unit 5 (image processing unit) or the imaging processing regarding imaging by the array sensor 2, and enables the processing using the parameters set on the basis of the threshold to be performed.

By setting (changing) the parameters using the threshold, for example, the image signal can be output with the minimum required quality required for the processing such as object detection (for example, the minimum required resolution). Therefore, it is possible not to reduce the performance and accuracy of the subsequent processing (such as object detection) while reducing the data amount of the image signal to be output.

Furthermore, the power consumption can be reduced and the processing can be speeded up, accordingly.

Note that the processing example in FIG. 22 described in the sixth embodiment is an example in which the calculation unit 8 performs the class identification for the object detected from the image signal obtained by the imaging in the array sensor 2, selects the parameter set to be used in the image processing on the basis of the identified class, performs processing settings for the logic unit 5 using the selected parameters, and sets (adjusts) the selected parameters according to the threshold. Therefore, some or all of the parameters in the parameter set adapted for each class are further adjusted and set according to the threshold. The parameter set is adapted to the class, and the necessary and sufficient data amount can be obtained while maintaining the detection accuracy of the object detection and the like. Since the parameter set adapted to the class is further adjusted, the data amount can be further reduced, and the power consumption can be reduced and the processing can be speeded up.

Note that the embodiment is not limited to such an example in FIG. 22, some or all of the parameters set regardless of a class may be changed on the basis of the threshold. Even in such a case, the data amount of the image signal can be reduced, the power consumption can be reduced, and the processing can be speeded up while maintaining the performance and accuracy required for the object detection and the like.

In the sixth embodiment, the threshold setting unit 85 sets the threshold according to the class of the object detected from the image signal. For example, an appropriate threshold is set according to the class such as "person", "automobile", or "sign".

The relationship between the resolution and the detection accuracy required for an image for object detection or the like differs depending on the class. Therefore, by setting the threshold according to the class and changing the resolution of the image signal output from the logic unit 5 or the like, it is possible to output at the minimum required resolution or the like according to the class. That is, the data reduction, power consumption reduction, speedup of the processing, and the like can be achieved while optimizing the parameters such as the resolution according to the class and maintaining the object detection accuracy and the like at a required level.

In the sixth embodiment, the threshold setting unit 85 sets the threshold on the basis of the learning processing for the image signal. For example, the sensor device 1 performs the learning processing as local learning to obtain the threshold. By performing the learning processing for the image signal, desirable values as the threshold and the parameters according to the threshold are determined. As a result, the parameters are adaptively set according to the imaging environment, the content of the captured image, the object to be detected, and the like.

Furthermore, by performing such local learning in the sensor device 1 or in the terminal device 100 including the sensor device 1, the threshold suitable for the image accuracy or the like required in the sensor device 1 can be calculated.

Furthermore, by setting the threshold by local learning for each class, the resolution of the output image signal and the like can be optimized by setting the parameters adapted to the class.

In the sixth embodiment, the threshold setting unit 85 sets the threshold such that a predetermined rate can be obtained as the confidence rate (the rate of certainty of object detection).

The confidence rate required for the accuracy of object detection from an image differs depending on the purpose, target, type of device/application program, time, region, or the like, for the detection.

For example, in a case where 80% is sufficient, the threshold may be set to obtain 80% or more certainty, and the parameters may be set accordingly. Furthermore, in a case where 95% or more certainty is required, the threshold may be increased and the parameters are set.

Therefore, the threshold (and thus the parameters) are set on the basis of the confidence rate required for object detection, so that the desired image signal quality, and the data reduction, the power consumption reduction, the speedup of the processing, and the like according to the desired image signal quality can be achieved as adaptation according to execution of the processing.

In the sixth embodiment, an example in which the threshold setting unit 85 is provided in the same housing device as the logic unit 5 has been described (see FIGS. 21, 25, and 26). For example, the threshold setting unit 85 is provided in the unit as the sensor device 1 or in the terminal device 100 including the sensor device 1. Then, the threshold setting unit 85 performs local learning and sets the threshold and the parameters according to the threshold. This means that the threshold is set by learning the state of being adapted to a device as the sensor device 1 or the terminal device 100. Thereby, the appropriate threshold setting that implements the output required as the sensor device 1 or the terminal device 100 becomes possible.

In the seventh and eighth embodiments, the calculation unit 8 sets the active area RA for the detection signal acquired from the array sensor 2 on the basis of the information regarding past region information (the bounding box 20 of the object that is the base of the region information, and the ROI 21 or the AROI 22 that is the region information itself) (S251 in FIGS. 29 and 32).

Then, the calculation unit 8 performs object detection from the detection signal of the active area RA, and gives an instruction, to the signal processing unit 30, on the ROI 21 or the AROI 22 generated on the basis of the object detection as the region information regarding the acquisition of the detection signal from the array sensor 2 or the signal processing for the detection signal.

As a result, the processing load of the object detection for setting the ROI 21 or the AROI 22 is significantly reduced. Specifically, the processing of step S203 is reduced. Therefore, the effects of reducing the processing load, speeding up the processing, and reducing the power consumption can be obtained.

In the seventh and eighth embodiments, the calculation unit 8 sets the active area RA so as to include the detection region of the object detection based on the past ROI 21 or AROI 22, that is, the bounding box 20.

By continuing the processing, there are some cases where a region in which the bounding box 20 is not set at all is present on the image. Such a region can be set as the inactive area DA in which the target object is not detected, and conversely, the other region can be set as the active area RA, that is, the region in which the object can be detected.

The active area RA can be easily and appropriately set on the basis of a plurality of past bounding boxes 20. In addition, the active area RA suitable for the imaging environment, imaging direction, and the like can be set.

In the seventh and eighth embodiments, the calculation unit 8 performs the object detection for the detection signal obtained from the array sensor 2 in the state where the ADC/pixel selector 3 has selected the detection element by the ROI 21 or the AROI 22, and instructs the ADC/pixel selector 3 to acquire the detection signal in the active area from the array sensor in the subsequent frame in the case where the target object is not detected (see steps S205, S201, and S252 in FIGS. 29 and 32).

That is, the calculation unit 8 returns the acquisition of the detection signal in the acquisition unit to the normal state when a target object is no longer detected in the frame in which only the information of some detection element has been acquired from the array sensor 2.

As a result, the state returns to the state of performing the object detection from the image signal of the active area of one frame, and the targeted object detection can be performed again in the necessary range in the captured image. Virtually the entire image can be monitored.

In the seventh and eighth embodiments, an example in which the calculation unit 8 generates the region information on the basis of the object detection from the detection signal of the active area RA, for the keyframe in the detection signal obtained from the array sensor 2, has been described (see S201 and S252 in FIGS. 29 and 32).

By targeting the keyframe instead of all the frames, the processing load on the calculation unit 8 does not become excessive. Furthermore, by selecting the keyframe on the basis of an appropriate selection algorithm, the state in which appropriate parameter selection is performed can be maintained.

In this case as well, it is conceivable that the keyframe is a frame at predetermined time intervals or at timing based on a command from the outside such as the processor 11.

In the eighth embodiment, the calculation unit 8 performs the class identification for the object detected from the detection signal obtained from the array sensor 2, and generates the region information (AROI 22) corresponding to the object, using the template corresponding to the identified class. In this case, the AROI 22, in which the parameters such as the resolution are calculated and recorded on the basis of the threshold, is used (see S262 and S211 in FIG. 32).

By setting (changing) the parameters of the acquisition region indicated by the AROI 22 using the threshold, for example, the image signal can be output with the minimum required quality required for the processing such as object detection (for example, the minimum required resolution).

Furthermore, an image in which pixels to be photoelectrically converted and converted into digital data using a template is specified is suitable for effective object detection with a small data amount.

Therefore, by using the template and setting the parameters such as the resolution by the threshold, it is possible not to reduce the performance and accuracy of the subsequent processing (such as object detection) while reducing the data amount of the image signal to be output. Furthermore, the power consumption can be reduced and the processing can be speeded up, accordingly.

Furthermore, since the template indicates the acquisition region of the detection signal for each class such as "person" or "automobile", it is possible to intensively acquire the information of particularly necessary parts for each class.

In the ninth embodiment, the threshold setting unit 85 is provided, which sets the threshold of the frame rate according to the class identified for the object detected from the detection signal obtained from the array sensor 2, and enables the processing using the frame rate set on the basis of the threshold to be performed (see FIG. 35).

By setting (changing) the frame rate using the threshold, the frame rate suitable for the class to be detected can be applied. Specifically, it is possible to reduce the data amount of the image signal, reduce the power consumption, and speed up the processing by lowering the frame rate while not degrading the performance of the object detection of the class to be detected.

In the ninth embodiment, the threshold setting unit 85 sets the threshold as the frame rate that can maintain the object tracking from the image.

As a result, it is possible to achieve the data reduction according to the class, the power consumption reduction, the speedup of the processing, and the like while maintaining the accuracy of the object detection performed while performing the object tracking from the image.

In the ninth embodiment, the calculation unit 8 uses the frame rate set by the threshold setting unit 85 as the frame rate of the second mode (normal mode) in which the frame rate becomes high. As a result, the relatively low frame rate is used according to the class in the case where the frame rate becomes high.

The first, second, third, fourth, fifth, sixth, seventh, eighth, and ninth embodiments can be combined as appropriate.

The effect of the embodiments can be increased by the combination. That is, the effect of reducing the data amount of the image signal, reducing the power consumption, speeding up the processing, and the like can be increased while maintaining the accuracy of the processing such as object detection from an image.

Note that the effects described in the present specification are merely examples and are not limited, and other effects may be exhibited.

Note that the present technology can also have the following configurations.

(1)

A sensor device including:

an array sensor having a plurality of detection elements arrayed in one or two dimensional manner, a signal processing unit configured to acquire a detection signal by the array sensor and perform signal processing; and a calculation unit configured to detect an object from the detection signal by the array sensor, and give an instruction, to the signal processing unit, on region information generated on the basis of the detection of the object as region information regarding the acquisition of the detection signal from the array sensor or the signal processing for the detection signal.

(2)

The sensor device according to (1), further including:

an output unit configured to output the detection signal processed by the signal processing unit to an external device.

(3)

The sensor device according to (1) or (2), in which the signal processing unit includes an acquisition unit that selectively acquires the detection signal for the detection element of the array sensor, and the acquisition unit acquires the detection signal of the detection element selected on the basis of the region information from the calculation unit, as one frame of the detection signal.

(4)

The sensor device according to (3), in which the calculation unit detects an object for the detection signal acquired from the array sensor in a state where the acquisition unit does not select the detection element based on the region information, and gives an instruction, to the signal processing unit, on the region information generated on the basis of the detection of the object as region information to be used for acquisition of the detection signal of a subsequent frame from the array sensor by the acquisition unit.

(5)

The sensor device according to (4), in which the calculation unit detects an object for the detection signal acquired from the array sensor in a state where the acquisition unit has selected the detection element based on the region information, and regenerates the region information on the basis of the detection of the object, and gives an instruction, to the signal processing unit, on the region information as region information to be used for acquisition of the detection signal of a subsequent frame from the array sensor by the acquisition unit.

(6)

The sensor device according to (5), in which the calculation unit detects an object for the detection signal acquired from the array sensor in the state where the acquisition unit has selected the detection element based on the region information, and gives an instruction on acquisition of the detection signal from the array sensor in the state where the acquisition unit does not select the detection element based on the region information in a subsequent frame in a case where a target object has not been detected.

(7)

The sensor device according to any one of (1) to (6), in which the calculation unit obtains a bounding box surrounding a region of the object detected from the detection signal by the array sensor, and generates the region information on the basis of the bounding box.

(8)

The sensor device according to (7), in which the calculation unit enlarges the bounding box and generates the region information.

(9)

The sensor device according to any one of (1) to (6), in which the calculation unit determines a region on a detection element to detection element basis for the detected object and generates the region information.

(10)

The sensor device according to any one of (1) to (9), in which the calculation unit detects an object for a frame as a keyframe of the detection signal obtained from the array sensor, and generates the region information on the basis of the detection of the object.

(11)

The sensor device according to (10), in which the keyframe is a frame at predetermined time intervals.

(12)

The sensor device according to (10), in which the keyframe is a frame at timing based on a command from an external device.

(13)

The sensor device according to any one of (1) to (12), in which the calculation unit identifies a class for the object detected from the detection signal obtained from the array sensor, determines whether or not the identified class is a target class, and generates the region information corresponding to the object of the target class.

(14)

The sensor device according to any one of (1) to (13), in which the calculation unit identifies a class for the object detected from the detection signal obtained from the array sensor, and generates the region information corresponding to the object, using a template corresponding to the identified class.

(15)

The sensor device according to (14), in which the template indicates an acquisition region of the detection signal for each class.

(16)

The sensor device according to (13), further including:

an output unit configured to output any or all of the detection signal processed by the signal processing unit, information of the identified class, the number of detected objects, and information of presence or absence of a target class in response to a request of an external device.

(17)

The sensor device according to any one of (1) to (16), in which the signal processing unit includes a compression processing unit that performs compression processing for the detection signal from the array sensor, and the compression processing unit performs the compression processing according to a compression rate different for each region on the basis of the region information from the calculation unit.

(18)

The sensor device according to (17), in which the compression processing unit performs the compression processing at a low compression rate in a region specified by the region information, and performs the compression processing at a high compression rate in the other regions.

(19)

The sensor device according to any one of (1) to (18), in which the detection element of the array sensor is an imaging element.

(20)

The sensor device according to any one of (1), (2), (3), (5), (7), (8), (9), and (13), in which the calculation unit sets an active area for the detection signal to be acquired from the array sensor on the basis of information regarding past region information, and detects an object from the detection signal of the active area, and gives an instruction, to the signal processing unit, on the region information generated on the basis of the detection of the object as region information regarding the acquisition of the detection signal from the array sensor or the signal processing for the detection signal.

(21)

The sensor device according to (20), in which the calculation unit sets, for a plurality of pieces of the region information generated in a past predetermined period, the active area so as to include a detection region in the object detection based on each piece of the region information.

(22)

The sensor device according to (20) or (21), in which the signal processing unit includes an acquisition unit that selectively acquires the detection signal for the detection element of the array sensor, the acquisition unit acquires the detection signal of the detection element selected on the basis of the region information from the calculation unit, as one frame of the detection signal, and the calculation unit instructs the acquisition unit to acquire the detection signal of the active area from the array sensor in a subsequent frame in a case where the calculation unit detects an object for the detection signal acquired from the array sensor and a target object is not detected in a state where the acquisition unit has selected the detection element according to the region information.

(23)

The sensor device according to any one of (20) to (22), in which the calculation unit detects an object from the detection signal of the active area for a frame as a keyframe of the detection signal obtained from the array sensor, and generates the region information on the basis of the detection of the object.

(24)

The sensor device according to any one of (1) to (23), in which the calculation unit identifies a class for the object detected from the detection signal obtained from the array sensor, and generates the region information corresponding to the object, using a template indicating an acquisition region of the detection signal corresponding to the identified class, and the sensor device further includes a threshold setting unit configured to set a threshold of a parameter for all or some of parameters to be used for the image processing of the image processing unit or imaging processing regarding imaging by the array sensor, and set a parameter of processing regarding the acquisition region indicated by the template on the basis of the threshold.

(25)

A signal processing method in a sensor device including an array sensor having a plurality of detection elements arrayed in one or two dimensional manner, and a signal processing unit that acquires a detection signal by the array sensor and performs signal processing, the signal processing method including:

detecting an object from the detection signal by the array sensor, and instructing, to the signal processing unit, region information generated on the basis of the detection of the object as region information regarding the acquisition of the detection signal from the array sensor or the signal processing for the detection signal.

(26)

The signal processing method according to (26), further including:

setting an active area for the detection signal acquired from the array sensor on the basis of past region information; and detecting an object from the detection signal of the active area as the detection signal by the array sensor.

REFERENCE SIGNS LIST

1 Sensor device
2 Array sensor
3 ADC/pixel selector
4 Buffer
5 Logic unit
6 Memory
7 Interface unit
8 Calculation unit
11 Processor
12 External sensor
20 Bounding box
21 ROI
22 Advanced ROI (AROI)
23 Candidate region
30 Signal processing unit
81 Keyframe selection unit
82 Object region recognition unit
83 Class identification unit
84 Parameter selection unit
85 Threshold setting unit
100 Terminal device

The invention claimed is:

1. A sensor device comprising:

an array sensor having a plurality of detection elements arrayed in one or two dimensional manner;

a signal processing unit configured to acquire a detection signal by the array sensor and perform signal processing; and a calculation unit configured to detect an object from the detection signal by the array sensor, and give an instruction, to the signal processing unit, on region information generated on a basis of the detection of the object as region information regarding the acquisition of the detection signal from the array sensor or the signal processing for the detection signal;

wherein the calculation unit identifies a class for the object detected from the detection signal obtained from the array sensor, and generates the region information corresponding to the object, using a template indicating an acquisition region of the detection signal corresponding to the identified class; and wherein the template indicates a first acquisition region of the detection signal for a first class and a different second acquisition region of the detection signal for a second class.

2. The sensor device according to claim 1, further comprising:

an output unit configured to output the detection signal processed by the signal processing unit to an external device.

3. The sensor device according to claim 1, wherein the signal processing unit includes an acquisition unit that selectively acquires the detection signal for the detection element of the array sensor, and the acquisition unit acquires the detection signal of the detection element selected on a basis of the region information from the calculation unit, as one frame of the detection signal.

4. The sensor device according to claim 3, wherein the calculation unit detects an object for the detection signal acquired from the array sensor in a state where the acquisition unit does not select the detection element based on the region information, and gives an instruction, to the signal processing unit, on the region information generated on the basis of the detection of the object as region information to be used for acquisition of the detection signal of a subsequent frame from the array sensor by the acquisition unit.

5. The sensor device according to claim 4, wherein the calculation unit detects an object for the detection signal acquired from the array sensor in a state where the acquisition unit has selected the detection element based on the region information, and regenerates the region information on a basis of the detection of the object, and gives an instruction, to the signal processing unit, on the region information as region information to be used for acquisition of the detection signal of a subsequent frame from the array sensor by the acquisition unit.

6. The sensor device according to claim 5, wherein the calculation unit detects an object for the detection signal acquired from the array sensor in the state where the acquisition unit has selected the detection element based on the region information, and gives an instruction on acquisition of the detection signal from the array sensor in the state where the acquisition unit does not select the detection element based on the region information in a subsequent frame in a case where a target object has not been detected.

7. The sensor device according to claim 1, wherein the calculation unit obtains a bounding box surrounding a region of the object detected from the detection signal by the array sensor, and generates the region information on a basis of the bounding box.

8. The sensor device according to claim 7, wherein the calculation unit enlarges the bounding box and generates the region information.

9. The sensor device according to claim 1, wherein the calculation unit determines a region on a detection element to detection element basis for the detected object and generates the region information.

10. The sensor device according to claim 1, wherein the calculation unit detects an object for a frame as a keyframe of the detection signal obtained from the array sensor, and generates the region information on a basis of the detection of the object.

11. The sensor device according to claim 10, wherein the keyframe is a frame at predetermined time intervals.

12. The sensor device according to claim 10, wherein the keyframe is a frame at timing based on a command from an external device.

13. The sensor device according to claim 1, wherein the calculation unit identifies a class for the object detected from the detection signal obtained from the array sensor, determines whether or not the identified class is a target class, and generates the region information corresponding to the object of the target class.

14. The sensor device according to claim 13, further comprising:
an output unit configured to output any or all of the detection signal processed by the signal processing unit, information of the identified class, the number of detected objects, and information of presence or absence of a target class in response to a request of an external device.

15. The sensor device according to claim 1, wherein the signal processing unit includes a compression processing unit that performs compression processing for the detection signal from the array sensor, and the compression processing unit performs the compression processing according to a compression rate different for each region on a basis of the region information from the calculation unit.

16. The sensor device according to claim 15, wherein the compression processing unit performs the compression processing at a low compression rate in a region specified by the region information, and performs the compression processing at a high compression rate in the other regions.

17. The sensor device according to claim 1, wherein the calculation unit
sets an active area for the detection signal to be acquired from the array sensor on a basis of information regarding past region information, and
detects an object from the detection signal of the active area, and gives an instruction, to the signal processing unit, on the region information generated on a basis of the detection of the object as region information regarding the acquisition of the detection signal from the array sensor or the signal processing for the detection signal.

18. The sensor device according to claim 17, wherein the calculation unit sets, for a plurality of pieces of the region information generated in a past predetermined period, the active area so as to include a detection region in the object detection based on each piece of the region information.

19. The sensor device according to claim 17, wherein the signal processing unit includes an acquisition unit that selectively acquires the detection signal for the detection element of the array sensor,
the acquisition unit acquires the detection signal of the detection element selected on a basis of the region information from the calculation unit, as one frame of the detection signal, and
the calculation unit instructs the acquisition unit to acquire the detection signal of the active area from the array sensor in a subsequent frame in a case where the calculation unit detects an object for the detection signal acquired from the array sensor and a target object is not detected in a state where the acquisition unit has selected the detection element according to the region information.

20. The sensor device according to claim 17, wherein the calculation unit detects an object from the detection signal of the active area for a frame as a keyframe of the detection signal obtained from the array sensor, and generates the region information on a basis of the detection of the object.

21. The sensor device according to claim 1, further comprising:
a threshold setting unit configured to set a threshold of all or some of parameters to be used in signal processing of the signal processing unit or detection processing by the array sensor, and set the parameters of the processing for the acquisition region indicated by the template on a basis of the threshold.

22. A signal processing method in a sensor device including an array sensor having a plurality of detection elements arrayed in one or two dimensional manner, and a signal processing unit that acquires a detection signal by the array sensor and performs signal processing, the signal processing method comprising:
detecting an object from the detection signal by the array sensor,
identifying a class for the detected object,
generating region information corresponding to the object, using a template indicating an acquisition region of the detection signal corresponding to the identified class, and
giving an instruction, to the signal processing unit, on region information generated on a basis of the detection of the object as region information regarding the acquisition of the detection signal from the array sensor or the signal processing for the detection signal; and
wherein the template indicates a first acquisition region of the detection signal for a first class and a different second acquisition region of the detection signal for a second class.

23. The signal processing method according to claim 22, further comprising:
setting an active area for the detection signal acquired from the array sensor on a basis of past region information; and
detecting an object from the detection signal of the active area as the detection signal by the array sensor.

24. The signal processing method according to claim 22, further comprising:
setting a threshold of all or some of parameters to be used in signal processing of the signal processing unit or detection processing by the array sensor, and setting the parameters of the processing for the acquisition region indicated by the template on a basis of the threshold.

25. The signal processing method according to claim 22, wherein a densified part of the first acquisition region has a first geometric shape; and
wherein a densified part of the second acquisition region has a different second geometric shape.

26. The sensor device according to claim 1, wherein a densified part of the first acquisition region has a first geometric shape; and
wherein a densified part of the second acquisition region has a different second geometric shape.

* * * * *